United States Patent
Yang et al.

(10) Patent No.: US 11,595,961 B2
(45) Date of Patent: Feb. 28, 2023

(54) CONFIGURATION AND UTILIZATION OF RECONFIGURABLE INTELLIGENT SURFACES FOR SIDELINK COMMUNICATION

(71) Applicant: QUALCOMM Incorporated, San Diego, CA (US)

(72) Inventors: Wei Yang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 17/329,093

(22) Filed: May 24, 2021

(65) Prior Publication Data

US 2022/0377730 A1    Nov. 24, 2022

(51) Int. Cl.
*H04W 72/04* (2009.01)
*H04L 5/00* (2006.01)
*G01S 19/24* (2010.01)
*H04W 52/36* (2009.01)

(52) U.S. Cl.
CPC ........... *H04W 72/048* (2013.01); *G01S 19/24* (2013.01); *H04L 5/0048* (2013.01); *H04L 5/0057* (2013.01); *H04W 52/36* (2013.01)

(58) Field of Classification Search
CPC ...................................................... H04B 7/145
See application file for complete search history.

(56) References Cited

U.S. PATENT DOCUMENTS

2022/0014935 A1\* 1/2022 Haija ................... H04B 17/336
2022/0240260 A1\* 7/2022 Zhou ................... H04W 72/085

FOREIGN PATENT DOCUMENTS

WO    WO-2022111825 A1 \*  6/2022

\* cited by examiner

*Primary Examiner* — Kevin Kim
(74) *Attorney, Agent, or Firm* — Loza & Loza, LLP

(57) ABSTRACT

Various aspects to improve a sidelink communication by UEs in a presence of a reconfigurable intelligent surface (RIS) are provided. In an aspect, the UE may determine RIS location information for a RIS device controlled by a base station, configure one or more sidelink communication parameters based on the RIS location information, and perform a sidelink communication with a second UE based on the one or more sidelink communication parameters. In an aspect, the UE may receive, from a base station, a RIS configuration setting indicating communication patterns of a RIS device controlled by the base station, the communication patterns being respectively associated with pattern durations, select a pattern duration of the pattern durations, and perform a sidelink communication with a second UE during the selected pattern duration of the pattern durations that is associated with a respective communication pattern of the communication patterns.

30 Claims, 24 Drawing Sheets

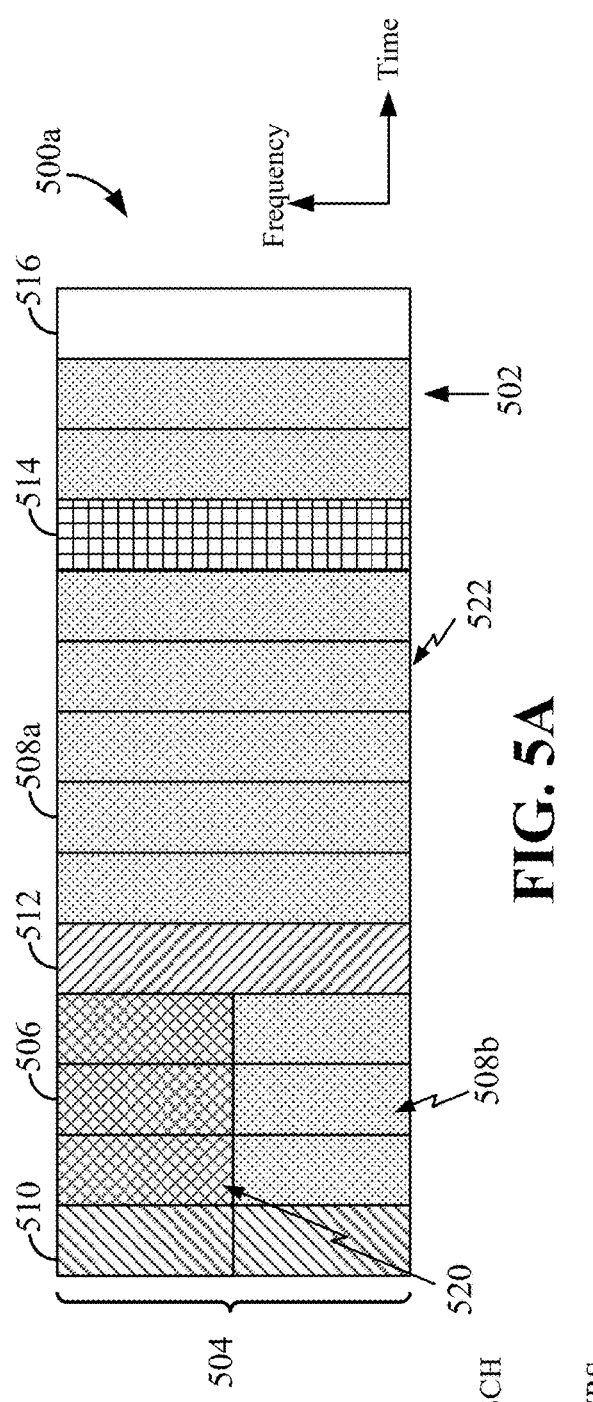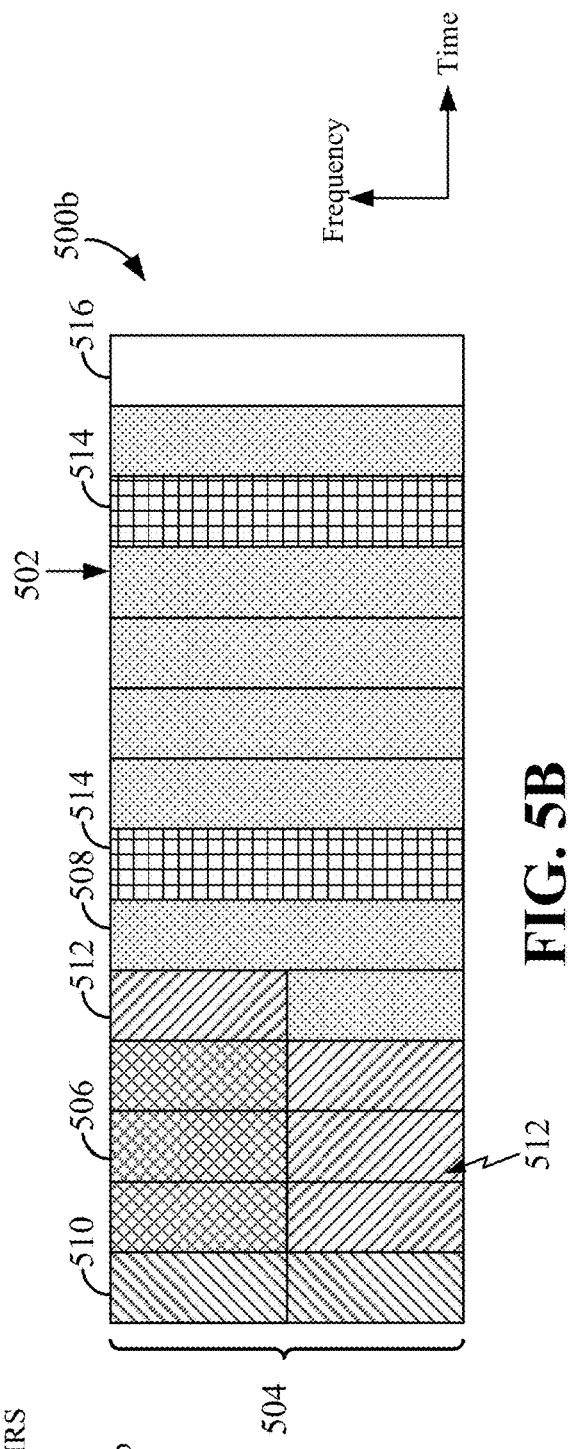

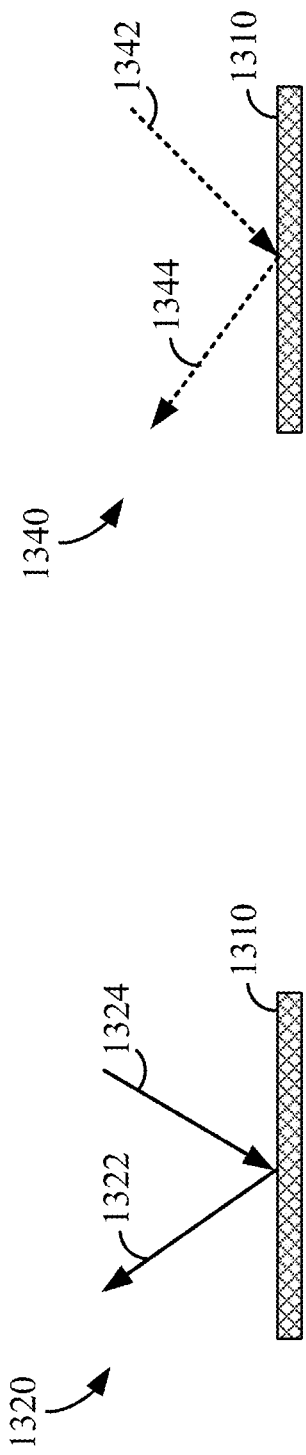
FIG. 13A
FIG. 13B
FIG. 13C
FIG. 13D

CONFIGURATION AND UTILIZATION OF RECONFIGURABLE INTELLIGENT SURFACES FOR SIDELINK COMMUNICATION

TECHNICAL FIELD

The technology discussed below relates generally to wireless communication systems, and more particularly, to configuration and utilization of a reconfigurable intelligent surface for sidelink communication.

INTRODUCTION

Wireless communication between devices may be facilitated by various network configurations. In one configuration, a cellular network may enable wireless communication devices (e.g., user equipment (UEs)) to communicate with one another through signaling with a nearby base station or cell. Another wireless communication network configuration is a device to device (D2D) network, in which wireless communication devices may signal one another directly, rather than via an intermediary base station or cell. For example, D2D communication networks may utilize sidelink signaling to facilitate the direct communication between wireless communication devices. In some sidelink network configurations, wireless communication devices may further communicate in a cellular network, generally under the control of a base station. Thus, the wireless communication devices may be configured for uplink and downlink signaling via a base station and further for sidelink signaling directly between the wireless communication devices without transmissions passing through the base station. In wireless communication systems, such as those specified under standards for 5G New Radio (NR), D2D communication between UEs may take place via sidelink communication.

More recently, a reconfigurable intelligent surface (RIS) device with a RIS has been developed to improve wireless communication. For example, the RIS may be able to receive a wireless signal at one particular direction and may reflect the received wireless signal to another particular direction. Because the RIS generally operates differently from UEs, the RIS device deployed in a wireless communication environment may affect wireless communications near the RIS device, such as a sidelink communication between the UEs

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication by a user equipment (UE) is disclosed. The method includes determining reconfigurable intelligent surface (RIS) location information for a RIS device controlled by a base station, configuring one or more sidelink communication parameters based on the RIS location information, and performing a sidelink communication with a second UE based on the one or more sidelink communication parameters.

In another example, a UE for wireless communication is disclosed. The UE includes at least one processor, a transceiver communicatively coupled to the at least one processor, and a memory communicatively coupled to the at least one processor. The at least one processor may be configured to determine RIS location information for a RIS device controlled by a base station, configure one or more sidelink communication parameters based on the RIS location information, and perform a sidelink communication with a second UE based on the one or more sidelink communication parameters.

In another example, a non-transitory computer-readable storage medium having instructions for UE thereon may be disclosed. The instructions, when executed by a processing circuit, cause the processing circuit to determine RIS location information for a RIS device controlled by a base station, configure one or more sidelink communication parameters based on the RIS location information, and perform a sidelink communication with a second UE based on the one or more sidelink communication parameters.

In a further example, a UE for wireless communication may be disclosed. The UE includes means for determining reconfigurable intelligent surface (RIS) location information for a RIS device controlled by a base station, means for configuring one or more sidelink communication parameters based on the RIS location information, and means for performing a sidelink communication with a second UE based on the one or more sidelink communication parameters In one example, a method of wireless communication by a base station is disclosed. The method includes determining reconfigurable intelligent surface (RIS) location information for a RIS device controlled by the base station, and transmitting the RIS location information to one or more UEs to configure one or more sidelink communication parameters based on the RIS location information.

In another example, a base station for wireless communication is disclosed. The base station includes at least one processor, a transceiver communicatively coupled to the at least one processor, and a memory communicatively coupled to the at least one processor. The at least one processor may be configured to determine RIS location information for a RIS device controlled by the base station, and transmit the RIS location information to one or more UEs to configure one or more sidelink communication parameters based on the RIS location information.

In another example, a non-transitory computer-readable storage medium having instructions for a base station thereon may be disclosed. The instructions, when executed by a processing circuit, cause the processing circuit to determine RIS location information for a RIS device controlled by the base station, and transmit the RIS location information to one or more UEs to configure one or more sidelink communication parameters based on the RIS location information.

In a further example, a base station for wireless communication may be disclosed. The base station includes means for determining RIS location information for a RIS device controlled by the base station, and means for transmitting the RIS location information to one or more UEs to configure one or more sidelink communication parameters based on the RIS location information.

In one example, a method of wireless communication by a UE is disclosed. The method includes receiving, from a base station, a RIS configuration setting indicating a plurality of communication patterns of a RIS device controlled by the base station, the plurality of communication patterns being respectively associated with a plurality of pattern durations, selecting a pattern duration of the plurality of pattern durations, and performing a sidelink communication with a second UE during the selected pattern duration of the plurality of pattern durations that is associated with a respective communication pattern of the plurality of communication patterns.

In another example, a UE for wireless communication is disclosed. The UE includes at least one processor, a transceiver communicatively coupled to the at least one processor, and a memory communicatively coupled to the at least one processor. The at least one processor may be configured to receive, from a base station, a RIS configuration setting indicating a plurality of communication patterns of a RIS device controlled by the base station, the plurality of communication patterns being respectively associated with a plurality of pattern durations, select a pattern duration of the plurality of pattern durations, and perform a sidelink communication with a second UE during the selected pattern duration of the plurality of pattern durations that is associated with a respective communication pattern of the plurality of communication patterns.

In another example, a non-transitory computer-readable storage medium having instructions for UE thereon may be disclosed. The instructions, when executed by a processing circuit, cause the processing circuit to receive, from a base station, a RIS configuration setting indicating a plurality of communication patterns of a RIS device controlled by the base station, the plurality of communication patterns being respectively associated with a plurality of pattern durations, select a pattern duration of the plurality of pattern durations, and perform a sidelink communication with a second UE during the selected pattern duration of the plurality of pattern durations that is associated with a respective communication pattern of the plurality of communication patterns.

In a further example, a UE for wireless communication may be disclosed. The UE includes means for receiving, from a base station, a reconfigurable intelligent surface (RIS) configuration setting indicating a plurality of communication patterns of a RIS device controlled by the base station, the plurality of communication patterns being respectively associated with a plurality of pattern durations, means for selecting a pattern duration of the plurality of pattern durations, and means for performing a sidelink communication with a second UE during the selected pattern duration of the plurality of pattern durations that is associated with a respective communication pattern of the plurality of communication patterns.

In one example, a method of wireless communication by a base station is disclosed. The method includes determining at least one of an invisibility timing configuration or a plurality of communication patterns for a RIS device controlled by the base station, the invisibility timing configuration indicating one or more invisibility durations during which the RIS device is configured to be invisible for wireless communications and the plurality of communication patterns being respectively associated with a plurality of pattern durations, and transmitting, to the RIS device, a RIS configuration setting indicating at least one of the invisibility timing configuration to configure the RIS device to be invisible for wireless communications during the invisibility timing configuration or the plurality of communication patterns to configure the RIS device with the plurality of communication patterns respectively for the plurality of pattern durations.

In another example, a base station for wireless communication is disclosed. The base station includes at least one processor, a transceiver communicatively coupled to the at least one processor, and a memory communicatively coupled to the at least one processor. The at least one processor may be configured to determine at least one of an invisibility timing configuration or a plurality of communication patterns for a RIS device controlled by the base station, the invisibility timing configuration indicating one or more invisibility durations during which the RIS device is configured to be invisible for wireless communications and the plurality of communication patterns being respectively associated with a plurality of pattern durations, and transmit, to the RIS device, a RIS configuration setting indicating at least one of the invisibility timing configuration to configure the RIS device to be invisible for wireless communications during the invisibility timing configuration or the plurality of communication patterns to configure the RIS device with the plurality of communication patterns respectively for the plurality of pattern durations.

In another example, a non-transitory computer-readable storage medium having instructions for a base station thereon may be disclosed. The instructions, when executed by a processing circuit, cause the processing circuit to determine at least one of an invisibility timing configuration or a plurality of communication patterns for a RIS device controlled by the base station, the invisibility timing configuration indicating one or more invisibility durations during which the RIS device is configured to be invisible for wireless communications and the plurality of communication patterns being respectively associated with a plurality of pattern durations, and transmit, to the RIS device, a RIS configuration setting indicating at least one of the invisibility timing configuration to configure the RIS device to be invisible for wireless communications during the invisibility timing configuration or the plurality of communication patterns to configure the RIS device with the plurality of communication patterns respectively for the plurality of pattern durations.

In a further example, a base station for wireless communication may be disclosed. The base station includes means for determining at least one of an invisibility timing configuration or a plurality of communication patterns for a RIS device controlled by the base station, the invisibility timing configuration indicating one or more invisibility durations during which the RIS device is configured to be invisible for wireless communications and the plurality of communication patterns being respectively associated with a plurality of pattern durations, and means for transmitting, to the RIS device, a RIS configuration setting indicating at least one of the invisibility timing configuration to configure the RIS device to be invisible for wireless communications during the invisibility timing configuration or the plurality of communication patterns to configure the RIS device with the plurality of communication patterns respectively for the plurality of pattern durations.

In one example, a method of wireless communication by a RIS device is disclosed. The method includes receiving, from a base station, a RIS configuration setting indicating at least one of an invisibility timing configuration or a plurality of communication patterns of the RIS device within a cell operated by the base station, the invisibility timing configuration indicating one or more invisibility durations during which the RIS device is configured to be invisible for wireless communications and the plurality of communication patterns being respectively associated with a plurality of pattern durations wherein the RIS device is configured to be active for wireless communications, and performing at least one of: configuring the RIS device to be invisible for wireless communications during the invisibility timing, or configuring the RIS device with the plurality of communication patterns respectively for the plurality of pattern durations.

In another example, a RIS device for wireless communication is disclosed. The base station includes at least one processor, a transceiver communicatively coupled to the at least one processor, and a memory communicatively coupled to the at least one processor. The at least one processor may be configured to receive, from a base station, a RIS configuration setting indicating at least one of an invisibility timing configuration or a plurality of communication patterns of the RIS device within a cell operated by the base station, the invisibility timing configuration indicating one or more invisibility durations during which the RIS device is configured to be invisible for wireless communications and the plurality of communication patterns being respectively associated with a plurality of pattern durations wherein the RIS device is configured to be active for wireless communications, and perform at least one of: configuring the RIS device to be invisible for wireless communications during the invisibility timing, or configuring the RIS device with the plurality of communication patterns respectively for the plurality of pattern durations.

In another example, a non-transitory computer-readable storage medium having instructions for a RIS device thereon may be disclosed. The instructions, when executed by a processing circuit, cause the processing circuit to receive, from a base station, a RIS configuration setting indicating at least one of an invisibility timing configuration or a plurality of communication patterns of the RIS device within a cell operated by the base station, the invisibility timing configuration indicating one or more invisibility durations during which the RIS device is configured to be invisible for wireless communications and the plurality of communication patterns being respectively associated with a plurality of pattern durations wherein the RIS device is configured to be active for wireless communications, and perform at least one of: configuring the RIS device to be invisible for wireless communications during the invisibility timing, or configuring the RIS device with the plurality of communication patterns respectively for the plurality of pattern durations.

In a further example, a RIS device for wireless communication may be disclosed. The base station includes means for receiving, from a base station, a RIS configuration setting indicating at least one of an invisibility timing configuration or a plurality of communication patterns of the RIS device within a cell operated by the base station, the invisibility timing configuration indicating one or more invisibility durations during which the RIS device is configured to be invisible for wireless communications and the plurality of communication patterns being respectively associated with a plurality of pattern durations wherein the RIS device is configured to be active for wireless communications, and means for performing at least one of: configuring the RIS device to be invisible for wireless communications during the invisibility timing, or configuring the RIS device with the plurality of communication patterns respectively for the plurality of pattern durations.

These and other aspects of the disclosure will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIGS. 5A and 5B are diagrams illustrating examples of sidelink slot structures according to some aspects.

FIGS. 13A, 13B, 13C, and 13D are example diagrams illustrating different communication patterns configured for a RIS device, according to some aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
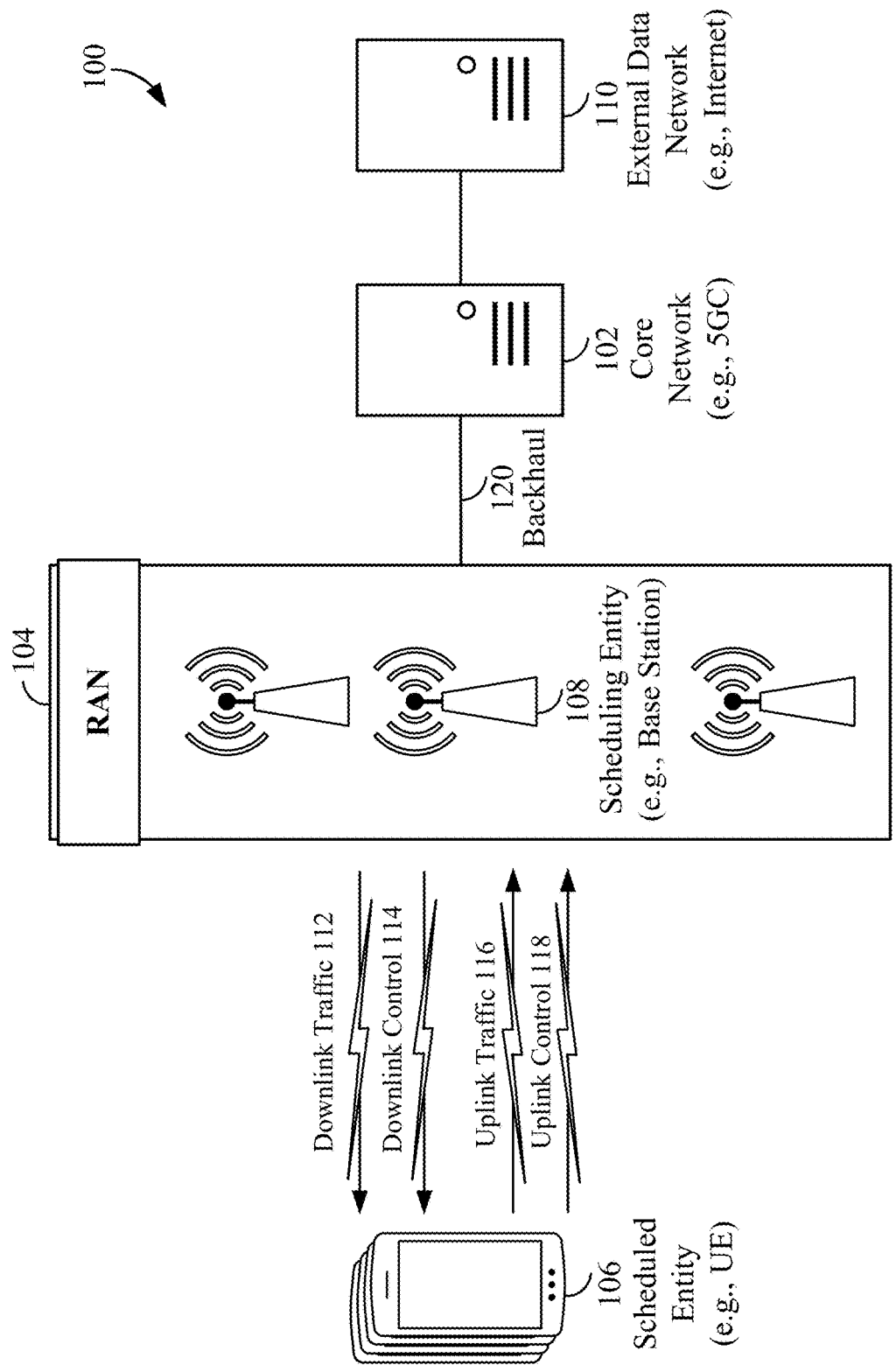
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP) or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; vehicles, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
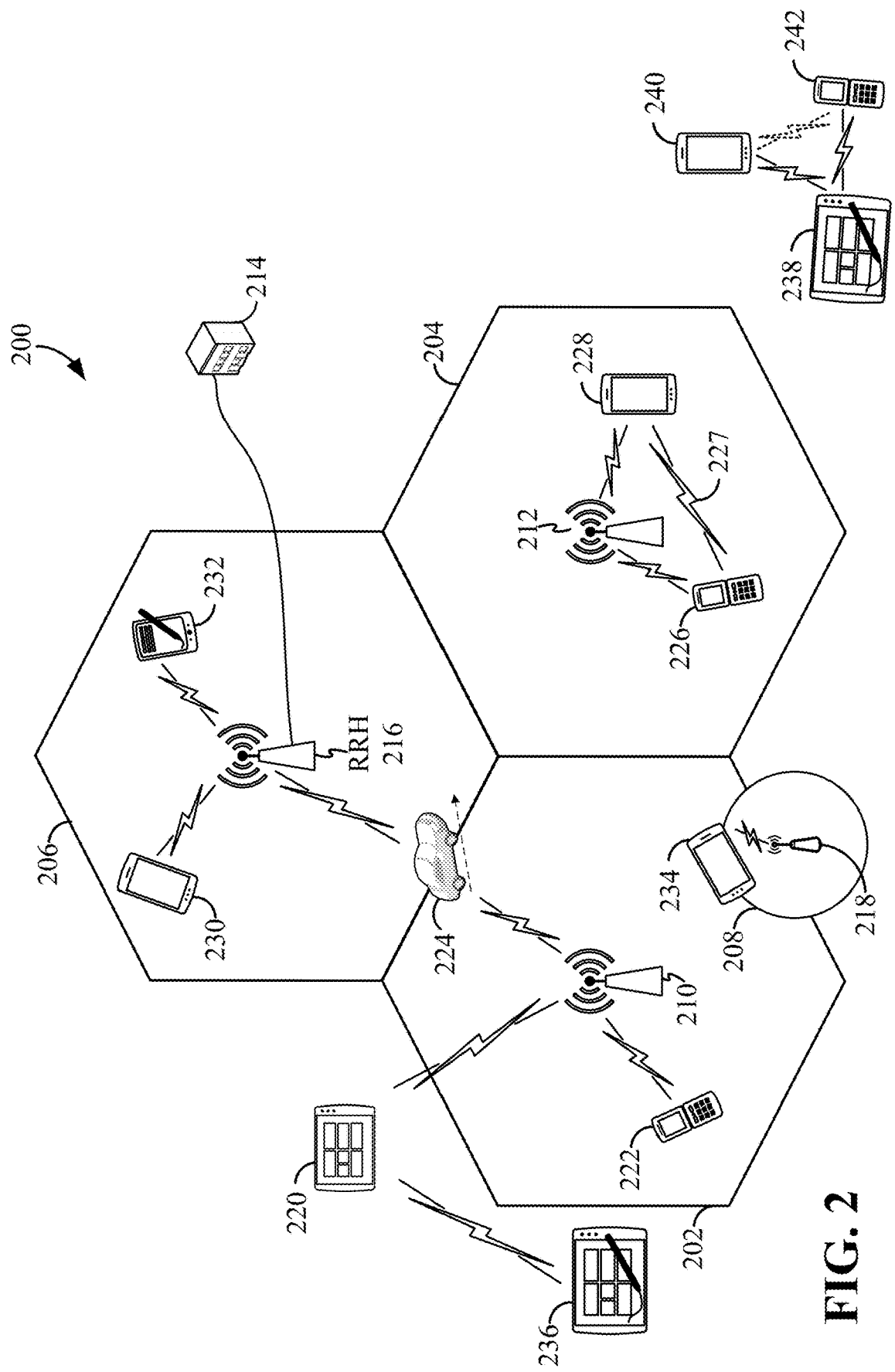
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a mobile device 220, which may be configured to function as a base station. That is, in some examples, a cell may not necessarily be stationary, and the geographic area of the cell may move according to the location of a mobile base station such as the mobile device 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., mobile device 220) may be configured to function as a UE. For example, the mobile device 220 may operate within cell 202 by communicating with base station 210.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication. In either case, such sidelink signaling 227 and 237 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 212 via D2D links (e.g., sidelinks 227 or 237). For example, one or more UEs (e.g., UE 228) within the coverage area of the base station 212 may operate as relaying UEs to extend the coverage of the base station 212, improve the transmission reliability to one or more UEs (e.g., UE 226), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 200 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 200 may utilize one or more multiplexing and multiple access algorithms to enable simultaneous communication of the various devices. For example, 5G NR specifications provide multiple access for UL or reverse link transmissions from UEs 222 and 224 to base station 210, and for multiplexing DL or forward link transmissions from the base station 210 to UEs 222 and 224 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 200 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
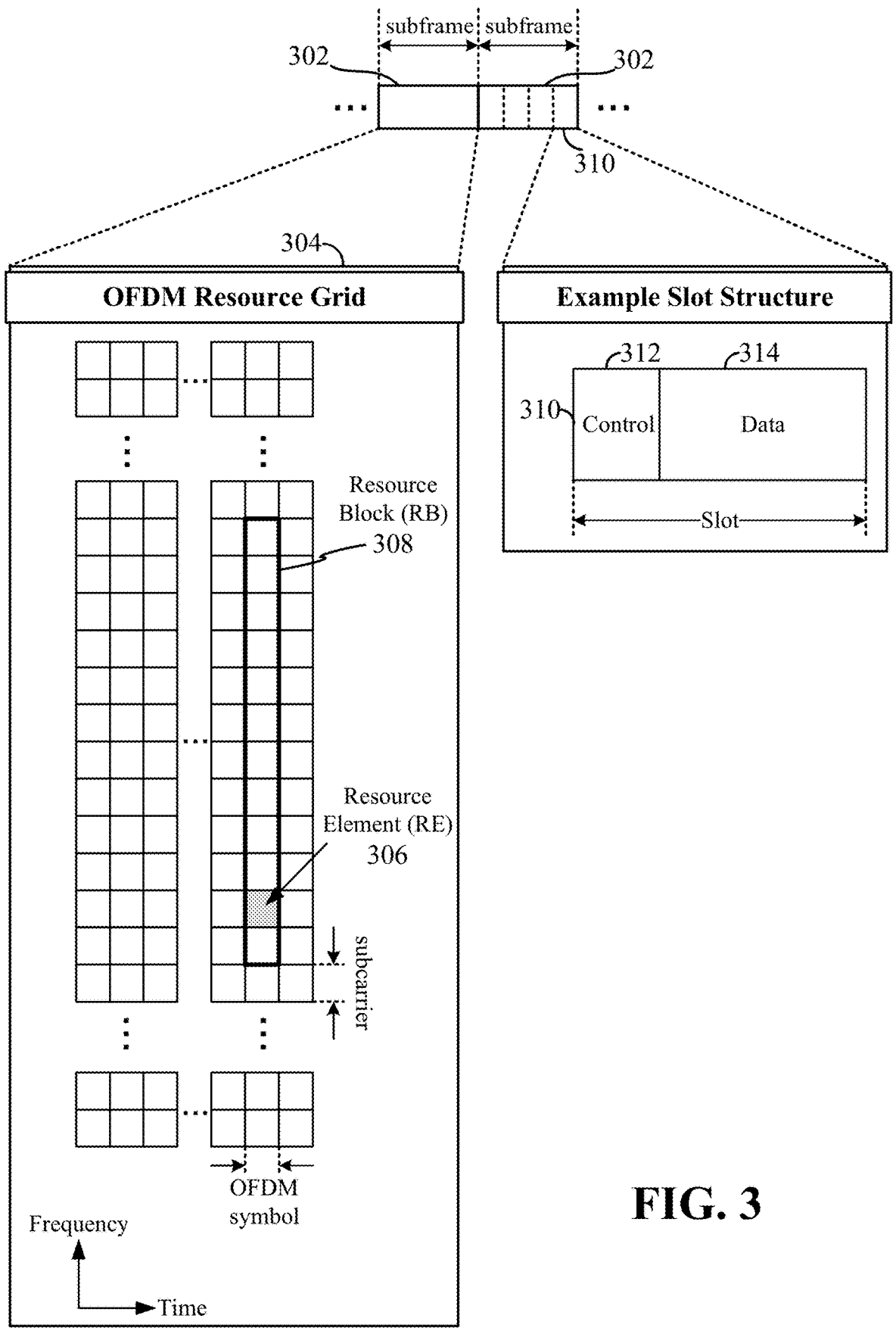
FIG. 3 is a schematic illustration of an organization of wireless resources in an air interface utilizing orthogonal frequency divisional multiplexing (OFDM) according to some embodiments.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier x 1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 12 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 20, 80, or 120 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 4:
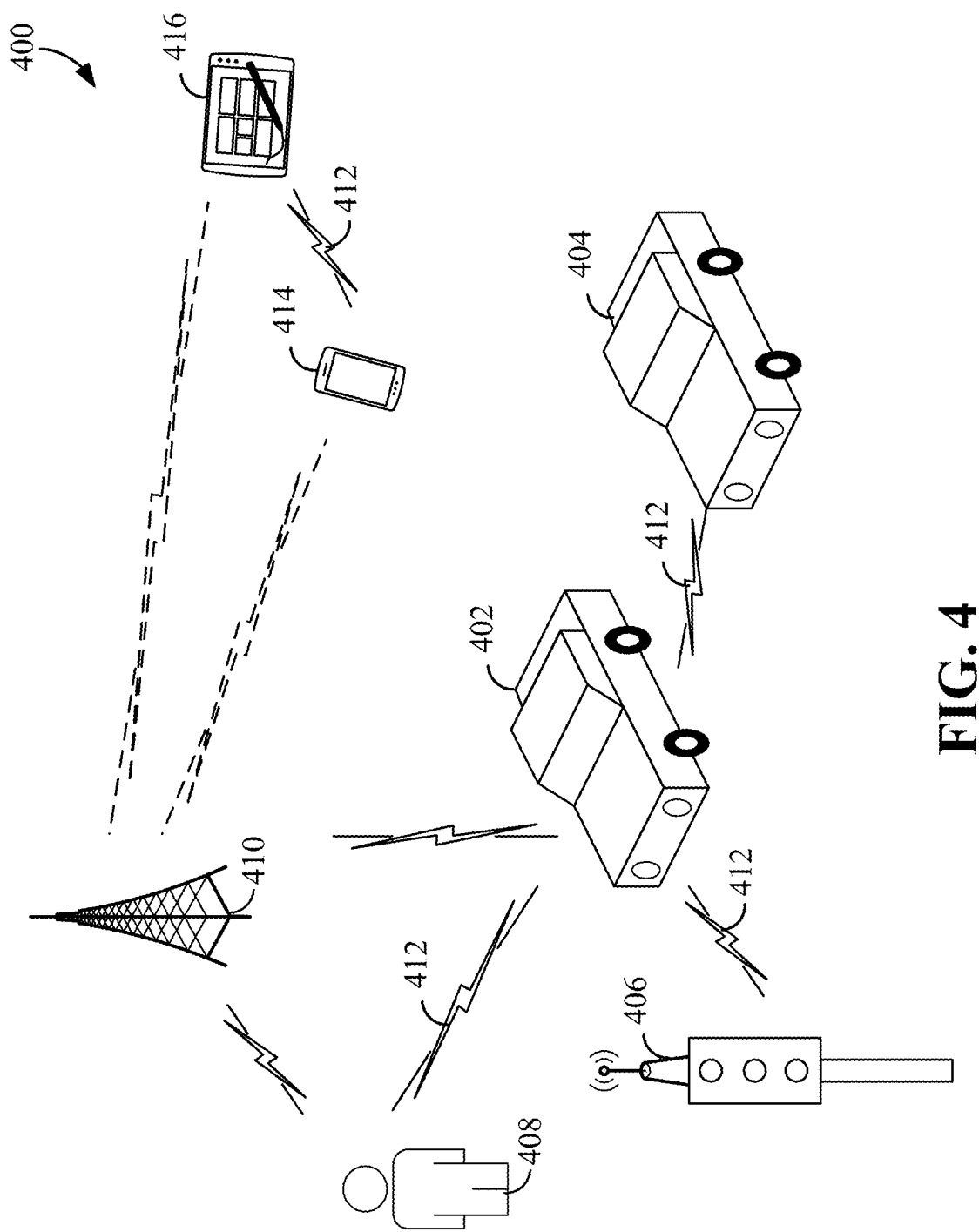
FIG. 4 illustrates an example of a wireless communication network configured to support D2D or sidelink communication.

FIG. 4 illustrates an example of a wireless communication network 400 configured to support D2D or sidelink communication. In some examples, sidelink communication may include V2X communication. V2X communication involves the wireless exchange of information directly between not only vehicles (e.g., vehicles 402 and 404) themselves, but also directly between vehicles 402/404 and infrastructure (e.g., roadside units (RSUs) 406), such as streetlights, buildings, traffic cameras, tollbooths or other stationary objects, vehicles 402/404 and pedestrians 408, and vehicles 402/404 and wireless communication networks (e.g., base station 410). In some examples, V2X communication may be implemented in accordance with the New Radio (NR) cellular V2X standard defined by 3GPP, Release 16, or other suitable standard.

V2X communication enables vehicles 402 and 404 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 402 and 404 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 408 may be utilized to trigger a warning sound, vibration, flashing light, etc., in case of imminent danger.

The sidelink communication between vehicle-UEs (V-UEs) 402 and 404 or between a V-UE 402 or 404 and either an RSU 406 or a pedestrian-UE (P-UE) 408 may occur over a sidelink 412 utilizing a proximity service (ProSe) PC5 interface. In various aspects of the disclosure, the PC5 interface may further be utilized to support D2D sidelink 412 communication in other proximity use cases (e.g., other than V2X). Examples of other proximity use cases may include smart wearables, public safety, or commercial (e.g., entertainment, education, office, medical, and/or interactive) based proximity services. In the example shown in FIG. 4, ProSe communication may further occur between UEs 414 and 416.

ProSe communication may support different operational scenarios, such as in-coverage, out-of-coverage, and partial coverage. Out-of-coverage refers to a scenario in which UEs (e.g., UEs 414 and 416) are outside of the coverage area of a base station (e.g., base station 410), but each are still configured for ProSe communication. Partial coverage refers to a scenario in which some of the UEs (e.g., V-UE 404) are outside of the coverage area of the base station 410, while other UEs (e.g., V-UE 402 and P-UE 408) are in communication with the base station 410. In-coverage refers to a scenario in which UEs (e.g., V-UE 402 and P-UE 408) are in communication with the base station 410 (e.g., gNB) via a Uu (e.g., cellular interface) connection to receive ProSe service authorization and provisioning information to support ProSe operations.

To facilitate D2D sidelink communication between, for example, UEs 414 and 416 over the sidelink 412, the UEs 414 and 416 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 412. For example, the discovery signal may be utilized by the UE 416 to measure the signal strength and channel status of a potential sidelink (e.g., sidelink 412) with another UE (e.g., UE 414). The UE 416 may utilize the measurement results to select a UE (e.g., UE 414) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either pre-configured (e.g., a factory setting on the UE determined, for example, by sidelink standards or specifications) or configured by a base station (e.g., base station 410).

In addition, there may be two main resource allocation modes of operation for sidelink (e.g., PC5) communications. In a first mode, Mode 1, a base station (e.g., gNB) 410 may allocate resources to sidelink devices (e.g., V2X devices or other sidelink devices) for sidelink communication between the sidelink devices in various manners. For example, the base station 410 may allocate sidelink resources dynamically (e.g., a dynamic grant) to sidelink devices, in response to requests for sidelink resources from the sidelink devices. The base station 410 may further activate preconfigured sidelink grants (e.g., configured grants) for sidelink communication among the sidelink devices. In Mode 1, sidelink feedback may be reported back to the base station 410 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may also be transmitted on the PSCCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

FIGS. 5A and 5B are diagrams illustrating examples of sidelink slot structures according to some aspects. The sidelink slot structures may be utilized, for example, in a V2X or other D2D network implementing sidelink. In the examples shown in FIGS. 5A and 5B, time is in the horizontal direction with units of symbols 502 (e.g., OFDM symbols); and frequency is in the vertical direction. Here, a carrier bandwidth 504 allocated for sidelink wireless communication is illustrated along the frequency axis. The carrier bandwidth 504 may include a plurality of sub-channels, where each sub-channel may include a configurable number of PRBs (e.g., 10, 14, 20, 24, 40, 44, or 100 PRB s).

Each of FIGS. 5A and 5B illustrate an example of a respective slot 500a or 500b including fourteen symbols 502 that may be used for sidelink communication. However, it should be understood that sidelink communication can be configured to occupy fewer than fourteen symbols in a slot 500a or 500b, and the disclosure is not limited to any particular number of symbols 502. Each sidelink slot 500a and 500b includes a physical sidelink control channel (PSCCH) 506 occupying a control region 518 of the slot 500a and 500b and a physical sidelink shared channel (PSSCH) 508 occupying a data region 520 of the slot 500a and 500b. The PSCCH 506 and PSSCH 508 are each transmitted on one or more symbols 502 of the slot 500a. The PSCCH 506 includes, for example, SCI-1 that schedules transmission of data traffic on time-frequency resources of the corresponding PSSCH 508. As shown in FIGS. 5A and 5B, the PSCCH 506 and corresponding PSSCH 508 are transmitted in the same slot 500a and 500b. In other examples, the PSCCH 506 may schedule a PSSCH in a subsequent slot.

In some examples, the PSCCH 506 duration is configured to be two or three symbols. In addition, the PSCCH 506 may be configured to span a configurable number of PRBs, limited to a single sub-channel. For example, the PSCCH 506 may span 10, 12, 14, 20, or 24 PRBs of a single sub-channel. A DMRS may further be present in every PSCCH symbol. In some examples, the DMRS may be placed on every fourth RE of the PSCCH 506. A frequency domain orthogonal cover code (FD-OCC) may further be applied to the PSCCH DMRS to reduce the impact of colliding PSCCH transmissions on the sidelink channel. For example, a transmitting UE may randomly select the FD-OCC from a set of pre-defined FD-OCCs. In each of the examples shown in FIGS. 5A and 5B, the starting symbol for the PSCCH 506 is the second symbol of the corresponding slot 500a or 500b and the PSCCH 506 spans three symbols 502.

The PSSCH 508 may be time-division multiplexed (TDMed) with the PSCCH 506 and/or frequency-division multiplexed (FDMed) with the PSCCH 506. In the example shown in FIG. 5A, the PSSCH 508 includes a first portion 508a that is TDMed with the PSCCH 506 and a second portion 508b that is FDMed with the PSCCH 506. In the example shown in FIG. 5B, the PSSCH 508 is TDMed with the PSCCH 506.

One and two layer transmissions of the PSSCH 508 may be supported with various modulation orders (e.g., QPSK, 16-QAM, 64-QAM and 246-QAM). In addition, the PSSCH 508 may include DMRSs 514 configured in a two, three, or four symbol DMRS pattern. For example, slot 500a shown in FIG. 5A illustrates a two symbol DMRS pattern, while slot 500b shown in FIG. 5B illustrates a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 508 symbols in the slot 500a or 500b. In addition, a gap symbol 516 is present after the PSSCH 508 in each slot 500a and 500b.

Each slot 500a and 500b further includes SCI-2 512 mapped to contiguous RBs in the PSSCH 508 starting from the first symbol containing a PSSCH DMRS. In the example shown in FIG. 5A, the first symbol containing a PSSCH DMRS is the fifth symbol occurring immediately after the last symbol carrying the PSCCH 506. Therefore, the SCI-2 512 is mapped to RBs within the fifth symbol. In the example shown in FIG. 5B, the first symbol containing a PSSCH DMRS is the second symbol, which also includes the PSCCH 506. In addition, the SCI-2/PSSCH DMRS 512 are shown spanning symbols two through five. As a result, the SCI-2/PSSCH DMRS 512 may be FDMed with the PSCCH 506 in symbols two through four and TDMed with the PSCCH 506 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 506 may be blind decoded at the receiving wireless communication device. However, since the format, starting location, and number of REs of the SCI-2 512 may be derived from the SCI-1, blind decoding of SCI-2 is not needed at the receiver (receiving UE).

In each of FIGS. 5A and 5B, the second symbol of each slot 500a and 500b is copied onto (repeated on) a first symbol 510 thereof for automatic gain control (AGC) settling. For example, in FIG. 5A, the second symbol containing the PSCCH 506 FDMed with the PSSCH 508b may be transmitted on both the first symbol and the second symbol. In the example shown in FIG. 5B, the second symbol containing the PSCCH 506 FDMed with the SCI-2/PSSCH DMRS 512 may be transmitted on both the first symbol and the second symbol.

Figure 6:
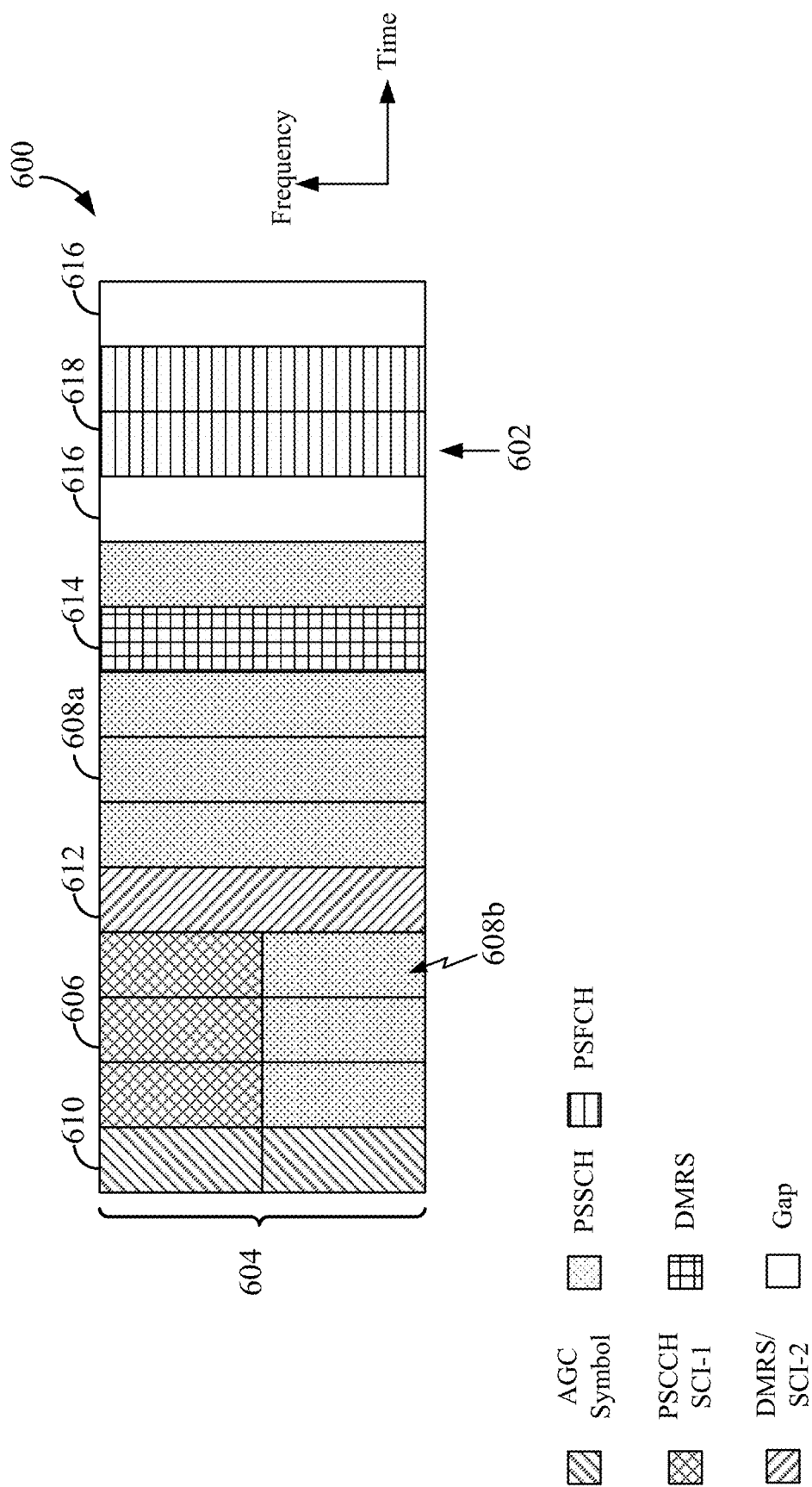
FIG. 6 is a diagram illustrating an example of a sidelink slot structure with feedback resources according to some aspects.

FIG. 6 is a diagram illustrating an example of a sidelink slot structure with feedback resources according to some aspects. The sidelink slot structure may be utilized, for example, in a V2X or other D2D network implementing sidelink. In the example shown in FIG. 6, time is in the horizontal direction with units of symbols 602 (e.g., OFDM symbols); and frequency is in the vertical direction. Here, a carrier bandwidth 604 allocated for sidelink wireless communication is illustrated along the frequency axis. A slot 600 having the slot structure shown in FIG. 6 includes fourteen symbols 602 that may be used for sidelink communication. However, it should be understood that sidelink communication can be configured to occupy fewer than fourteen symbols in a slot 600, and the disclosure is not limited to any particular number of symbols 602.

As in the examples shown in FIG. 6, the sidelink slot 600 includes a PSCCH 606 occupying a control region of the slot 600 and a PSSCH 608 occupying a data region 620 of the slot 600. The PSCCH 606 and PSSCH 608 are each transmitted on one or more symbols 602 of the slot 600. The PSCCH 606 includes, for example, SCI-1 that schedules transmission of data traffic on time-frequency resources of the corresponding PSSCH 608. As shown in FIG. 6, the starting symbol for the PSCCH 606 is the second symbol of the slot 600 and the PSCCH 606 spans three symbols 602. The PSSCH 608 may be time-division multiplexed (TDMed) with the PSCCH 606 and/or frequency-division multiplexed (FDMed) with the PSCCH 606. In the example shown in FIG. 6, the PSSCH 608 includes a first portion 608a that is TDMed with the PSCCH 606 and a second portion 608b that is FDMed with the PSCCH 606.

The PSSCH 608 may further include a DMRSs 614 configured in a two, three, or four symbol DMRS pattern. For example, slot 600 shown in FIG. 6 illustrates a two symbol DMRS pattern. In some examples, the transmitting UE can select the DMRS pattern and indicate the selected DMRS pattern in SCI-1, according to channel conditions. The DMRS pattern may be selected, for example, based on the number of PSSCH 608 symbols in the slot 600. In addition, a gap symbol 616 is present after the PSSCH 608 in the slot 600.

The slot 600 further includes SCI-2 612 mapped to contiguous RBs in the PSSCH 608 starting from the first symbol containing a PSSCH DMRS. In the example shown in FIG. 6, the first symbol containing a PSSCH DMRS is the fifth symbol occurring immediately after the last symbol carrying the PSCCH 606. Therefore, the SCI-2 612 is mapped to RBs within the fifth symbol.

In addition, as shown in FIG. 6, the second symbol of the slot 600 is copied onto (repeated on) a first symbol 610 thereof for automatic gain control (AGC) settling. For example, in FIG. 6, the second symbol containing the PSCCH 606 FDMed with the PSSCH 608b may be transmitted on both the first symbol and the second symbol.

HARQ feedback may further be transmitted on a physical sidelink feedback channel (PSFCH) 618 in a configurable resource period of 0, 1, 2, or 4 slots. In sidelink slots (e.g., slot 600) containing the PSFCH 618, one symbol 602 may be allocated to the PSFCH 618, and the PSFCH 618 may be copied onto (repeated on) a previous symbol for AGC settling. In the example shown in FIG. 6, the PSFCH 618 is transmitted on the thirteenth symbol and copied onto the twelfth symbol in the slot 600c. A gap symbol 616 may further be placed after the PSFCH symbols 618.

In some examples, there is a mapping between the PSSCH 608 and the corresponding PSFCH resource. The mapping may be based on, for example, the starting sub-channel of the PSSCH 608, the slot containing the PSSCH 608, the source ID and the destination ID. In addition, the PSFCH can be enabled for unicast and groupcast communication. For unicast, the PSFCH may include one ACK/NACK bit. For groupcast, there may be two feedback modes for the PSFCH. In a first groupcast PSFCH mode, the receiving UE transmits only NACK, whereas in a second groupcast PSFCH mode, the receiving UE may transmit either ACK or NACK. The number of available PSFCH resources may be equal to or greater than the number of UEs in the second groupcast PSFCH mode.

A reconfigurable intelligent surface (RIS) device, or reflecting intelligent surface device, may be used to reflect electromagnetic waves from a transmitter to a receiver. For example, by configuring RIS parameters for the RIS device, such as phases, the RIS device may be configured to reflect electromagnetic waves communicated in one direction to another direction. In an aspect, another device such as a base station may be configured to communicate with the RIS device to configure the RIS device, e.g., with certain RIS parameters. The RIS device may be a passive device that does not generate any energy or signal by itself. Instead, the RIS device may be capable of reflecting an energy or a signal from another device. To be clear, the RIS device may contain active components but the RIS device as a whole may not generate any energy or signal by itself. Further, one of the advantages of the RIS device may be its cost that is generally lower than traditional distributed antennas systems or repeaters.

The RIS device may have a large number of reconfigurable elements, spread out over the RIS device, which allows the RSI device to use as phased arrays for beamforming to change a receive direction of a signal and a transmit direction to reflect the received signal. The reconfigurable elements may be passive elements that are used to redirect/reflect a signal received by the reconfigurable elements and may not be used to actively transmit a signal independently from the signal received by the reconfigurable elements. In one example, a RIS device may have 256 reconfigurable elements. The beamforming of the reconfigurable elements of the RIS device may be configured differently for different timing. For example, the beamforming of the reconfigurable elements of the RIS device may be configured to a first communication pattern to receive a signal in a first direction and to reflect the received signal in a second direction for one period of time, and may be configured to a second communication pattern to receive a signal in a third direction and to reflect the received signal in a fourth direction for another period of time, where the second communication pattern is different from the first communication pattern.

Figure 7:
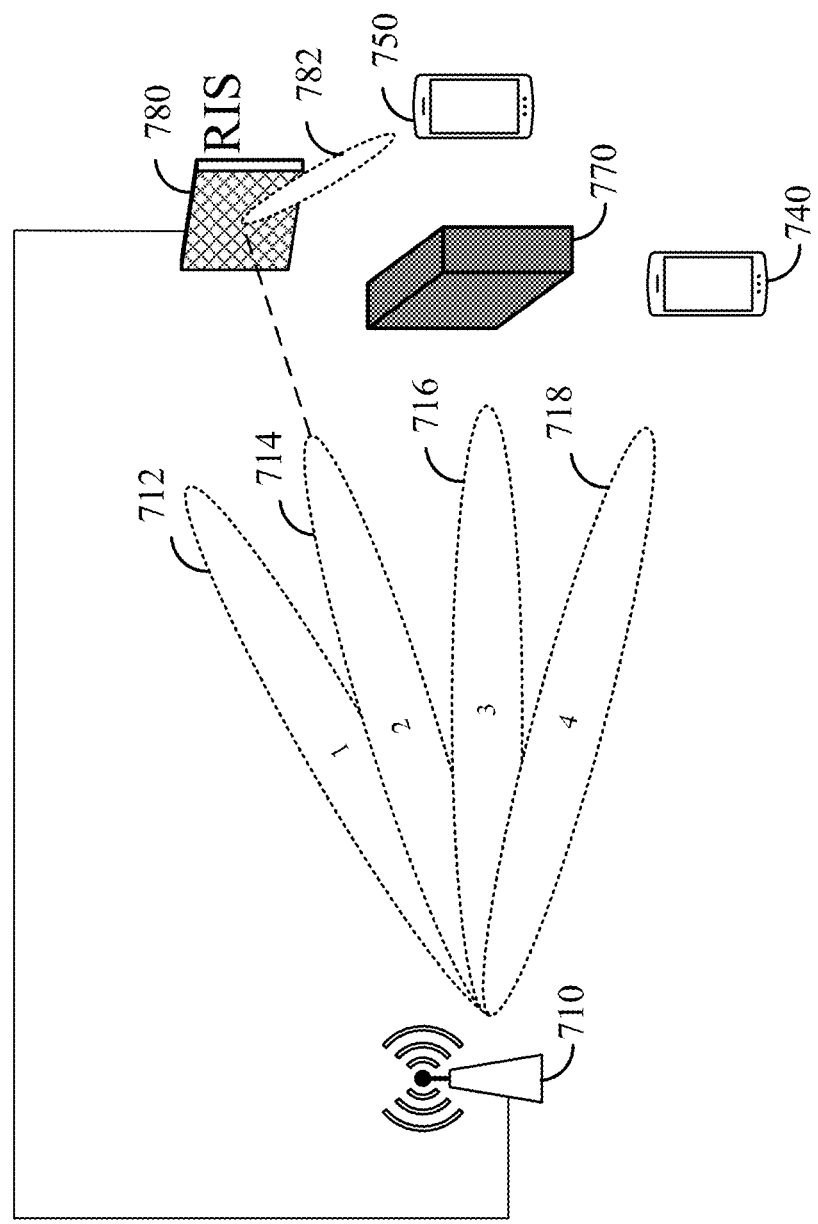
FIG. 7 is an example diagram illustrating a use of a reconfigurable intelligent surface (RIS) device, according to some aspects.

FIG. 7 is an example diagram 700 illustrating a use of a reconfigurable intelligent surface device, according to some aspects. In FIG. 7, a base station 710 may be configured to utilize four different beams to wirelessly communicate in four different directions, respectively. In particular, the base station 710 may be configured to transmit using a first beam 712, a second beam 714, a third beam 716, and a fourth beam 718, in four different directions, respectively. In FIG. 7, when the base station 710 transmits a signal using the fourth beam 718, a first UE 740 may be able to successfully receive the signal transmitted using the fourth beam 718. On the other hand, a second UE 750 may not be able to successfully receive a signal from the base station 710 without assistance from another device, at least because a signal from the base station 710 is blocked by a blockage 770 (e.g., any type of structure capable of blocking wireless signals). For example, the blockage 770 may completely block wireless signals or may partially block wireless signals.

When a RIS device 780 is deployed, the RIS device 780 may receive a signal transmitted from the base station 710 using the second beam 714, and reflect the signal in a direction toward the second UE 750, such that the second UE 750 may receive the reflected signal 782. The RIS device 780 in FIG. 7 has a connection to the base station 710, which may be a wired connection and/or a wireless connection. FIG. 7 shows that the RIS device 780 has a direct connection to the base station 710.

The RIS device 780 may be deployed based on a location of the blockage 770. In other words, the RIS device 780 may be positioned and/or configured based on the location of the blockage 770 (e.g., positioned and/or configured to help wireless communication signals extend around the blockage).

In some aspects, the RIS device may improve sidelink communication between UEs. The sidelink communication may share the same spectrum (e.g., licensed spectrum) as other communications in the cellular link (e.g., uplink). Hence, a first UE and a second UE may perform sidelink communication with each other during a time period when a base station is not transmitting a downlink communication to the first UE and the second UE. On the other hand, the first UE and the second UE may not perform sidelink communication during another time period when the base station is transmitting a downlink communication to the first UE and/or the second UE. Further, if a third UE is located sufficiently far from the first UE and the second UE, the first UE and the second UE may transmit sidelink communication to each other even when the third UE is communicating with the base station.

As discussed above, in Mode 1, the base station may control the resource allocation for a sidelink communication. On the other hand, in Mode 2, a UE may determine resource allocation for a sidelink communication by sensing signals and reserving available resources for the sidelink communication based on the sensing. The UE may utilize resources that are not reserved by another device and/or resources that are reserved by another device and that are sufficiently far away from the UE as to not cause a signal interference with the UE. For example, in Mode 2, the UE may determine available resources based on sensing of UE activities around the UE. In an example, in Mode 2, the UE may determine available resources by measuring signal strength (e.g., reference signal received power) in frequency resources, and may determine a frequency resource with signal strength exceeding a signal strength threshold is occupied and therefore not available. The UE may further determine that a frequency resource with signal strength not exceeding the signal strength threshold is available for the sidelink communication, and thus the UE may reserve this frequency resource for the sidelink communication.

Figure 8:
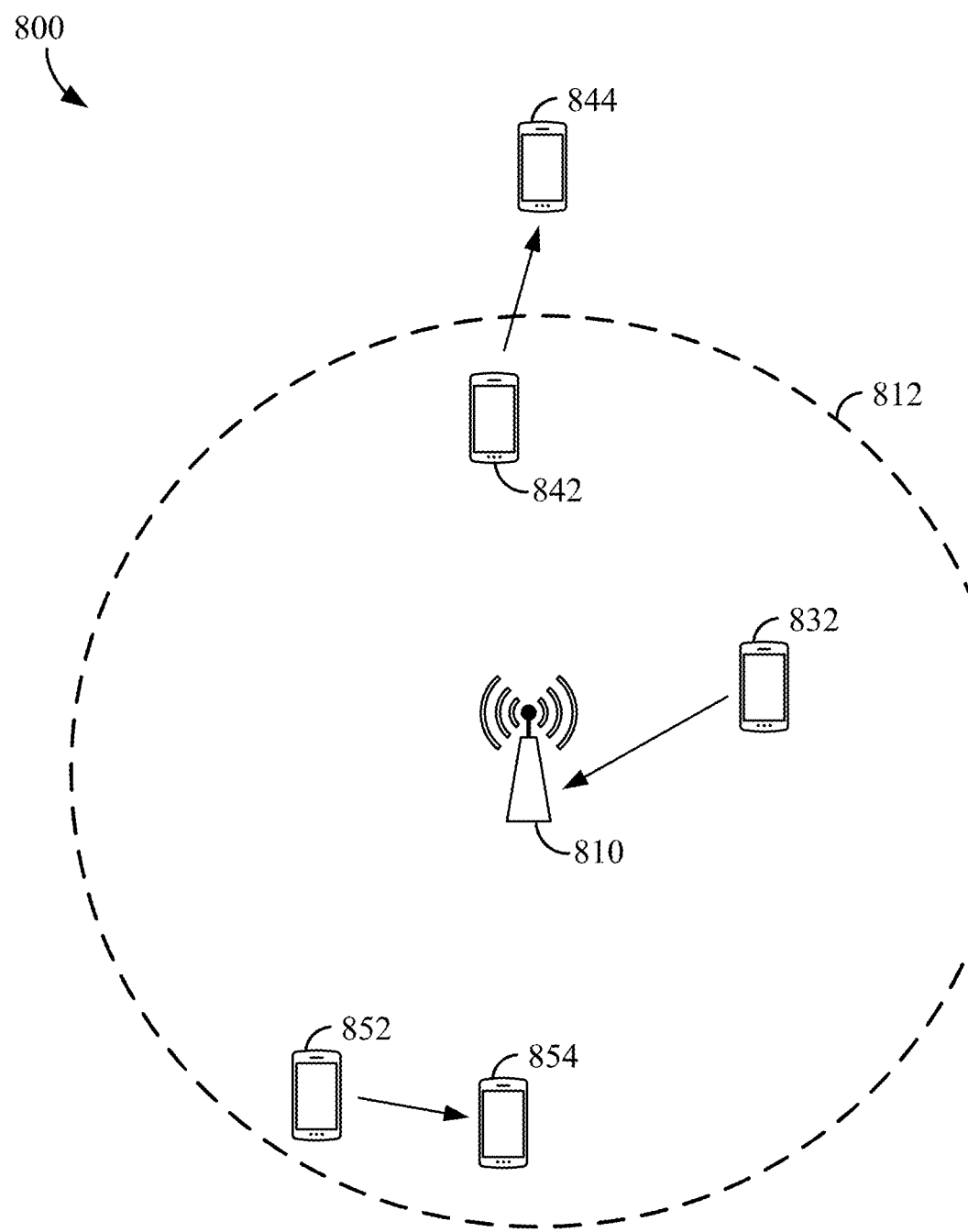
FIG. 8 is an example diagram illustrating various types of wireless communications, according to some aspects.

FIG. 8 is an example diagram illustrating various types of wireless communications, according to some aspects. In FIG. 8, a base station 810 operates a cell 812 surrounding the base station 810. A UE 832 transmits an uplink communication to the base station 810. A UE 842 within the cell 812 sends a sidelink communication to a UE 844 outside of the cell. A UE 852 within the cell 812 sends a sidelink communication to a UE 854 within the cell 812.

In one example, the UE 852 may sense signals (e.g., resource reservation signals) in frequency resources. Although the UEs 832 and 842 may transmit signals using particular frequency resources, the UEs 832 and 842 are far from the UE 852 and thus the signal strength measured in these particular frequency resources may not exceed the frequency threshold. Therefore, these particular frequency resources may be available for the UE 852 to reserve for a sidelink communication with the UE 854.

When a RIS device is deployed, the RIS device may change the wireless environment in that the RIS device may change a direction of a signal by reflecting the signal to another direction. The RIS device may be used to reflect a signal for a Uu communication and may be used to reflect a signal for a sidelink communication. Configurations of the RIS may be dynamically changed over time (e.g., from one slot to another slot). For example, as discussed above, the RIS device may be configured to use one communication pattern to reflect a signal from a particular direction towards another direction, and later may be changed to use a different communication pattern. In an aspect, the RIS device may be configured to be visible (e.g., active) for one time period, and may be configured to be invisible (e.g., effectively invisible for wireless communication signals) for another time period. When the RIS device is visible, the RIS device may be active in operation or turned on, so as to be effective in reflecting wireless communication signals in a particular direction. When the RIS device is invisible, the RIS device may be inactive in operation or turned off, so as to be ineffective in reflecting wireless communication signals in a particular direction. For example, the RIS device may be configured to become invisible when no UE is present near a blockage that blocks a signal, whereas, if a UE moves to a location near the blockage, the RIS device may be configured to become visible in order to reflect a signal toward the UE.

If the RIS device is configured to be visible for a time period, the visible RIS device may reflect a signal according to a configured communication pattern for such a time period. On the other hand, if the RIS device is configured to be invisible for another time period, the invisible RIS device may not reflect a signal according to a communication pattern for such a time period but may rather allow the signal to randomly propagate in various random directions. Therefore, the RIS device may be used to control a signal propagation in a wireless environment. Further, while a sidelink communication and a Uu communication may be performed on a same carrier or on different component carriers or different frequency bands, a RIS device may be configured for a wide bandwidth that contains both a frequency range for the sidelink communication and a frequency range for the Uu communication. This may be due to the lack of a bandpass filter within the RIS device.

As discussed above, the UE may sense signals for particular resources (e.g., by measuring signal strength) and may determine whether the particular resources are available resources to reserve for a sidelink communication based on the sensing. However, if the configurations of the RIS device are dynamically changed over time and thus dynamically change the wireless environment, the UE's sensing of signals for particular resources at one time period may not be reliable information for a subsequent time period to determine if the particular resources are available. For example, because a channel strength on a sidelink between UEs may vary depending on whether the RIS device is configured to be visible or invisible, and/or based on changes in parameters such as a communication pattern, the UE sensing of signals for particular resources may be unreliable. In other words, for two UEs communicating with each other via a sidelink communication, their channel quality for the sidelink communication may experience significant changes over time due to changes in configurations of the RIS device over time, which may make CSI/CQI feedback and/or a transmit power control less reliable.

Figure 9:
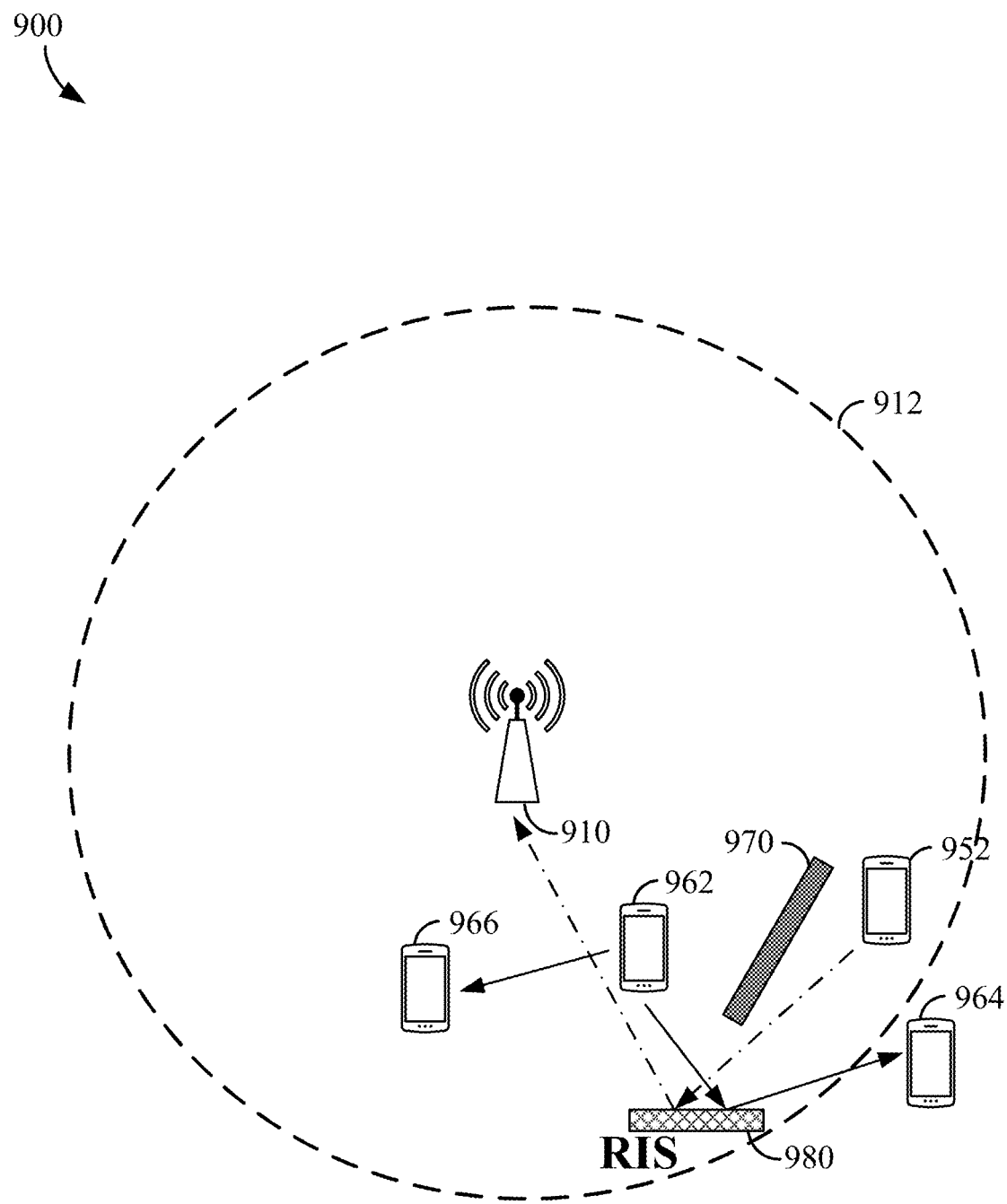
FIG. 9 is an example diagram illustrating various types of wireless communications when a reconfigurable intelligent surface device is deployed and a blockage is present, according to some aspects.

FIG. 9 is an example diagram illustrating various types of wireless communications when a reconfigurable intelligent surface device is deployed and a blockage is present, according to some aspects. In FIG. 9, a base station 910 operates a cell 912 surrounding the base station 910. In FIG. 9, for a first time period, a RIS device 980 may be configured to be visible with a first communication pattern to receive an uplink signal in a first direction from a UE 952 and to reflect the received uplink signal in a second direction toward the base station 910. For a second time period different from the first time period, the RIS device 980 may be configured to be visible with a second communication pattern to receive a sidelink signal in a third direction from a UE 962 and to reflect the received sidelink signal to a fourth direction toward a UE 964. For a third time period different from the first time period and the second time period, the RIS device 980 may be configured to be invisible and thus may not reflect any signal to a particular direction. Hence, over the first, second, and third time periods, the signal propagation changes near the RIS device 980 and thus the wireless environment changes. Hence, for example, if the UE 962 senses signals in a particular resource, because the sensing of signals may produce different results during the first, second, and third time periods, determination of available resources based on the sensing may be unreliable.

Further, a transmit power control by a UE may become unreliable due to the wireless environment changes over time. For example, for the first time period, because the RIS device 980 is configured with the first communication pattern to reflect the uplink signal from the UE 952 toward the base station 910, an optimal transmit power for a sidelink communication by the UE 962 (e.g., to a UE 966) may be low to avoid interfering with the uplink signal by the UE 952. However, for the second time period or the third time period, because the RIS device 980 is not in a communication pattern to reflect the uplink signal from the UE 952 toward the base station 910, an optimal transmit power for a sidelink communication by the UE 962 (e.g., to a UE 966) may be high. Therefore, due to the changes of the wireless environment over time, the UE 962 may not be able to reliably set an optimal transmit power, which makes the transmit power control difficult.

According to some aspects of the disclosure, a UE (e.g., first UE) may determine RIS location information for a RIS device, configure sidelink communication parameters based on the RIS location information, and perform a sidelink communication with a second UE based on the sidelink communication parameters. As discussed above, the RIS device may affect a wireless environment over time by changing signal propagations over time, and thus devices near the RIS device may be affected by the RIS device. Hence, in an aspect, the first UE may perform the sidelink communication differently depending on the RIS location information by configuring sidelink communication parameters based on the RIS location. The RIS device may be controlled by a base station, e.g., via a wired connection and/or a wireless connection. In an aspect, the base station may determine the RIS location information of the RIS controlled by the base station, and transmit the RIS location information to the first UE, such that the first UE determining the RIS location information may involve receiving the RIS location information transmitted from the base station. In an aspect, the base station may announce the RIS location information to multiple UEs via multicast or broadcast. For example, the RIS location information may be broadcast via a SIB, e.g., via a sidelink SIB (SL-SIB) or a Uu-SIB.

In an aspect, the RIS device may be located within a cell operated by the base station. In an aspect, the RIS device may be located within a preselected distance from the base station. Hence, in some aspects, the RIS device may be located near a particular base station that may control the RIS device.

In an aspect, the RIS location information may include a location coordinate of a location of the RIS and/or a RIS zone corresponding to an area surrounding the location of the RIS. In an aspect, the RIS location information may be based on global positioning system (GPS) information and/or global navigation satellite system (GNSS) information.

Figure 10:
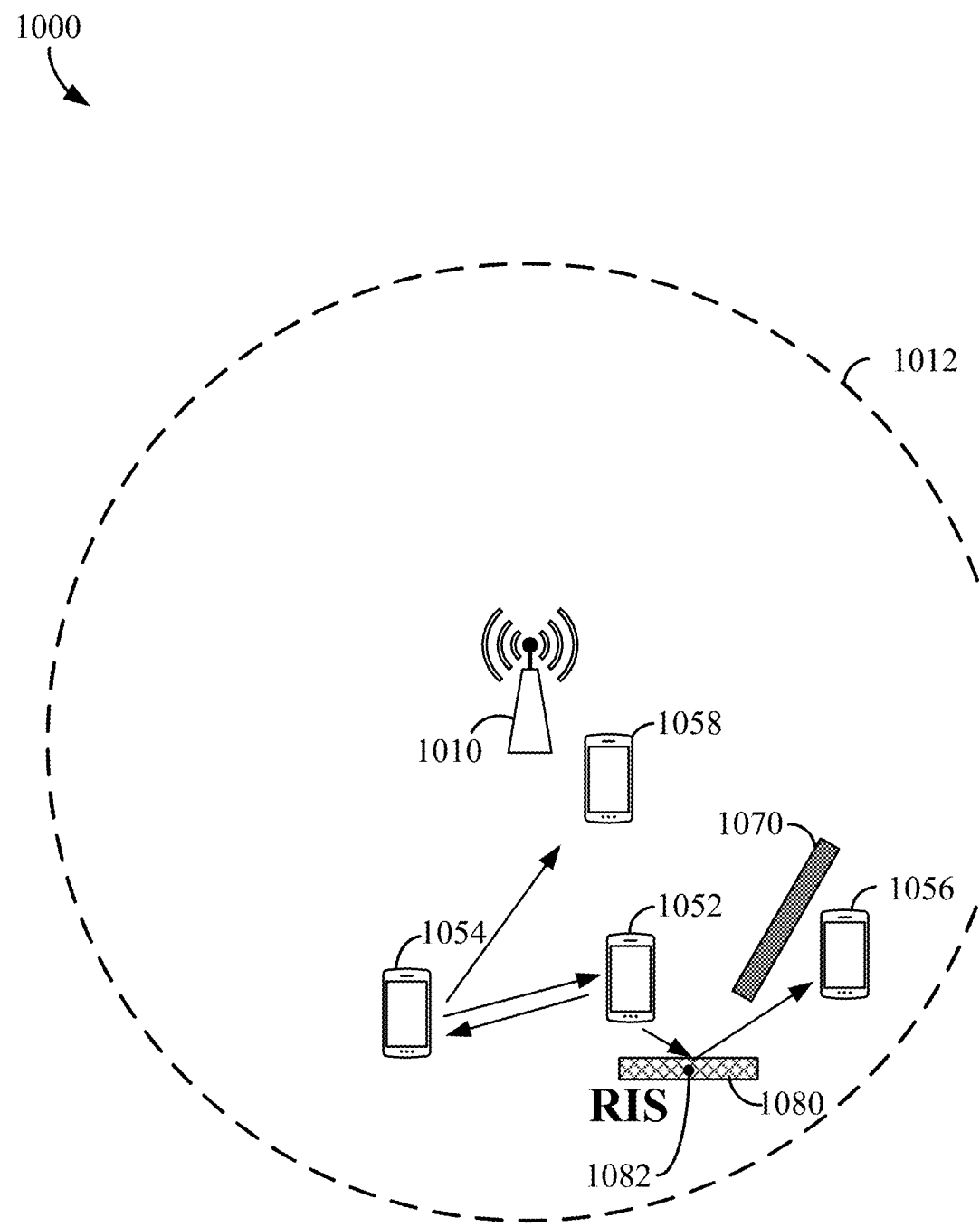
FIG. 10 is an example diagram illustrating a wireless communication environment including a base station, UEs and a reconfigurable intelligent surface device, according to some aspects.

FIG. 10 is an example diagram 1000 illustrating a wireless communication environment including a base station, UEs and a reconfigurable intelligent surface device, according to some aspects. In FIG. 10, a base station 1010 operates a cell 1012 surrounding the base station 1010. In FIG. 10, a RIS device 1080 is deployed, and a UE 1052 and a UE 1056 are near the RIS device 1080, while a UE 1054 and a UE 1058 are located far from the RIS device 1080. In an example, the RIS device 1080 may be controlled by the base station 1010. The UE 1052 and the UE 1054 may perform a sidelink communication with each other without relying on the RIS device 1080. The UE 1054 and the UE 1058 may also perform a sidelink communication with each other without relying on the RIS device 1080. On the other hand, because a blockage 1070 is present between the UE 1052 and the UE 1056, the UE 1052 and the UE 1056 may not be able to perform a sidelink communication with each other on their own. Hence, the UE 1052 and the UE 1056 may rely on the RIS device 1080 to perform a sidelink communication with each other. For example, the RIS device 1080 may be configured with a particular communication pattern such that the RIS device 1080 may reflect a sidelink communication signal transmitted from the UE 1052 toward the UE 1056 (and vice versa).

Each of the UEs 1052, 1054, and 1056 may determine RIS location information for the RIS device 1080, configure sidelink communication parameters based on the RIS location information, and perform a sidelink communication with another UE based on the sidelink communication parameters. For example, the UE 1052 may configure the sidelink communication parameters based on the RIS location information differently from the UE 1054 because the UE 1052 is located close to the RIS device 1080, while the UE 1054 is located far from the RIS device 1080. As discussed above, in an aspect, the RIS location information may include a location coordinate of a RIS location 1082 of the RIS device 1080.

In an aspect, a coverage area based on a cell of the base station may be divided into multiple zones. In this aspect, the RIS zone corresponding to an area surrounding the location of the RIS may be either one of the multiple zones that corresponds to the location of the RIS device or a set of zones of the multiple zones where the set of zones is predicted based on the location of the RIS device to be impacted by operation of the RIS device.

Figure 11:
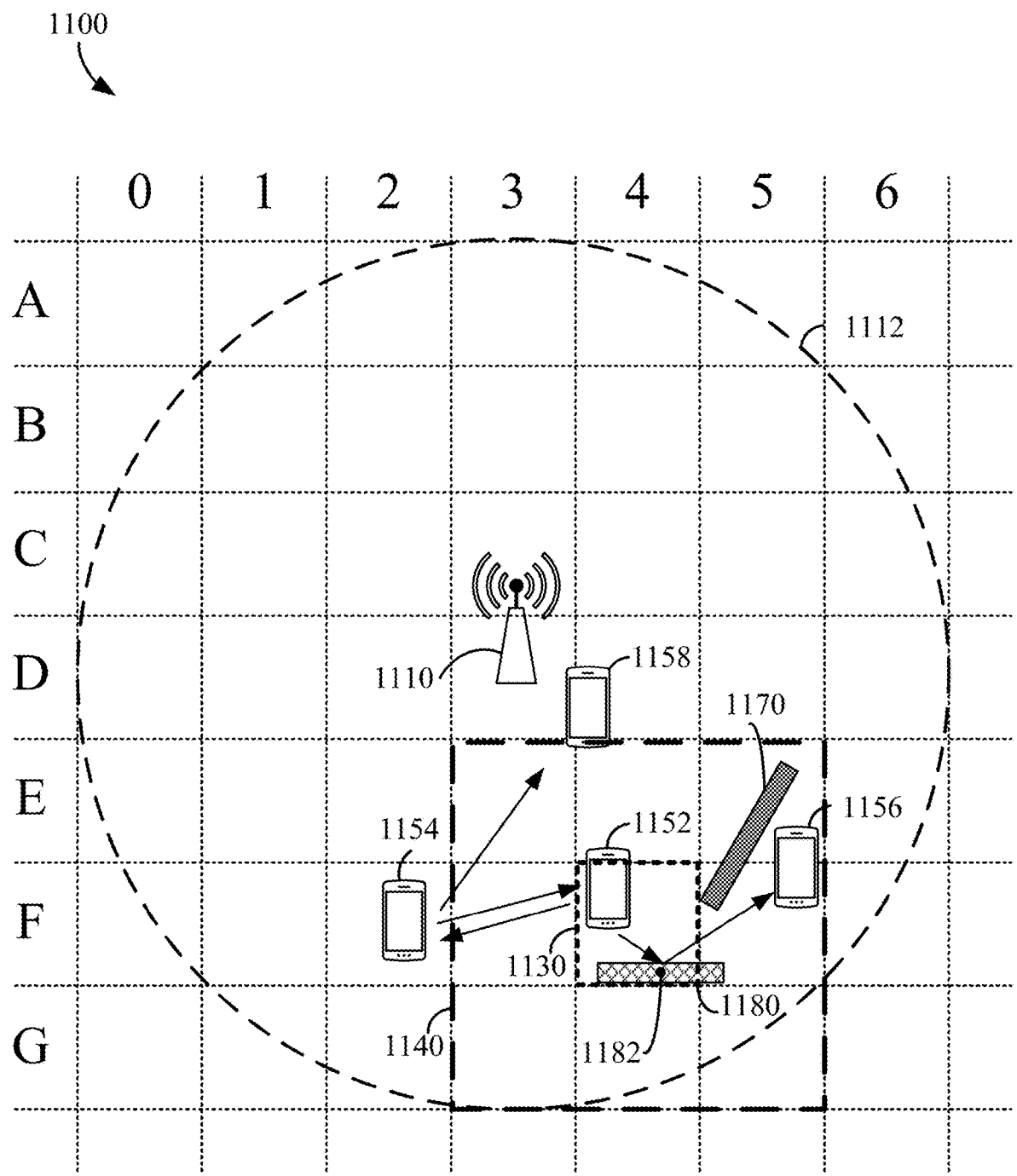
FIG. 11 is an example diagram illustrating a wireless communication environment including a base station, UEs and a reconfigurable intelligent surface device, where a coverage area of the base station is divided into multiple zones, according to some aspects.

FIG. 11 is an example diagram 1100 illustrating a wireless communication environment including a base station, UEs and a reconfigurable intelligent surface device, where a coverage area of the base station is divided into multiple zones, according to some aspects. In FIG. 11, a base station 1110 operates a cell 1112 surrounding the base station 1110. In FIG. 11, a RIS device 1180 is deployed, and a UE 1152 and a UE 1156 are near the RIS device 1180, while a UE 1154 and a UE 1158 are located far from the RIS device 1180. In an example, the RIS device 1180 may be controlled by the base station 1110. The UE 1152 and the UE 1154 may perform a sidelink communication with each other without relying on the RIS device 1180. The UE 1154 and the UE 1158 may also perform a sidelink communication with each other without relying on the RIS device 1180. On the other hand, because a blockage 1170 is present between the UE 1152 and the UE 1156, the UE 1152 and the UE 1156 may not be able to perform a sidelink communication with each other on their own. Hence, the UE 1152 and the UE 1156 may rely on the RIS device 1180 to perform a sidelink communication with each other. In an aspect, the base station 1110, the UEs 1152, 1154, 1156, and 1158, the RIS device 1180, and the blockage 1170 may respectively correspond to The base station 1010, the UEs 1052, 1054, 1056, and 1058, the RIS device 1080, and the blockage 1070 of FIG. 10.

In FIG. 11, a coverage area based on the cell 1112 of the base station 1110 is divided into multiple zones (e.g., by the base station 1110 or one or more of the UEs 1152, 1154, and 1156). In the example shown in FIG. 11, the multiple zones may be expressed by horizontal coordinates 0, 1, 2, 3, 4, 5, 6 and vertical coordinates A, B, C, D, E, F, and G. In an aspect, the RIS location information may include a RIS zone that is a single zone 1130, which is one of the multiple zones and corresponds to the location 1182 of the RIS device 1180, at coordinates (4, F). In another aspect, the RIS location information may include the RIS zone that includes a set of zones 1140 of the multiple zones, where the set of zones 1140 are predicted based on the location 1182 of the RIS device 1180 to be impacted by operation of the RIS device 1180. In FIG. 11, the set of zones 1140 are at coordinates (3, E), (4, E), (5, E), (3, F), (4, F), (5, F), (3, G), (4, G), and (5, G), which includes the single zone 1130 (e.g., central zone) and zones adjacent (e.g., surrounding zones) to the single zone 1130.

In an aspect, the base station may transmit, to one or more UEs, an indication of one or more slots during which the RIS device is configured to be visible for wireless communications. The first UE may receive the indication of one or more slots during which the RIS device configured to be visible and may configure the sidelink communication parameters based on the RIS location information for a sidelink communication during the one or more slots. In an example, the first UE may not configure the sidelink communication parameters (e.g., based on the RIS location information for a sidelink communication) outside of the one or more slots during which the RIS device is configured to be visible, e.g., when the RIS device is configured to be invisible. Stated another way, in an example, the first UE may configure the sidelink communication parameters only during slots when the base station has designated the RIS to be visible. For example, the indication of the one or more slots may be broadcast via a SIB, e.g., via a sidelink SIB (SL-SIB) or a Uu-SIB.

In an aspect, the first UE may determine whether the first UE is located within a proximity threshold from the RIS device based on the RIS location information. For example, if the first UE is located within the proximity threshold from the RIS device, the first UE may be close enough to the RIS device to be affected by an operation of the RIS device.

In one example, the proximity threshold from the RIS device may be a threshold distance from the RIS device, and the first UE may determine whether its own location is within the threshold distance from the location (e.g., location coordinates) of the RIS device. For example, referring to FIG. 10, the UE 1052 may determine that the UE 1052 is located within the threshold distance from the location coordinate of the RIS location 1082 of the RIS device 1080, while the UE 1054 may determine that the UE 1054 is not located within the threshold distance from the location coordinate of the RIS location 1082 of the RIS device 1080.

In one example, the first UE may determine that the first UE is located within the proximity threshold from the RIS device if the first UE is within the RIS zone corresponding to an area surrounding the location of the RIS. Referring to FIG. 11, in an example where the RIS zone is the single zone 1130 that corresponds to the location 1182 of the RIS device 1180, at coordinate (4, F), the UE 1152 may determine that the UE 1152 is within the proximity threshold from the RIS device because the UE 1152 is located within (or substantially located within) the single zone 1130, while the UEs 1154, 1156, and 1158 may respectively determine that the UEs 1154, 1156, and 1158 are not within the proximity threshold from the RIS device. Referring to FIG. 11, in an example where the RIS zone is the set of zones 1140 predicted to be impacted by operation of the RIS device 1180, the UE 1152 and the UE 1156 may respectively determine that each are within the proximity threshold from the RIS device 1180 because each are located within the set of zones 1140, while the UEs 1154 and 1158 may respectively determine that the UEs 1154 and 1158 are not within the proximity threshold from the RIS device.

If the first UE is near the RIS device and thus is affected by the operation of the RIS device, the first UE's sensing of signals for particular resources at one time period may not be reliable information for a subsequent time period to determine if the particular resources are available, as discussed above. In other words, because the RIS device may cause the wireless communication environment to dynamically change over time, the sensing of signals by the first UE may provide unreliable information that may cause reservation of resources that may not be optimal. For example, the first UE's sensing of signals for the particular resources to determine resources to reserve for a sidelink communication with another UE may be performed when the first UE is configured with Mode 2 to allocate resources for the sidelink communication. Hence, in an aspect, if the first UE determines that the first UE is located within a proximity threshold from the RIS device, the first UE configuring the one or more sidelink communication parameters based on the RIS location information may randomly select one or more resources for the sidelink communication, where the first UE may perform the sidelink communication using the one or more randomly selected resources. In other words, the first UE may perform a random selection of resources for a the sidelink communication if the first UE is located within the proximity threshold from the RIS device. For example, if the first UE is near the RIS device, it may be more beneficial to randomly select resources for the sidelink communication with another UE, instead of spending processing power and battery life of the first UE to generate unreliable sensing information and thereby unreliably determine resources to reserve.

Referring to FIG. 10, for example, the UE 1052 may determine that the UE 1052 is within the proximity threshold from the RIS device 1080. Thus, the UE 1052 may randomly select resources for the sidelink communication, and may perform a sidelink communication using the randomly selected resources. Because the UE 1052 performs the random selection of the resources for the sidelink communication when the UE 1052 performs the sidelink communication, the UE 1052 may not perform sensing of signals for particular resources and may not reserve resources for the sidelink communication in advance prior to the sidelink communication based on the sensing. On the other hand, for example, the UE 1054 of FIG. 10 may determine that the UE 1054 is not within the proximity threshold from the RIS device 1080, and thus may reserve sidelink resources for a sidelink communication based on sensing signals on various resources.

The first UE may determine whether at least one of the first UE or the second UE is located within a proximity threshold from the RIS device based on the RIS location information. If the first UE and/or the second UE (e.g., in the sidelink communication with the first UE) are near the RIS device, the first UE and/or the second UE may be affected by the RIS device, since the RIS device may cause the wireless communication environment to dynamically change over time. Due to the dynamic change in the wireless communication environment, a transmit power control by the first UE may become unreliable, as discussed above. For example, the RIS device may cause CQI or pathloss determination at the first UE and/or the second UE to become unreliable, and thus a transmit power control by the first UE based on the CQI or pathloss may become unreliable. In this case, the first UE may not attempt a transmit power control and/or may not request CQI or pathloss information from the second UE or provide CQI or pathloss information of the first UE to the second UE. Hence, in an aspect, if the first UE (e.g., sidelink transmitting UE) determines that the first UE is located within the proximity threshold from the RIS device and/or if the first UE determines that at least one of the first UE or the second UE (e.g., sidelink receiving UE) is located within the proximity threshold from the RIS device, the first UE may configure the one or more sidelink communication parameters based on the RIS location information by performing at least one of: (a) setting a transmit power of the first UE to a maximum transmit power, where the first UE may perform the sidelink communication using the maximum transmit power, (b) refraining from transmitting first CQI associated with the first UE, to the second UE, or (c) refraining from requesting CQI associated with the second UE, from the second UE.

As discussed above, if the first UE and/or the second UE in the sidelink communication with the first UE are near the RIS device, the first UE and/or the second UE may be affected by the RIS device that may cause the wireless communication environment to dynamically change over time, which may cause the sidelink communication between the first UE and the second UE to be unreliable. In such a case, it may be beneficial for the first UE to transmit sidelink transmissions with repetitions to improve the reliability of the sidelink communication with the second UE. Hence, in an aspect, if the first UE determines that the at least one of the first UE or the second UE is located within the proximity threshold from the RIS device, the first UE configuring the one or more sidelink communication parameters based on the RIS location information may configure the first UE to perform one or more repetitions of the sidelink communication (e.g., to the second UE).

Referring to FIG. 10, in an example, if the UE 1052 and the UE 1056 are in a sidelink communication with each other and the UE 1052 determines that at least one of the UE 1052 and the UE 1056 is located within the proximity threshold from the RIS device 1080, the UE 1052 may (a) set a transmit power of the UE 1052 to a maximum transmit power and may perform the sidelink communication with the UE 1056 using the maximum transmit power, and/or (b) refrain from transmitting first CQI associated with the UE 1052, to the UE 1056, or (c) refrain from requesting CQI associated with the UE 1056, from the UE 1056. In an example, if the UE 1052 and the UE 1056 are in a sidelink communication with each other and the UE 1052 determines that at least one of the UE 1052 and the UE 1056 is located within the proximity threshold from the RIS device 1080, the UE 1052 may configure the UE 1052 to perform one or more repetitions of the sidelink communication with the UE 1056. Further, referring to FIG. 10, in an example, if the UE 1054 and the UE 1058 are in a sidelink communication with each other and the UE 1054 determines that neither the UE 1054 nor the UE 1058 is located within the proximity threshold from the RIS device 1080, the UE 1054 may receive CQI associated with the UE 1058 from the UE 1058 to configure a transmit power of the UE 1054 according to the CQI associated with the UE 1058, and/or the UE 1058 may receive CQI associated with the UE 1054 to configure a transmit power of the UE 1058 according to the CQI associated with the UE 1054. Further, in an example, if the UE 1054 and the UE 1058 are in a sidelink communication with each other and the UE 1054 determines that neither the UE 1054 nor the UE 1058 is located within the proximity threshold from the RIS device 1080, the UE 1054 and/or the UE 1058 may not transmit a repetition of a sidelink communication communicated between the UE 1054 and the UE 1058.

In an aspect, UEs may be configured to perform a sidelink communication to each other only when the RIS device is deactivated or has become invisible, e.g., to avoid the effect of the RIS device dynamically changing the wireless communication environment over time. Hence, the first UE may determine one or more slots during which the RIS device is deactivated or is invisible, and the first UE configuring the one or more sidelink communication parameters based on the RIS location information may configure the first UE to perform the sidelink communication (e.g., with the second UE) during these one or more slots. In an aspect, the first UE may configure the first UE not to perform a sidelink communication during slots different from the one or more slots during which the RIS device is deactivated. In an aspect, the base station may transmit an indication of the one or more slots during which the RIS device is deactivated or is invisible, and the first UE may receive the indication of the one or more slots to determine the one or more slots during which the RIS device is deactivated or is invisible, In an aspect, the first UE may configure the first UE to perform the sidelink communication during the one or more time slots during which the RIS device is deactivated if the first UE is near the RIS device (e.g., within the proximity threshold from the RIS device based on the RIS location information), and may configure the first UE not to perform a sidelink communication during other time slots.

Referring to FIG. 10, for example, the UE 1052 may determine one or more slots during which the RIS device 1080 is deactivated or has become invisible, and may configure the UE 1052 to perform a sidelink communication with the UE 1054 during the one or more slots during which the RIS device 1080 is deactivated. The UE 1052 may configure the UE 1052 not to perform a sidelink communication with the UE 1054 during different slots. In an aspect, the UE 1052 may make such determinations if the UE 1052 determines that the UE 1052 is within the proximity threshold from the RIS device 1080 based on the RIS location 1082.

When some UEs may be used as relays for a sidelink communication between the first UE and the second UE, the first UE may select a relay UE that is least affected by the RIS device, which may cause, for example, the dynamic change in the wireless communication environment near the RIS device. Hence, the first UE may select a relay UE that is not in a close proximity from the RIS device as a relay for the sidelink communication with the second UE, because such a relay UE may not be affected by the RIS device. Therefore, in an aspect, the first UE may determine locations of third UEs that are relay candidates for the sidelink communication between the first UE and the second UE, determine that a location of at least one third UE of the third UEs is outside of a proximity threshold from the RIS device based on the RIS location information, and the first UE configuring the one or more sidelink communication parameters based on the RIS location information may configure the first UE to utilize the at least one third UE as a relay to perform the sidelink communication with the second UE via the at least one third UE.

Figure 12:
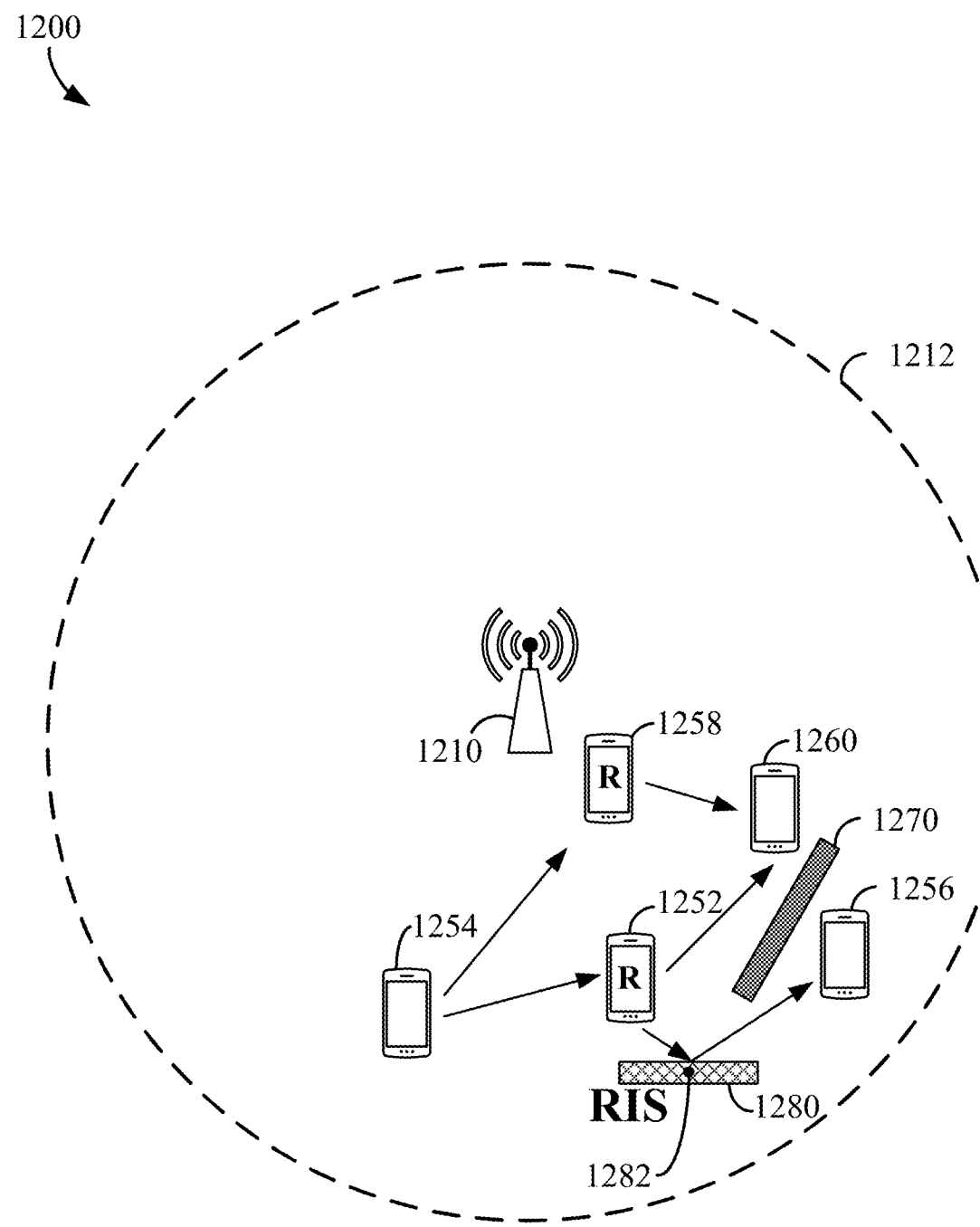
FIG. 12 is an example diagram illustrating a wireless communication environment including a base station, UEs and a reconfigurable intelligent surface device, where at least one UE may be used as a relay for a sidelink communication, according to some aspects.

FIG. 12 is an example diagram 1200 illustrating a wireless communication environment including a base station, UEs and a reconfigurable intelligent surface device, where at least one UE may be used as a relay for a sidelink communication, according to some aspects. In FIG. 12, a base station 1210 operates a cell 1212 surrounding the base station 1210. In FIG. 12, a RIS device 1280 is deployed, and a UE 1252 and a UE 1256 are near the RIS device 1280, while a UE 1254 and a UE 1258 are located far from the RIS device 1280. In an example, the RIS device 1280 may be controlled by the base station 1210. The UE 1252 and the UE 1254 may communicate with each other without relying on the RIS device 1280. The UE 1254 and the UE 1258 may also communicate with each other without relying on the RIS device 1280. On the other hand, because a blockage 1270 is present between the UE 1252 and the UE 1256, the UE 1252 and the UE 1256 may not be able to perform a sidelink communication with each other on their own. Hence, the UE 1252 and the UE 1256 may rely on the RIS device 1280 to perform a sidelink communication with each other. In an aspect, the base station 1210, the UEs 1252, 1254, 1256, and 1258, the RIS device 1280, and the blockage 1270 may respectively correspond to The base station 1010, the UEs 1052, 1054, 1056, and 1058, the RIS device 1080, and the blockage 1070 of FIG. 10.

In FIG. 12, the UE 1258 and the UE 1252 may be relay candidates to be a relay for a sidelink communication between the UE 1254 and the UE 1260. For example, in FIG. 12, the UE 1254 may determine locations of the UE 1258 and the UE 1252 that are the relay candidates and may determine that a location of the UE 1258 is outside of a proximity threshold from the RIS device 1280 based on the RIS location 1282, e.g., because the UE 1258 is far from the RIS device 1280 and the UE 1252 is near the RIS device 1280. Then, the UE 1252 may configure the UE 1252 to utilize the UE 1258 as a relay to perform the sidelink communication with the UE 1260 via the UE 1258.

In some aspects, the base station may configure the RIS device to attempt to address the issues associated with the RIS device possibly changing the wireless communication environment surrounding the RIS dynamically over time. For example, the base station may perform a TDM for a Uu uplink communication and a sidelink communication on non-overlapping slots. The base station may configure the RIS device to reduce or avoid the impact by the RIS device and to improve a sidelink communication near the RIS. In particular, in an aspect, for certain time durations, the base station may configure the RIS device to become invisible for wireless communication, such that the RIS device does not reflect signal transmitted to the RIS device according to a communication pattern configured at the RIS device but instead allows the signal to randomly propagate in various random directions. As such, during these time durations, the RIS device may not adversely affect a sidelink communication. In an aspect, the base station may configure the RIS according to various communication patterns for different time durations, and announce/broadcast/transmit these communication patterns to UEs to allow each UE to select a time duration with a corresponding communication pattern that provides optimal results.

Hence, according to some aspects of the disclosure, the base station (e.g., base station 1010) may determine at least one of an invisibility timing configuration for a RIS device (e.g., RIS device 1080) controlled by the base station, where the invisibility timing configuration indicates one or more invisibility durations during which the RIS device is configured to be invisible for wireless communications, and/or may determine multiple communication patterns for the RIS device that are respectively associated with a plurality of pattern durations. Then, the base station may transmit, to the RIS device, a RIS configuration setting indicating the invisibility timing configuration to configure the RIS device to be invisible for wireless communications during the invisibility timing configuration and/or the multiple communication patterns to configure the RIS device with the multiple communication patterns respectively for the multiple pattern durations. In an aspect, for the multiple pattern durations, the RIS device may be configured to be active for wireless communications. In an aspect, the multiple pattern durations may respectively correspond to multiple slots that do not overlap with each other.

Unlike light reflections by a mirror, the RIS device may not reflect a signal symmetrically to a direction in which the signal is received at the RIS device. Hence, for a communication pattern, a reception beam direction to receive a signal at the RIS device and a transmission beam direction to reflect the received beam at the RIS device may be separately determined. Hence, in an aspect, each of the plurality of communication patterns may indicate a respective reception beam direction to receive a signal and/or a respective transmission beam direction to reflect the received signal at the RIS device.

If the RIS device receives the RIS configuration setting and the RIS configuration setting indicates the invisibility timing configuration, the RIS device may configure the RIS device to be invisible for wireless communications during the invisibility timing. For example, if the base station knows time durations (e.g., slots) during which a sidelink communication by the first UE is configured, then the base station may transmit the invisibility timing configuration to configure the RIS device to be invisible for wireless communications during these time durations of the sidelink communication. By configuring the RIS device to become invisible during the time of the sidelink communication, the base station may allow the first UE and the second UE to communicate with each other via the sidelink communication, without the adverse impact on the wireless communication environment by operations of the RIS device.

In an aspect, for a first UE (e.g., UE 1052) to determine the invisibility timing configuration, the first UE may identify one or more slots allocated for a sidelink communication, and determine that the one or more slots respectively correspond to the one or more invisibility durations.

If the RIS device receives the RIS configuration setting and the RIS configuration setting indicates the multiple communication patterns respectively for the multiple pattern durations, the RIS device may configure the RIS device with the multiple communication patterns respectively for the multiple pattern durations. In an aspect, the RIS device may configure the RIS device to be active for wireless communications for the multiple pattern durations.

In an aspect, the base station may transmit the RIS configuration setting indicating the multiple communication patterns of the RIS device to one or more UEs (E.g., by announcing via broadcast/multicast, or via unicast). When the first UE receives the RIS configuration setting indicating the multiple communication patterns of the RIS device that are respectively associated with the multiple pattern durations, the UE may select a pattern duration from the multiple pattern durations, and communicate with a second UE (e.g., UE 1054) during the selected pattern duration that is associated with a respective communication pattern of the multiple communication patterns.

In an aspect, the first UE may transmit, to the second UE, reference signals respectively during the multiple pattern durations via sidelink communication, and receive, from the second UE, multiple first feedback signals respectively in response to the reference signals transmitted respectively during the multiple pattern durations. In this aspect, to select the pattern duration from the multiple pattern durations, the first UE may select the pattern duration that is associated with a first feedback signal with a highest signal strength among the first feedback signals from the second UE. The reference signals may be the same reference signal that may include a discovery message.

In an aspect, the first UE may receive, from the second UE, reference signals respectively during the multiple pattern durations via sidelink communication, and generate multiple second feedback signals respectively based on the reference signals received respectively during the multiple pattern durations. In this aspect, to select the pattern duration from the multiple pattern durations, the first UE may select the pattern duration that is associated with a second feedback signal with a highest signal strength among the second feedback signals transmitted from the first UE. The reference signals may be the same reference signal that may include a discovery message. In an aspect, the first UE may transmit, to the second UE, the second feedback signals respectively in response to the reference signals received respectively during the multiple pattern durations. For example, the first UE may transmit the second feedback signals respectively during the multiple pattern durations, such that the second UE may respectively associate the multiple communication patterns with the second feedback signals respectively based on the multiple pattern durations during which the second feedback signals are respectively received. Subsequently, the second UE may determine the second feedback signal has the highest signal strength and thus may determine that the communication pattern associated with the second feedback signal may be used for the sidelink communication to the first UE. In an aspect, the first UE may transmit, to the second UE, the second feedback signal with the highest signal strength among the second feedback signals during the second pattern duration. Subsequently, in an aspect, the second UE may determine that the communication pattern associated with the second feedback signal may be used for the sidelink communication to the first UE.

FIGS. 13A, 13B, 13C, and 13D are example diagrams illustrating different communication patterns configured for a RIS device 1310, according to some aspects. In FIG. 13A, a first communication pattern 1320 indicates a first reception beam direction 1322 to receive a signal and a first transmission beam direction 1324 to reflect the received signal, at the RIS device 1310. In FIG. 13B, a second communication pattern 1340 indicates a second reception beam direction 1342 to receive a signal and a second transmission beam direction 1344 to reflect the received signal, at the RIS device 1310. In FIG. 13C, a third communication pattern 1360 indicates a third reception beam direction 1362 to receive a signal and a third transmission beam direction 1364 to reflect the received signal, at the RIS device 1310. In FIG. 13D, a fourth communication pattern 1380 indicates a fourth reception beam direction 1382 to receive a signal and a fourth transmission beam direction 1384 to reflect the received signal, at the RIS device 1310. As shown in FIGS. 13C and 13D, the RIS device may not always reflect a signal symmetrically to a direction in which the signal is received at the RIS device.

Figure 14:
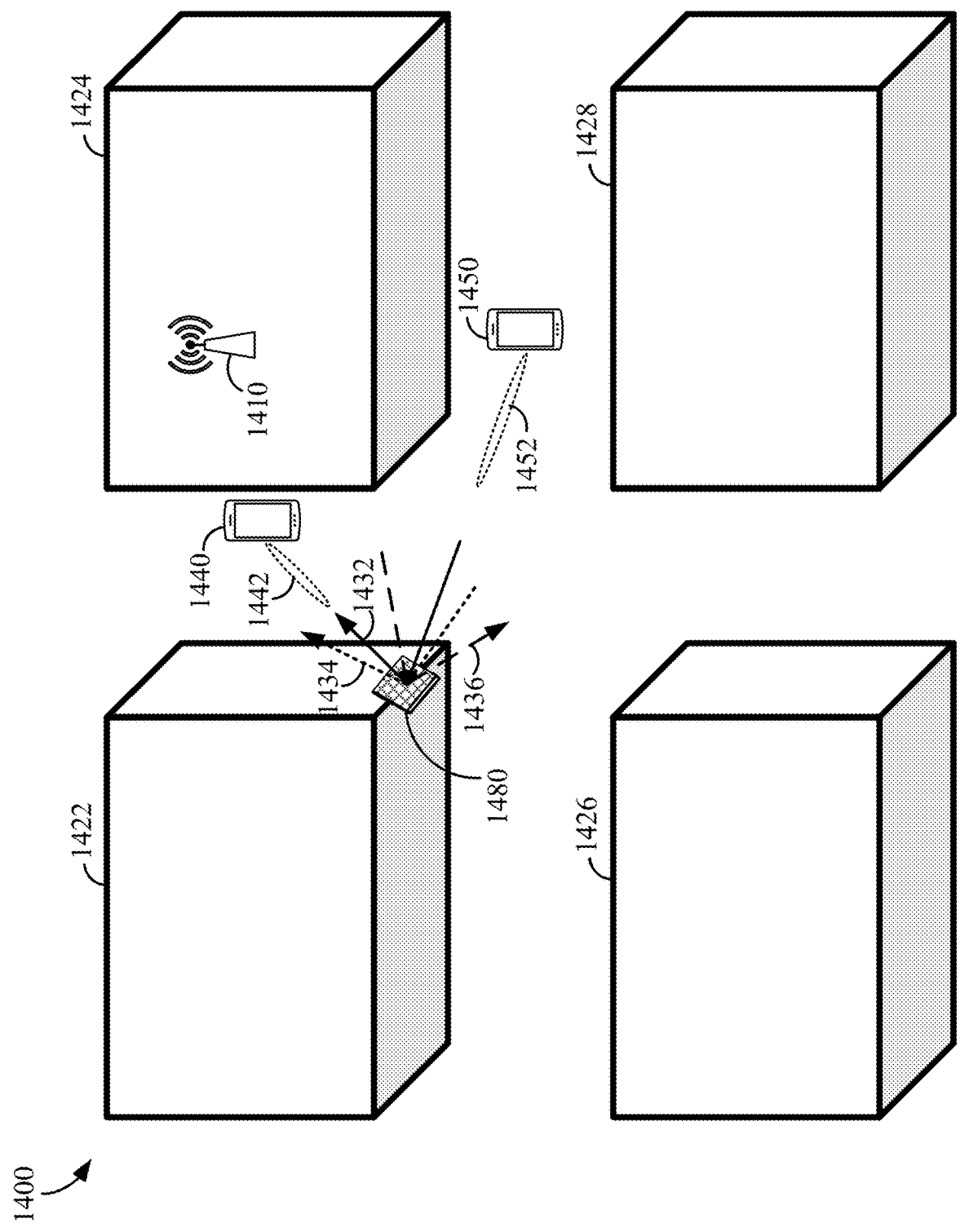
FIG. 14 is an example diagram illustrating a user equipment selecting a pattern duration from multiple pattern durations respectively associated with multiple communication patterns of a reconfigurable intelligent surface device, according to some aspects.

FIG. 14 is an example diagram 1400 illustrating a user equipment selecting a pattern duration from multiple pattern durations respectively associated with multiple communication patterns of a reconfigurable intelligent surface device, according to some aspects. In FIG. 14, four blockage structures 1422, 1424, 1426, and 1428 are present and may block signals from various devices such as a base station and UEs. In an example, the four blockage structures 1422, 1424, 1426, and 1428 may be buildings. In FIG. 14, a base station 1040 is located on the blockage structure 1424 and operates a cell surrounding the base station 1040, while a RIS device 1480 is deployed at the blockage structure 1424. In FIG. 14, a UE 1440 and a UE 1450 may have difficulty communicating with each other via sidelink communication because the blockage structure 1424 may block a sidelink communication between the UE 1440 and the UE 1450. Hence, the UE 1440 and the UE 1450 may rely on the RIS device 1480 to perform the sidelink communication with each other.

The base station 1410 may configure the RIS device 1480 with multiple communication patterns respectively for multiple pattern durations. For example, the base station 1410 may transmit a RIS configuration setting indicating the multiple communication patterns respectively for multiple pattern durations to the RIS device, such that the RIS device 1480 may configuring the RIS device 1480 with the multiple communication patterns respectively for the multiple pattern durations. The base station 1410 1410 may also transmit the RIS configuration setting indicating the multiple communication patterns respectively for multiple pattern durations to the UE 1440 and/or the UE 1450.

In FIG. 14, the RIS device 1480 is configured with at least three communication patterns, a first communication pattern 1432, a second communication pattern 1434, and a third communication pattern 1436, which are respectively associated with a first pattern duration, a second pattern duration, and a third pattern duration. When the UE 1450 receives the RIS configuration setting from the base station 1410 that indicates these three communication patterns, the UE 1450 may determine that the RIS device 1480 is configured with a first communication pattern 1432, a second communication pattern 1434, and a third communication pattern 1435 respectively associated with the first pattern duration, the second pattern duration, and the third pattern duration. In an example, the UE 1450 may not be aware of reception beam directions or transmission beam directions of these communication patterns.

In an aspect, the UE 1450 may transmit reference signals respectively during the multiple pattern durations via sidelink communication to the UE 1440, and may receive multiple feedback signals respectively in response to the reference signals transmitted respectively during the multiple pattern durations, from the UE 1440. By comparing signal strength values for the multiple pattern durations based on the multiple feedback signals, the UE 1450 may determine that the signal strength during the first pattern duration associated with the first communication pattern 1432 is the highest, and thus may select the first pattern duration to perform the sidelink communication with the UE 1440. The first pattern duration may provide the highest signal strength in FIG. 14 because the reception beam direction and the transmission beam direction of the first communication pattern 1432 respectively correspond with a direction of a transmission beam 1452 of the UE 1450 and a direction of a reception beam of the UE 1440.

As discussed above, the RIS device may not reflect a signal symmetrically to a direction in which the signal is received at the RIS device. Hence, in an aspect, the UE 1440 may transmit reference signals respectively during the multiple pattern durations via sidelink communication to the UE 1450, and may receive multiple feedback signals respectively in response to the reference signals transmitted respectively during the multiple pattern durations, from the UE 1450. By comparing signal strength values for the multiple pattern durations based on the multiple feedback signals from the UE 1450, the UE 1450 may determine a pattern duration with the strongest signal strength and select a communication pattern associated with such a pattern duration with the strongest signal strength, for the sidelink communication with the UE 1450.

In an aspect, the UE 1440 may receive reference signals respectively during the multiple pattern durations via sidelink communication from the UE 1450, and may generate multiple feedback signals respectively based on the reference signals received respectively during the multiple pattern durations. By comparing signal strength values for the multiple pattern durations based on the multiple feedback signals, the UE 1450 may determine that the signal strength during the first pattern duration associated with the first communication pattern 1432 is the highest, and thus may select the first pattern duration to perform the sidelink communication with the UE 1450. In an aspect, the UE 1440 may transmit the multiple feedback signals respectively in response to the multiple reference signals received respectively during the multiple pattern durations, to the UE 1450. For example, the multiple feedback signals may be transmitted respectively during the multiple pattern durations. Subsequently, the UE 1450 may determine the feedback signal with the highest signal strength based on the multiple feedback signals and thus may determine that the communication pattern associated with the feedback signal with the highest signal strength may be used for the sidelink communication to the UE 1440. In an aspect, the UE 1440 may transmit only the feedback signal with the highest signal strength during a corresponding pattern duration to the UE 1450 (e.g., without transmitting the rest of the multiple feedback signals). Subsequently, in an aspect, the UE 1450 may determine that the communication pattern associated with the feedback signal with the highest signal strength may be used for the sidelink communication to the UE 1440.

In an aspect, the UE 1440 may transmit an indication of the selection of the first pattern duration or the first communication pattern 1432 to the UE 1450. In an aspect, the UE 1440 may transmit a signal to the UE 1450 only using a slot or a resource associated with the first pattern duration or the first communication pattern 1432 associated with the first pattern duration selected, without using other slots or resources associated with other pattern durations or other communication patterns, in order to indicate the selection of the first pattern duration associated with the first communication pattern 1432.

Figure 15:
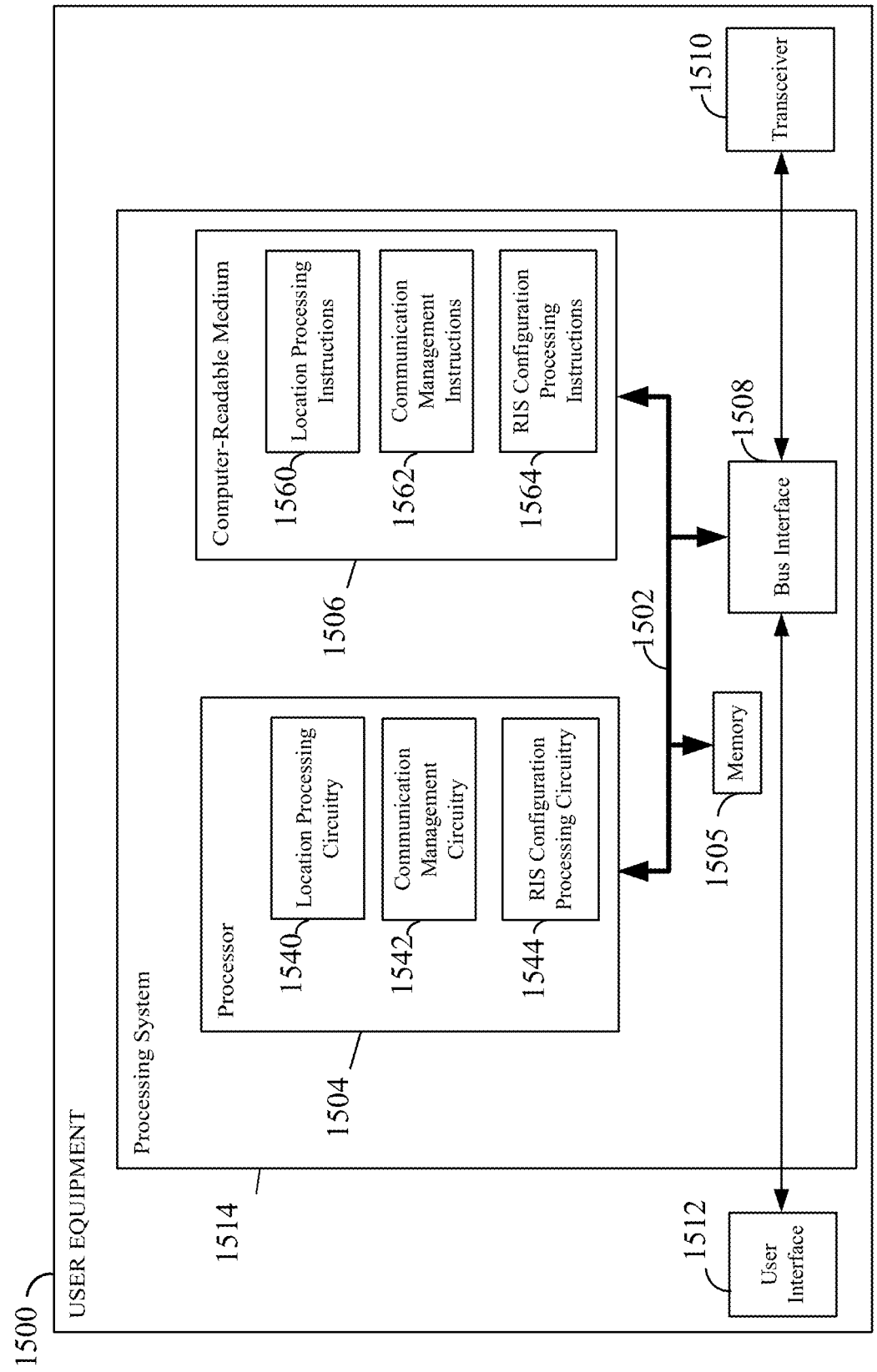
FIG. 15 is a block diagram conceptually illustrating an example of a hardware implementation for a user equipment according to some aspects.

FIG. 15 is a block diagram illustrating an example of a hardware implementation for a user equipment (UE) 1500 employing a processing system 1514. For example, the UE 1500 may be a user equipment (UE) as illustrated in any one or more of FIGS. 1, 2, 4, 7, 8, 9, 10, 11, 12, and/or 14.

The UE 1500 may be implemented with a processing system 1514 that includes one or more processors 1504. Examples of processors 1504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1500 may be configured to perform any one or more of the functions described herein. That is, the processor 1504, as utilized in a UE 1500, may be used to implement any one or more of the processes and procedures described below and illustrated in FIGS. 16, 17, 18, and/or 19.

In this example, the processing system 1514 may be implemented with a bus architecture, represented generally by the bus 1502. The bus 1502 may include any number of interconnecting buses and bridges depending on the specific application of the processing system 1514 and the overall design constraints. The bus 1502 communicatively couples together various circuits including one or more processors (represented generally by the processor 1504), a memory 1505, and computer-readable media (represented generally by the computer-readable storage medium 1506). The bus 1502 may also link various other circuits such as timing sources, peripherals, voltage regulators, and power management circuits, which are well known in the art, and therefore, will not be described any further. A bus interface 1508 provides an interface between the bus 1502 and a transceiver 1510. The transceiver 1510 provides a communication interface or means for communicating with various other apparatus over a transmission medium. Depending upon the nature of the apparatus, a user interface 1512 (e.g., keypad, display, speaker, microphone, joystick) may also be provided. Of course, such a user interface 1512 is optional, and may be omitted in some examples, such as a base station.

In some aspects of the disclosure, the processor 1504 may include location processing circuitry 1540 configured for various functions, including, for example, determining RIS location information for a RIS device controlled by a base station. For example, the location processing circuitry 1540 may be configured to implement one or more of the functions described below in relation to FIGS. 16-17, including, e.g., blocks 1602 and 1702.

In some aspects, the location processing circuitry 1540 may be configured for various functions, including, for example, determining that the first UE is located within a proximity threshold from the RIS device based on the RIS location information For example, the location processing circuitry 1540 may be configured to implement one or more of the functions described below in relation to FIG. 17, including, e.g., block 1704.

In some aspects, the location processing circuitry 1540 may be configured for various functions, including, for example, determining that at least one of the first UE or the second UE is located within a proximity threshold from the RIS device based on the RIS location information. For example, the location processing circuitry 1540 may be configured to implement one or more of the functions described below in relation to FIG. 17, including, e.g., block 1706.

In some aspects, the location processing circuitry 1540 may be configured for various functions, including, for example, determining locations of a plurality of third UEs that are relay candidates for the sidelink communication between the first UE and the second UE. For example, the location processing circuitry 1540 may be configured to implement one or more of the functions described below in relation to FIG. 17, including, e.g., block 1708.

In some aspects, the location processing circuitry 1540 may be configured for various functions, including, for example, determining that a location of at least one third UE of the plurality of third UEs is outside of a proximity threshold from the RIS device based on the RIS location information. For example, the location processing circuitry 1540 may be configured to implement one or more of the functions described below in relation to FIG. 17, including, e.g., block 1710.

In some aspects of the disclosure, the processor 1504 may include communication management circuitry 1542 configured for various functions, including, for example, configuring one or more sidelink communication parameters based on the RIS location information. For example, the communication management circuitry 1542 may be configured to implement one or more of the functions described below in relation to FIGS. 16-17, including, e.g., blocks 1604 and 1714.

In some aspects, the communication management circuitry 1542 may be configured for various functions, including, for example, performing a sidelink communication with a second UE based on the one or more sidelink communication parameters. For example, the communication management circuitry 1542 may be configured to implement one or more of the functions described below in relation to FIGS. 16-17, including, e.g., blocks 1606 and 1716.

In some aspects, the communication management circuitry 1542 may be configured for various functions, including, for example, determining one or more slots during which the RIS device is deactivated. For example, the communication management circuitry 1542 may be configured to implement one or more of the functions described below in relation to FIG. 17, including, e.g., block 1712.

In some aspects, the communication management circuitry 1542 may be configured for various functions, including, for example, performing a sidelink communication with a second UE during the selected pattern duration of the plurality of pattern durations that is associated with a respective communication pattern of the plurality of communication patterns. For example, the communication management circuitry 1542 may be configured to implement one or more of the functions described below in relation to FIGS. 18-19, including, e.g., blocks 1806 and 1918.

In some aspects, the communication management circuitry 1542 may be configured for various functions, including, for example, transmitting, to the second UE, a plurality of reference signals respectively during the plurality of pattern durations via sidelink communication. For example, the communication management circuitry 1542 may be configured to implement one or more of the functions described below in relation to FIG. 19, including, e.g., block 1904.

In some aspects, the communication management circuitry 1542 may be configured for various functions, including, for example, receiving, from the second UE, a plurality of first feedback signals respectively in response to the plurality of reference signals transmitted respectively during the plurality of pattern durations. For example, the communication management circuitry 1542 may be configured to implement one or more of the functions described below in relation to FIG. 19, including, e.g., block 1906.

In some aspects, the communication management circuitry 1542 may be configured for various functions, including, for example, receiving, from a second UE, a plurality of reference signals respectively during the plurality of pattern durations via sidelink communication. For example, the communication management circuitry 1542 may be configured to implement one or more of the functions described below in relation to FIG. 19, including, e.g., block 1908.

In some aspects, the communication management circuitry 1542 may be configured for various functions, including, for example, generating a plurality of second feedback signals respectively based on the plurality of reference signals received respectively during the plurality of pattern durations. For example, the communication management circuitry 1542 may be configured to implement one or more of the functions described below in relation to FIG. 19, including, e.g., block 1910.

In some aspects, the communication management circuitry 1542 may be configured for various functions, including, for example, transmitting, to the second UE, the plurality of second feedback signals respectively in response to the plurality of reference signals received respectively during the plurality of pattern durations. For example, the communication management circuitry 1542 may be configured to implement one or more of the functions described below in relation to FIG. 19, including, e.g., block 1912.

In some aspects, the communication management circuitry 1542 may be configured for various functions, including, for example, transmitting, to the second UE, the second feedback signal with the highest signal strength among the plurality of second feedback signals during the second pattern duration. For example, the communication management circuitry 1542 may be configured to implement one or more of the functions described below in relation to FIG. 19, including, e.g., block 1914.

In some aspects of the disclosure, the processor 1504 may include RIS configuration processing circuitry 1544 configured for various functions, including, for example, receiving, from a base station, a reconfigurable intelligent surface (RIS) configuration setting indicating a plurality of communication patterns of a RIS device controlled by the base station serving the UE, the plurality of communication patterns being respectively associated with a plurality of pattern durations. For example, the RIS configuration processing circuitry 1544 may be configured to implement one or more of the functions described below in relation to FIGS. 18-19, including, e.g., blocks 1802 and 1902.

In some aspects, the RIS configuration processing circuitry 1544 may be configured for various functions, including, for example, selecting a pattern duration of the plurality of pattern durations. For example, the RIS configuration processing circuitry 1544 may be configured to implement one or more of the functions described below in relation to FIGS. 18-19, including, e.g., blocks 1804 and 1916.

The processor 1504 is responsible for managing the bus 1502 and general processing, including the execution of software stored on the computer-readable storage medium 1506. The software, when executed by the processor 1504, causes the processing system 1514 to perform the various functions described below for any particular apparatus. The computer-readable storage medium 1506 and the memory 1505 may also be used for storing data that is manipulated by the processor 1504 when executing software.

One or more processors 1504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1506. The computer-readable storage medium 1506 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 1506 may reside in the processing system 1514, external to the processing system 1514, or distributed across multiple entities including the processing system 1514. The computer-readable storage medium 1506 may be embodied in a computer program product. By way of example, a computer program product may include a computer-readable storage medium in packaging materials. Those skilled in the art will recognize how best to implement the described functionality presented throughout this disclosure depending on the particular application and the overall design constraints imposed on the overall system.

In some aspects of the disclosure, the computer-readable storage medium 1506 may include location processing software/instructions 1560 configured for various functions, including, for example, determining RIS location information for a RIS device controlled by a base station. For example, the location processing software/instructions 1560 may be configured to implement one or more of the functions described below in relation to FIGS. 16-17, including, e.g., blocks 1602 and 1702.

In some aspects, the location processing software/instructions 1560 may be configured for various functions, including, for example, determining that the first UE is located within a proximity threshold from the RIS device based on the RIS location information For example, the location processing software/instructions 1560 may be configured to implement one or more of the functions described below in relation to FIG. 17, including, e.g., block 1704.

In some aspects, the location processing software/instructions 1560 may be configured for various functions, including, for example, determining that at least one of the first UE or the second UE is located within a proximity threshold from the RIS device based on the RIS location information. For example, the location processing software/instructions 1560 may be configured to implement one or more of the functions described below in relation to FIG. 17, including, e.g., block 1706.

In some aspects, the location processing software/instructions 1560 may be configured for various functions, including, for example, determining locations of a plurality of third UEs that are relay candidates for the sidelink communication between the first UE and the second UE. For example, the location processing software/instructions 1560 may be configured to implement one or more of the functions described below in relation to FIG. 17, including, e.g., block 1708.

In some aspects, the location processing software/instructions 1560 may be configured for various functions, including, for example, determining that a location of at least one third UE of the plurality of third UEs is outside of a proximity threshold from the RIS device based on the RIS location information. For example, the location processing software/instructions 1560 may be configured to implement one or more of the functions described below in relation to FIG. 17, including, e.g., block 1710.

In some aspects of the disclosure, the computer-readable storage medium 1506 may include communication management software/instructions 1562 configured for various functions, including, for example, configuring one or more sidelink communication parameters based on the RIS location information. For example, the communication management software/instructions 1562 may be configured to implement one or more of the functions described below in relation to FIGS. 16-17, including, e.g., blocks 1604 and 1714.

In some aspects, the communication management software/instructions 1562 may be configured for various functions, including, for example, performing a sidelink communication with a second UE based on the one or more sidelink communication parameters. For example, the communication management software/instructions 1562 may be configured to implement one or more of the functions described below in relation to FIGS. 16-17, including, e.g., blocks 1606 and 1716.

In some aspects, the communication management software/instructions 1562 may be configured for various functions, including, for example, determining one or more slots during which the RIS device is deactivated. For example, the communication management software/instructions 1562 may be configured to implement one or more of the functions described below in relation to FIG. 17, including, e.g., block 1712.

In some aspects, the communication management software/instructions 1562 may be configured for various functions, including, for example, performing a sidelink communication with a second UE during the selected pattern duration of the plurality of pattern durations that is associated with a respective communication pattern of the plurality of communication patterns. For example, the communication management software/instructions 1562 may be configured to implement one or more of the functions described below in relation to FIGS. 18-19, including, e.g., blocks 1806 and 1918.

In some aspects, the communication management software/instructions 1562 may be configured for various functions, including, for example, transmitting, to the second UE, a plurality of reference signals respectively during the plurality of pattern durations via sidelink communication. For example, the communication management software/instructions 1562 may be configured to implement one or more of the functions described below in relation to FIG. 19, including, e.g., block 1904.

In some aspects, the communication management software/instructions 1562 may be configured for various functions, including, for example, receiving, from the second UE, a plurality of first feedback signals respectively in response to the plurality of reference signals transmitted respectively during the plurality of pattern durations. For example, the communication management software/instructions 1562 may be configured to implement one or more of the functions described below in relation to FIG. 19, including, e.g., block 1906.

In some aspects, the communication management software/instructions 1562 may be configured for various functions, including, for example, receiving, from a second UE, a plurality of reference signals respectively during the plurality of pattern durations via sidelink communication. For example, the communication management software/instructions 1562 may be configured to implement one or more of the functions described below in relation to FIG. 19, including, e.g., block 1908.

In some aspects, the communication management software/instructions 1562 may be configured for various functions, including, for example, generating a plurality of second feedback signals respectively based on the plurality of reference signals received respectively during the plurality of pattern durations. For example, the communication management software/instructions 1562 may be configured to implement one or more of the functions described below in relation to FIG. 19, including, e.g., block 1910.

In some aspects, the communication management software/instructions 1562 may be configured for various functions, including, for example, transmitting, to the second UE, the plurality of second feedback signals respectively in response to the plurality of reference signals received respectively during the plurality of pattern durations. For example, the communication management software/instructions 1562 may be configured to implement one or more of the functions described below in relation to FIG. 19, including, e.g., block 1912.

In some aspects, the communication management software/instructions 1562 may be configured for various functions, including, for example, transmitting, to the second UE, the second feedback signal with the highest signal strength among the plurality of second feedback signals during the second pattern duration. For example, the communication management software/instructions 1562 may be configured to implement one or more of the functions described below in relation to FIG. 19, including, e.g., block 1914.

In some aspects of the disclosure, the computer-readable storage medium 1506 may include RIS configuration processing software/instructions 1564 configured for various functions, including, for example, receiving, from a base station, a reconfigurable intelligent surface (RIS) configuration setting indicating a plurality of communication patterns of a RIS device controlled by the base station serving the UE, the plurality of communication patterns being respectively associated with a plurality of pattern durations. For example, the RIS configuration processing software/instructions 1564 may be configured to implement one or more of the functions described below in relation to FIGS. 18-19, including, e.g., blocks 1802 and 1902.

In some aspects, the RIS configuration processing software/instructions 1564 may be configured for various functions, including, for example, selecting a pattern duration of the plurality of pattern durations. For example, the RIS configuration processing software/instructions 1564 may be configured to implement one or more of the functions described below in relation to FIGS. 18-19, including, e.g., blocks 1804 and 1916.

Figure 16:
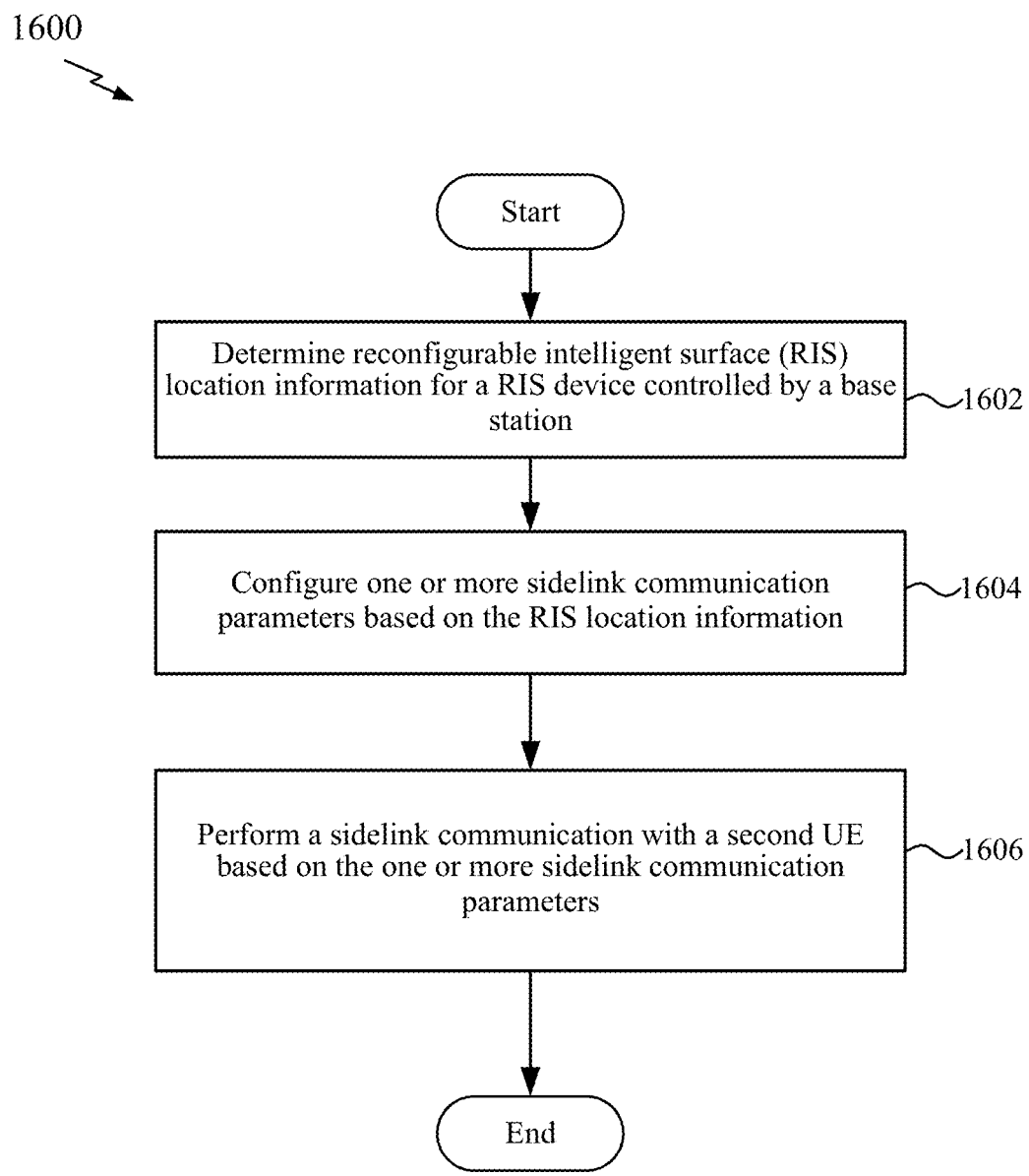
FIG. 16 is a flow chart illustrating an exemplary process for wireless communication by a user equipment according to some aspects.

FIG. 16 is a flow chart illustrating an exemplary process 1600 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1600 may be carried out by the UE 1500 illustrated in FIG. 15. In some examples, the process 1600 may be carried out by any suitable apparatus or means for carrying out the functions or algorithm described below.

At block 1602, the UE 1500 may determine RIS location information for a RIS device controlled by a base station. For example, the location processing circuitry 1540 shown and described above in connection with FIG. 15 may provide means for determining the RIS location information.

At block 1604, the UE 1500 may configure one or more sidelink communication parameters based on the RIS location information. For example, the communication management circuitry 1542 shown and described above in connection with FIG. 15 may provide means for configuring the sidelink communication parameters.

At block 1606, the UE 1500 may perform a sidelink communication with a second UE based on the one or more sidelink communication parameters. For example, the communication management circuitry 1542 shown and described above in connection with FIG. 15 may provide means for performing the sidelink communication.

Figure 17:
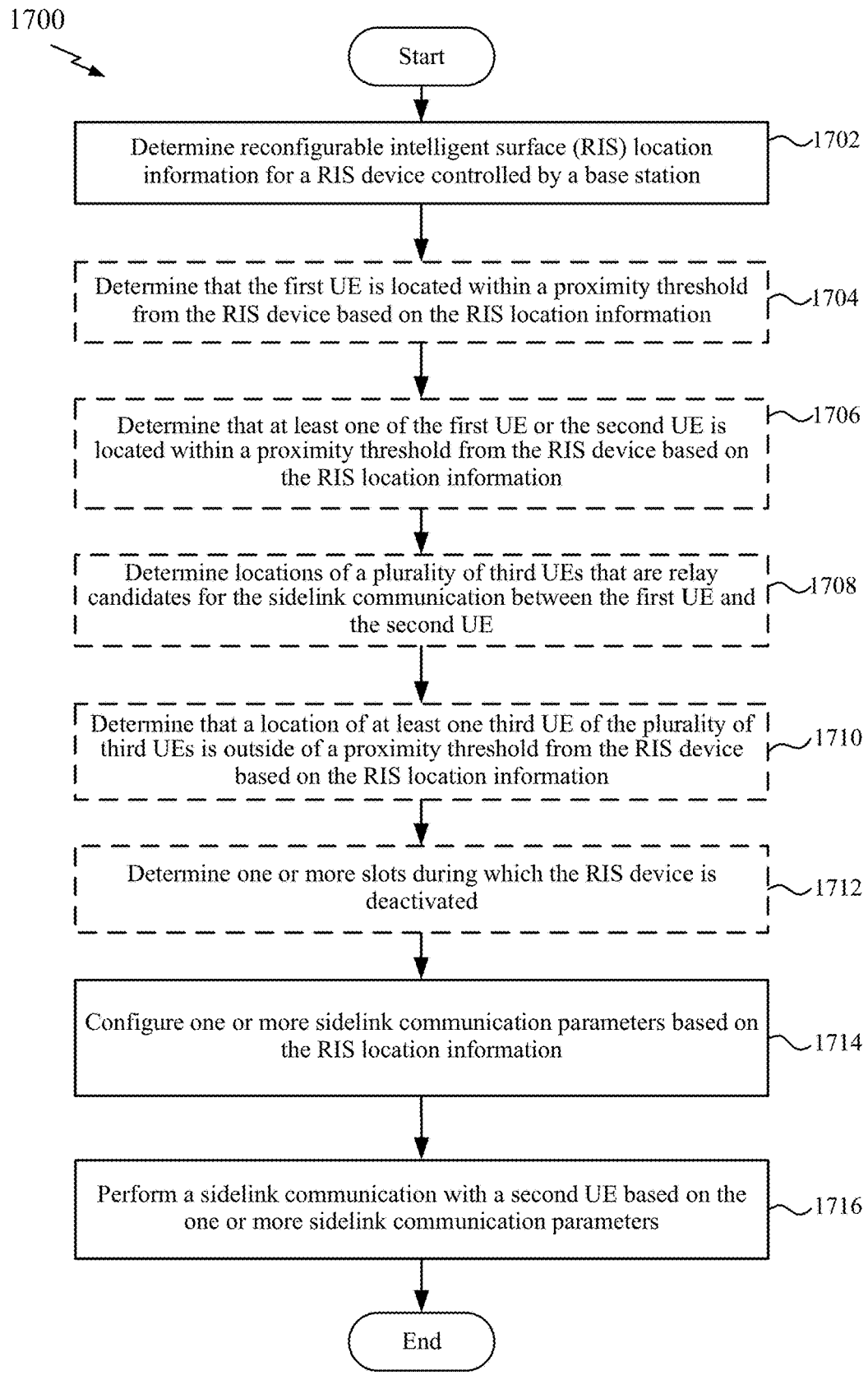
FIG. 17 is a flow chart illustrating an exemplary process for wireless communication by a user equipment according to some aspects.

FIG. 17 is a flow chart illustrating an exemplary process 1700 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1700 may be carried out by the UE 1500 illustrated in FIG. 15. In some examples, the process 1700 may be carried out by any suitable apparatus or means for carrying out the functions or algorithm described below.

At block 1702, the UE 1500 may determine RIS location information for a RIS device controlled by a base station. For example, the location processing circuitry 1540 shown and described above in connection with FIG. 15 may provide means for determining the RIS location information. In an aspect, the RIS device may be located within a cell operated by the base station, and/or the RIS device may be located within a preselected distance from the base station. In an aspect, the RIS location information may be determined based on at least one of GPS information or GNSS information. In an aspect, the base station may serve the UE 1500.

In an aspect, the RIS location information may include at least one of a location coordinate of a location of the RIS device or a RIS zone corresponding to an area surrounding the location of the RIS.

In an aspect, a coverage area based on a cell of the base station may be divided into a plurality of zones, where the RIS zone may be one of the plurality of zones and corresponds to the location of the RIS device, or the RIS zone may be a set of zones of the plurality of zones, the set of zones predicted based on the location of the RIS device to be impacted by operation of the RIS device.

In an aspect, at block 1704, the UE 1500 may determine that the UE 1500 is located within a proximity threshold from the RIS device based on the RIS location information. For example, the location processing circuitry 1540 shown and described above in connection with FIG. 15 may provide means for determining that the UE 1500 is located within the proximity threshold from the RIS device.

In an aspect, at block 1706, the UE 1500 may determine that at least one of the UE 1500 or the second UE is located within a proximity threshold from the RIS device based on the RIS location information. For example, the location processing circuitry 1540 shown and described above in connection with FIG. 15 may provide means for determining that at least one of the UE 1500 or the second UE is located within the proximity threshold from the RIS device.

In an aspect, at block 1708, the UE 1500 may determine locations of a plurality of third UEs that are relay candidates for the sidelink communication between the UE 1500 and the second UE. For example, the location processing circuitry 1540 shown and described above in connection with FIG. 15 may provide means for determining the locations of the plurality of third UEs.

In an aspect, at block 1710, the UE 1500 may determine that a location of at least one third UE of the plurality of third UEs is outside of a proximity threshold from the RIS device based on the RIS location information. For example, the location processing circuitry 1540 shown and described above in connection with FIG. 15 may provide means for determining that the location of at least one third UE of the plurality of third UEs is outside of the proximity threshold from the RIS device.

In an aspect, at block 1712, the UE 1500 may determine one or more slots during which the RIS device is deactivated. For example, the communication management circuitry 1542 shown and described above in connection with FIG. 15 may provide means for determining the one or more slots during which the RIS device is deactivated. In an aspect, the determining the one or more slots at block 1712 may include receiving, from the base station, an indication of the one or more slots during which the RIS device is deactivated.

At block 1714, the UE 1500 may configure one or more sidelink communication parameters based on the RIS location information. For example, the communication management circuitry 1542 shown and described above in connection with FIG. 15 may provide means for configuring the sidelink communication parameters.

In an aspect, when the UE 1500 determines that the UE 1500 is located within the proximity threshold from the RIS device at block 1704, the configuring the one or more sidelink communication parameters based on the RIS location information at block 1714 may include randomly selecting one or more resources for the sidelink communication, wherein the sidelink communication is performed using the one or more resources.

In an aspect, when the UE 1500 determines that at least one of the UE 1500 or the second UE is located within the proximity threshold from the RIS device at block 1706, the configuring the one or more sidelink communication parameters based on the RIS location information at block 1714 may include at least one of: setting a transmit power of the UE 1500 to a maximum transmit power, wherein the sidelink communication is performed using the maximum transmit power, refraining from transmitting first CQI associated with the UE 1500, to the second UE, or refraining from requesting second CQI associated with the second UE, from the second UE.

In an aspect, when the UE 1500 determines that at least one of the UE 1500 or the second UE is located within the proximity threshold from the RIS device at block 1706, the configuring the one or more sidelink communication parameters based on the RIS location information at block 1714 may include configuring the UE 1500 to perform one or more repetitions of the sidelink communication.

In an aspect, after the UE 1500 determines the locations of the plurality of third UEs at block 1708 and determines that the location of at least one third UE of the plurality of third UEs is outside of the proximity threshold from the RIS device at block 1710, the configuring the one or more sidelink communication parameters based on the RIS location information at block 1714 may include configuring the UE 1500 to utilize the at least one third UE as a relay to perform the sidelink communication with the second UE via the at least one third UE.

In an aspect, after the UE 1500 determines the one or more slots during which the RIS device is deactivated at block 1712, the configuring the one or more sidelink communication parameters based on the RIS location information at block 1714 may include configuring the UE 1500 to perform the sidelink communication during the one or more slots.

At block 1716, the UE 1500 may perform a sidelink communication with a second UE based on the one or more sidelink communication parameters. For example, the communication management circuitry 1542 shown and described above in connection with FIG. 15 may provide means for performing the sidelink communication.

In one configuration, the UE 1500 for wireless communication includes means for determining reconfigurable intelligent surface (RIS) location information for a RIS device controlled by a base station, means for configuring one or more sidelink communication parameters based on the RIS location information, and means for performing a sidelink communication with a second UE based on the one or more sidelink communication parameters. In an aspect, the UE 1500 may include means for determining that the first UE is located within a proximity threshold from the RIS device based on the RIS location information. In an aspect, the UE 1500 may include means for determining that at least one of the first UE or the second UE is located within a proximity threshold from the RIS device based on the RIS location information. In an aspect, the UE 1500 may include means for determining locations of a plurality of third UEs that are relay candidates for the sidelink communication between the first UE and the second UE, and means for determining that a location of at least one third UE of the plurality of third UEs is outside of a proximity threshold from the RIS device based on the RIS location information. In an aspect, the UE 1500 may include means for determining one or more slots during which the RIS device is deactivated.

In one aspect, the aforementioned means may be the processor(s) 1504 shown in FIG. 15 configured to perform the functions recited by the aforementioned means. In another aspect, the aforementioned means may be a circuit or any apparatus configured to perform the functions recited by the aforementioned means.

Of course, in the above examples, the circuitry included in the processor 1504 is merely provided as an example, and other means for carrying out the described functions may be included within various aspects of the present disclosure, including but not limited to the instructions stored in the computer-readable storage medium 1506, or any other suitable apparatus or means described in any one of the FIGS. 1, 2, 4, 7, 8, 9, 10, 11, 12, and/or 14 and utilizing, for example, the processes and/or algorithms described herein in relation to FIGS. 16 and/or 17.

Figure 18:
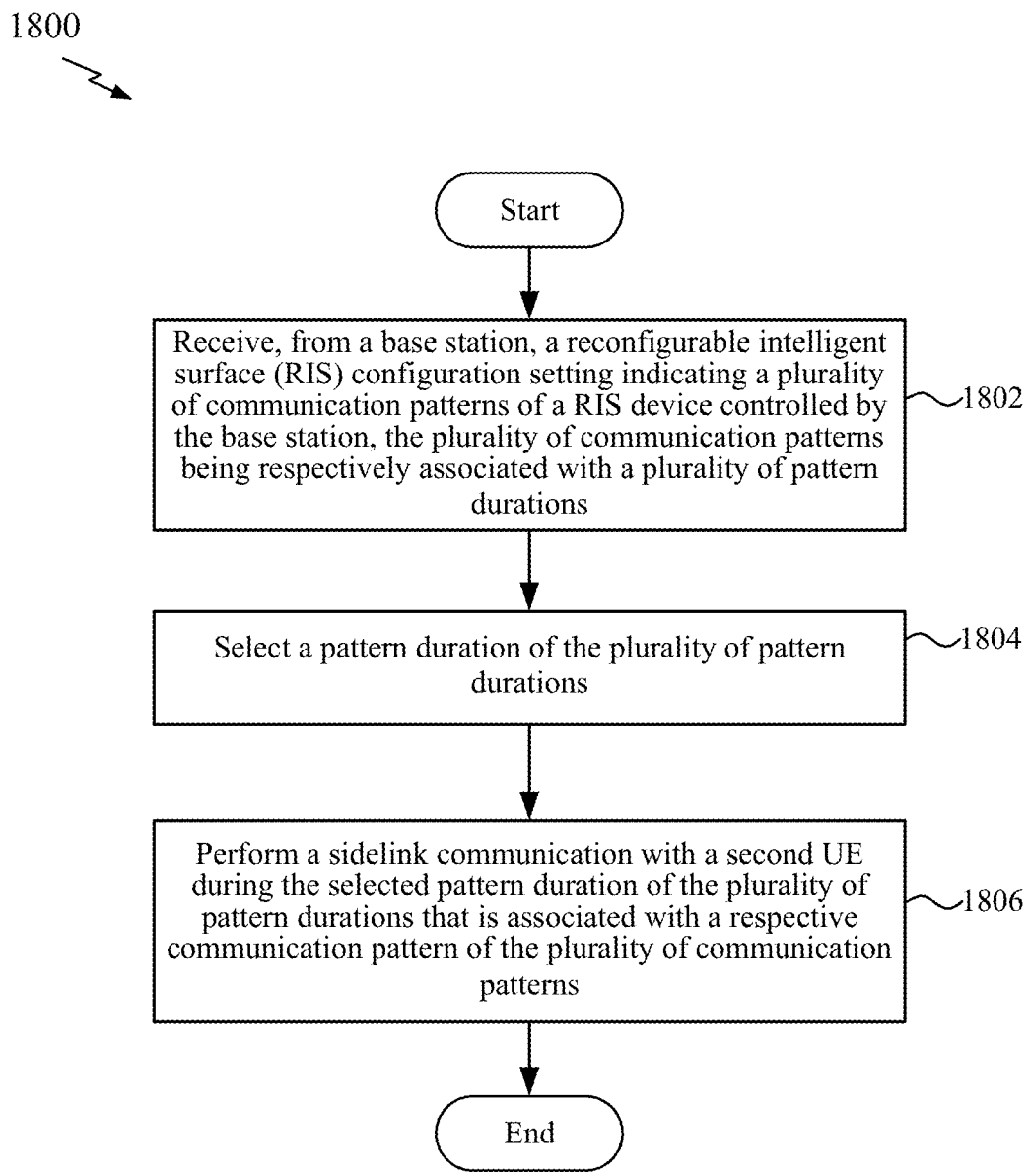
FIG. 18 is a flow chart illustrating an exemplary process for wireless communication by a user equipment according to some aspects.

FIG. 18 is a flow chart illustrating an exemplary process 1800 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1800 may be carried out by the UE 1500 illustrated in FIG. 15. In some examples, the process 1800 may be carried out by any suitable apparatus or means for carrying out the functions or algorithm described below.

At block 1802, the UE 1500 may receive, from a base station, a RIS configuration setting indicating a plurality of communication patterns of a RIS device controlled by the base station serving the UE, the plurality of communication patterns being respectively associated with a plurality of pattern durations. For example, the RIS configuration processing circuitry 1544 shown and described above in connection with FIG. 15 may provide means for receiving the RIS configuration setting.

At block 1804, the UE 1500 may select a pattern duration of the plurality of pattern durations. For example, the RIS configuration processing circuitry 1544 shown and described above in connection with FIG. 15 may provide means for selecting the pattern duration.

At block 1806, the UE 1500 may perform a sidelink communication with a second UE during the selected pattern duration of the plurality of pattern durations that is associated with a respective communication pattern of the plurality of communication patterns. For example, the communication management circuitry 1542 shown and described above in connection with FIG. 15 may provide means for performing the sidelink communication.

FIG. 18 is a flow chart illustrating an exemplary process 1800 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1800 may be carried out by the UE 1500 illustrated in FIG. 15. In some examples, the process 1800 may be carried out by any suitable apparatus or means for carrying out the functions or algorithm described below.

At block 1802, the UE 1500 may receive, from a base station, a RIS configuration setting indicating a plurality of communication patterns of a RIS device controlled by the base station, the plurality of communication patterns being respectively associated with a plurality of pattern durations. For example, the RIS configuration processing circuitry 1544 shown and described above in connection with FIG. 15 may provide means for receiving the RIS configuration setting.

At block 1804, the UE 1500 may select a pattern duration of the plurality of pattern durations. For example, the RIS configuration processing circuitry 1544 shown and described above in connection with FIG. 15 may provide means for selecting the pattern duration.

At block 1806, the UE 1500 may perform a sidelink communication with a second UE during the selected pattern duration of the plurality of pattern durations that is associated with a respective communication pattern of the plurality of communication patterns. For example, the communication management circuitry 1542 shown and described above in connection with FIG. 15 may provide means for performing the sidelink communication.

Figure 19:
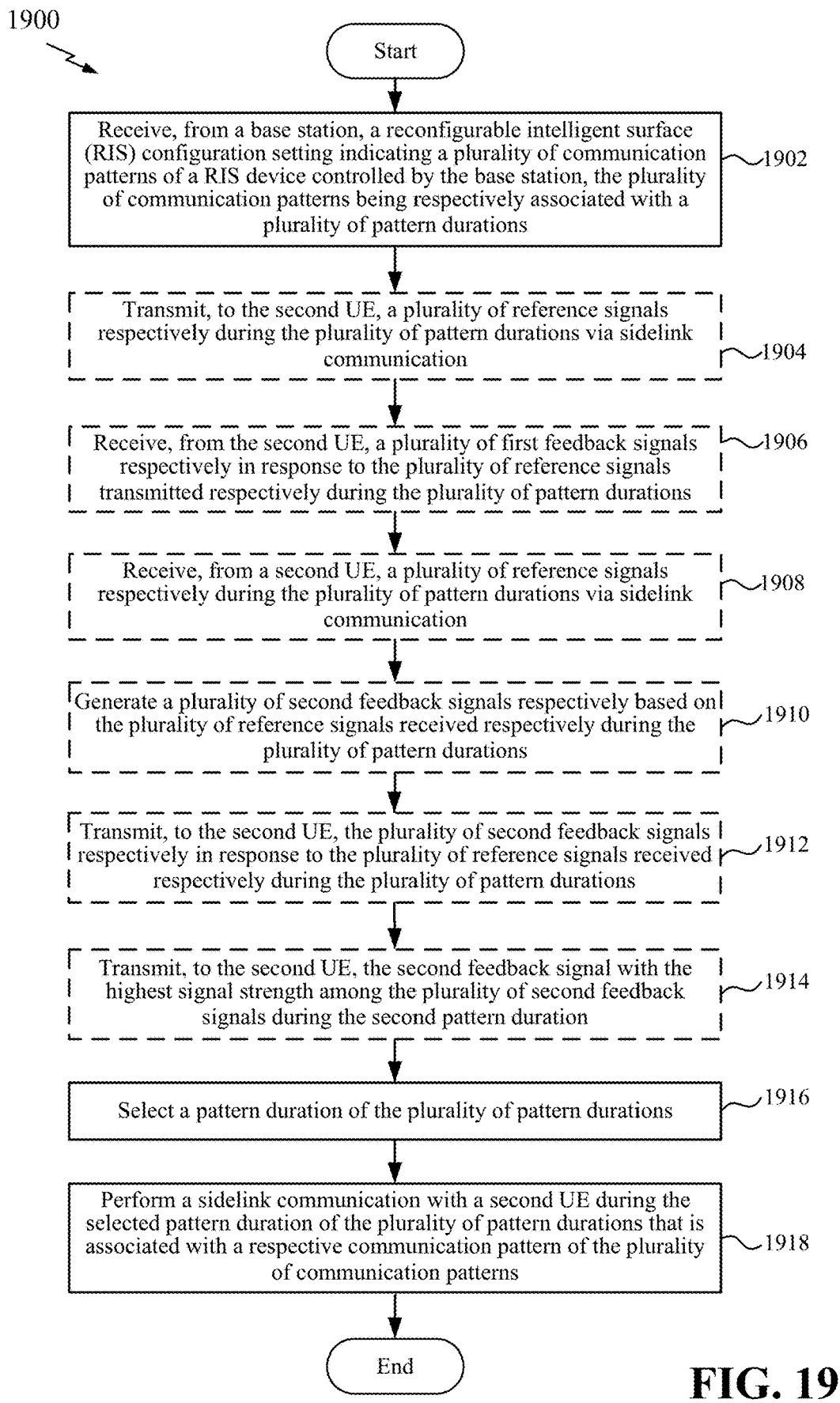
FIG. 19 is a flow chart illustrating an exemplary process for wireless communication by a user equipment according to some aspects.

FIG. 19 is a flow chart illustrating an exemplary process 1900 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1900 may be carried out by the UE 1500 illustrated in FIG. 15. In some examples, the process 1900 may be carried out by any suitable apparatus or means for carrying out the functions or algorithm described below.

At block 1902, the UE 1500 may receive, from a base station, a RIS configuration setting indicating a plurality of communication patterns of a RIS device controlled by the base station, the plurality of communication patterns being respectively associated with a plurality of pattern durations. For example, the RIS configuration processing circuitry 1544 shown and described above in connection with FIG. 15 may provide means for receiving the RIS configuration setting. In an aspect, each of the plurality of communication patterns may indicate at least one of a respective reception beam direction to receive a signal or a respective transmission beam direction to reflect the received signal at the RIS device. In an aspect, the base station may serve the first UE. In an aspect, at least one of the plurality of pattern durations may correspond to a pattern duration during which the RIS device is configured to be invisible for wireless communications.

In an aspect, at block 1904, the UE 1500 may transmit, to the second UE, a plurality of reference signals respectively during the plurality of pattern durations via sidelink communication. For example, the communication management circuitry 1542 shown and described above in connection with FIG. 15 may provide means for transmitting the plurality of reference signals.

In an aspect, at block 1906, the UE 1500 may receive, from the second UE, a plurality of first feedback signals respectively in response to the plurality of reference signals transmitted respectively during the plurality of pattern durations. For example, the communication management circuitry 1542 shown and described above in connection with FIG. 15 may provide means for receiving the plurality of first feedback signals.

In an aspect, at block 1908, the UE 1500 may receive, from a second UE, a plurality of reference signals respectively during the plurality of pattern durations via sidelink communication. For example, the communication management circuitry 1542 shown and described above in connection with FIG. 15 may provide means for receiving the plurality of reference signals.

In an aspect, at block 1910, the UE 1500 may generate a plurality of second feedback signals respectively based on the plurality of reference signals received respectively during the plurality of pattern durations. For example, the communication management circuitry 1542 shown and described above in connection with FIG. 15 may provide means for generating the plurality of second feedback signals.

In an aspect, at block 1912, the UE 1500 may transmit, to the second UE, the plurality of second feedback signals respectively in response to the plurality of reference signals received respectively during the plurality of pattern durations. For example, the communication management circuitry 1542 shown and described above in connection with FIG. 15 may provide means for transmitting the plurality of second feedback signals.

In an aspect, at block 1914, the UE 1500 may transmit, to the second UE, the second feedback signal with the highest signal strength among the plurality of second feedback signals during the second pattern duration. For example, the communication management circuitry 1542 shown and described above in connection with FIG. 15 may provide means for transmitting the second feedback signal.

At block 1916, the UE 1500 may select a pattern duration of the plurality of pattern durations. For example, the RIS configuration processing circuitry 1544 shown and described above in connection with FIG. 15 may provide means for selecting the pattern duration. In an aspect, the plurality of pattern durations may respectively correspond to a plurality of slots that do not overlap with each other.

At block 1918, the UE 1500 may perform a sidelink communication with a second UE during the selected pattern duration of the plurality of pattern durations that is associated with a respective communication pattern of the plurality of communication patterns. For example, the communication management circuitry 1542 shown and described above in connection with FIG. 15 may provide means for performing the sidelink communication.

In an aspect, after the UE 1500 transmits the plurality of reference signals at block 1904 and receives the plurality of first feedback signals at block 1906, the selecting the pattern duration at block 1916 may include selecting the pattern duration of the plurality of pattern durations that is associated with a first feedback signal with a highest signal strength among the plurality of first feedback signals, and the performing the sidelink communication at block 1918 may include transmitting a sidelink communication to the second UE during the selected pattern duration.

In an aspect, after the UE 1500 receives the plurality of reference signals at block 1908 and generates the plurality of second feedback signals at block 1910, the selecting the pattern duration at block 1916 may include selecting the pattern duration of the plurality of pattern durations that is associated with a second feedback signal with a highest signal strength among the plurality of second feedback signals, and the performing the sidelink communication at block 1918 may include receiving a sidelink communication to the second UE during the selected pattern duration.

In one configuration, the UE 1500 for wireless communication includes means for receiving, from a base station, a reconfigurable intelligent surface (RIS) configuration setting indicating a plurality of communication patterns of a RIS device controlled by the base station, the plurality of communication patterns being respectively associated with a plurality of pattern durations, means for selecting a pattern duration of the plurality of pattern durations, means for performing a sidelink communication with a second UE during the selected pattern duration of the plurality of pattern durations that is associated with a respective communication pattern of the plurality of communication patterns. In an aspect, the UE 1500 may include means for transmitting, to the second UE, a plurality of reference signals respectively during the plurality of pattern durations via sidelink communication, and means for receiving, from the second UE, a plurality of feedback signals respectively in response to the plurality of reference signals transmitted respectively during the plurality of pattern durations. In an aspect, the UE 1500 may include means for receiving, from a second UE, a plurality of reference signals respectively during the plurality of pattern durations via sidelink communication, and means for transmitting, to the second UE, a plurality of feedback signals respectively in response to the plurality of reference signals received respectively during the plurality of pattern durations.

In one aspect, the aforementioned means may be the processor(s) 1504 shown in FIG. 15 configured to perform the functions recited by the aforementioned means. In another aspect, the aforementioned means may be a circuit or any apparatus configured to perform the functions recited by the aforementioned means.

Of course, in the above examples, the circuitry included in the processor 1504 is merely provided as an example, and other means for carrying out the described functions may be included within various aspects of the present disclosure, including but not limited to the instructions stored in the computer-readable storage medium 1506, or any other suitable apparatus or means described in any one of the FIGS. 1, 2, 4, 7, 8, 9, 10, 11, 12, and/or 14 and utilizing, for example, the processes and/or algorithms described herein in relation to FIGS. 18 and/or 19.

Figure 20:
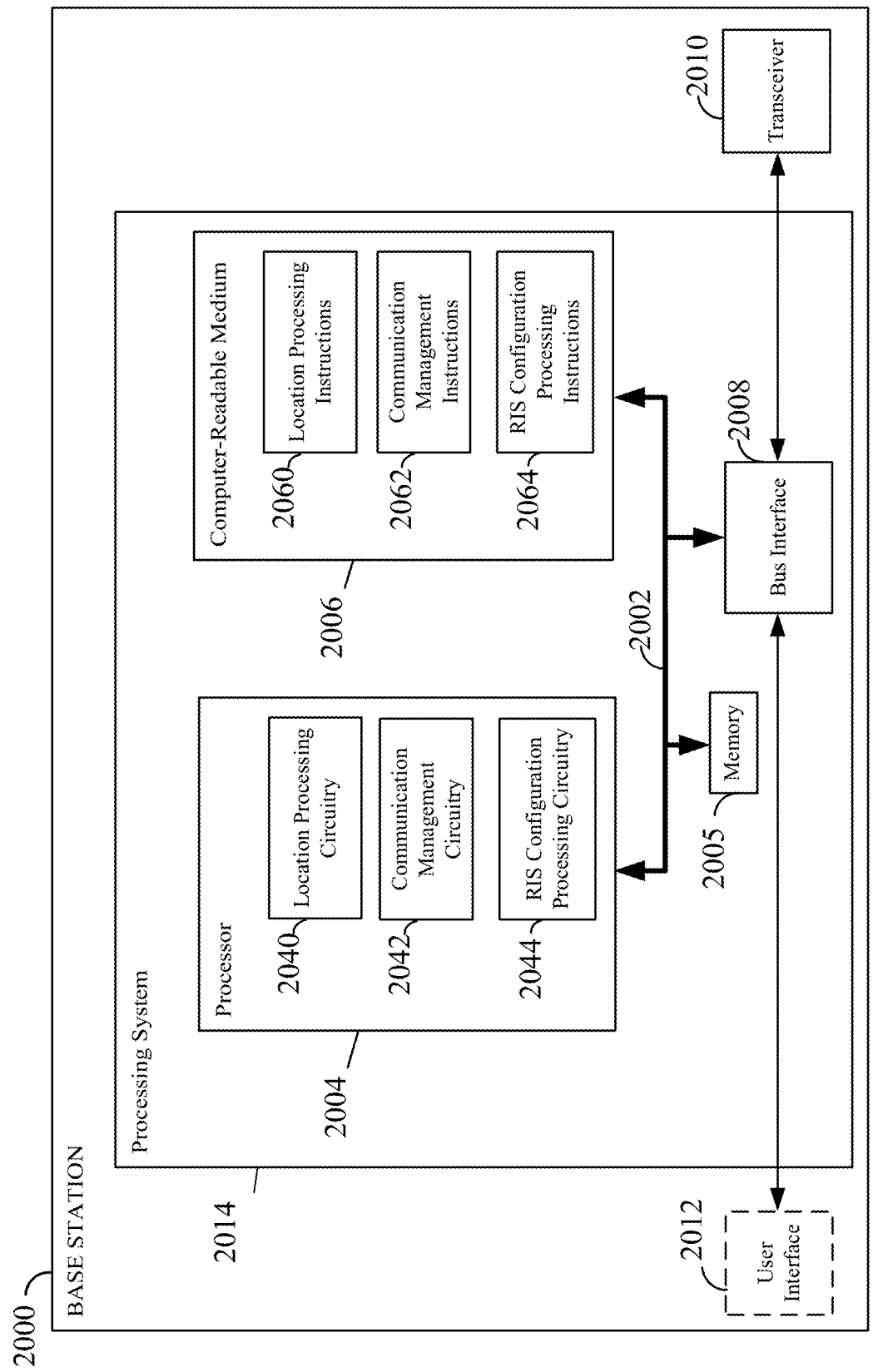
FIG. 20 is a block diagram conceptually illustrating an example of a hardware implementation for a base station according to some aspects.

FIG. 20 is a conceptual diagram illustrating an example of a hardware implementation for an exemplary base station 2000 employing a processing system 2014. In accordance with various aspects of the disclosure, an element, or any portion of an element, or any combination of elements may be implemented with a processing system 2014 that includes one or more processors 2004. For example, the base station 2000 may be a base station as illustrated in any one or more of FIGS. 1, 2, 4, 7, 8, 9, 10, 11, 12, and/or 14.

The processing system 2014 may be substantially the same as the processing system 1514 illustrated in FIG. 15, including a bus interface 2008, a bus 2002, memory 2005, a processor 2004, and a computer-readable storage medium 2006. Furthermore, the base station 2000 may include a user interface 2012 and a transceiver 2010 substantially similar to those described above in FIG. 15. That is, the processor 2004, as utilized in a base station 2000, may be used to implement any one or more of the processes described below and illustrated in FIGS. 21-22.

In some aspects of the disclosure, the processor 2004 may include location processing circuitry 2040 configured for various functions, including, for example, determining RIS location information for a RIS device controlled by the base station 2000. For example, the location processing circuitry 2040 may be configured to implement one or more of the functions described below in relation to FIG. 21, including, e.g., block 2102.

In some aspects of the disclosure, the processor 2004 may include communication management circuitry 2042 configured for various functions, including, for example, transmitting the RIS location information to one or more UEs to configure one or more sidelink communication parameters based on the RIS location information. For example, the communication management circuitry 2042 may be configured to implement one or more of the functions described below in relation to FIG. 21, including, e.g., block 2104.

In some aspects, the communication management circuitry 2042 may be configured for various functions, including, for example, transmitting, to the one or more UEs, an indication of one or more slots during which the RIS device is configured to be visible for wireless communications. For example, the communication management circuitry 2042 may be configured to implement one or more of the functions described below in relation to FIG. 21, including, e.g., block 2106.

In some aspects, the communication management circuitry 2042 may be configured for various functions, including, for example, transmitting, to one or more UEs, the RIS configuration setting indicating the plurality of communication patterns of the RIS device. For example, the communication management circuitry 2042 may be configured to implement one or more of the functions described below in relation to FIG. 22, including, e.g., block 2206.

In some aspects of the disclosure, the processor 2004 may include RIS configuration processing circuitry 2044 configured for various functions, including, for example, determining at least one of an invisibility timing configuration or a plurality of communication patterns for a RIS device controlled by the base station, the invisibility timing configuration indicating one or more invisibility durations during which the RIS device is configured to be invisible for wireless communications and the plurality of communication patterns being respectively associated with a plurality of pattern durations. For example, the RIS configuration processing circuitry 2044 may be configured to implement one or more of the functions described below in relation to FIG. 22, including, e.g., block 2202.

In some aspects, the RIS configuration processing circuitry 2044 may be configured for various functions, including, for example, transmitting, to the RIS device, a RIS configuration setting indicating at least one of the invisibility timing configuration to configure the RIS device to be invisible for wireless communications during the invisibility timing configuration or the plurality of communication patterns to configure the RIS device with the plurality of communication patterns respectively for the plurality of pattern durations. For example, the RIS configuration processing circuitry 2044 may be configured to implement one or more of the functions described below in relation to FIG. 22, including, e.g., block 2204.

In some aspects of the disclosure, the computer-readable storage medium 2006 may include location processing software/instructions circuitry 2060 configured for various functions, including, for example, determining RIS location information for a RIS device controlled by the base station 2000. For example, the location processing software/instructions circuitry 2060 may be configured to implement one or more of the functions described below in relation to FIG. 21, including, e.g., block 2102.

In some aspects of the disclosure, the computer-readable storage medium 2006 may include communication management software/instructions circuitry 2062 configured for various functions, including, for example, transmitting the RIS location information to one or more UEs to configure one or more sidelink communication parameters based on the RIS location information. For example, the communication management software/instructions circuitry 2062 may be configured to implement one or more of the functions described below in relation to FIG. 21, including, e.g., block 2104.

In some aspects, the communication management software/instructions circuitry 2062 may be configured for various functions, including, for example, transmitting, to the one or more UEs, an indication of one or more slots during which the RIS device is configured to be visible for wireless communications. For example, the communication management software/instructions circuitry 2062 may be configured to implement one or more of the functions described below in relation to FIG. 21, including, e.g., block 2106.

In some aspects, the communication management software/instructions circuitry 2062 may be configured for various functions, including, for example, transmitting, to one or more UEs, the RIS configuration setting indicating the plurality of communication patterns of the RIS device. For example, the communication management software/instructions circuitry 2062 may be configured to implement one or more of the functions described below in relation to FIG. 22, including, e.g., block 2206.

In some aspects of the disclosure, the computer-readable storage medium 2006 may include RIS configuration processing software/instructions circuitry 2064 configured for various functions, including, for example, determining at least one of an invisibility timing configuration or a plurality of communication patterns for a RIS device controlled by the base station, the invisibility timing configuration indicating one or more invisibility durations during which the RIS device is configured to be invisible for wireless communications and the plurality of communication patterns being respectively associated with a plurality of pattern durations. For example, the RIS configuration processing software/instructions circuitry 2064 may be configured to implement one or more of the functions described below in relation to FIG. 22, including, e.g., block 2202.

In some aspects, the RIS configuration processing software/instructions circuitry 2064 may be configured for various functions, including, for example, transmitting, to the RIS device, a RIS configuration setting indicating at least one of the invisibility timing configuration to configure the RIS device to be invisible for wireless communications during the invisibility timing configuration or the plurality of communication patterns to configure the RIS device with the plurality of communication patterns respectively for the plurality of pattern durations. For example, the RIS configuration processing software/instructions circuitry 2064 may be configured to implement one or more of the functions described below in relation to FIG. 22, including, e.g., block 2204.

Figure 21:
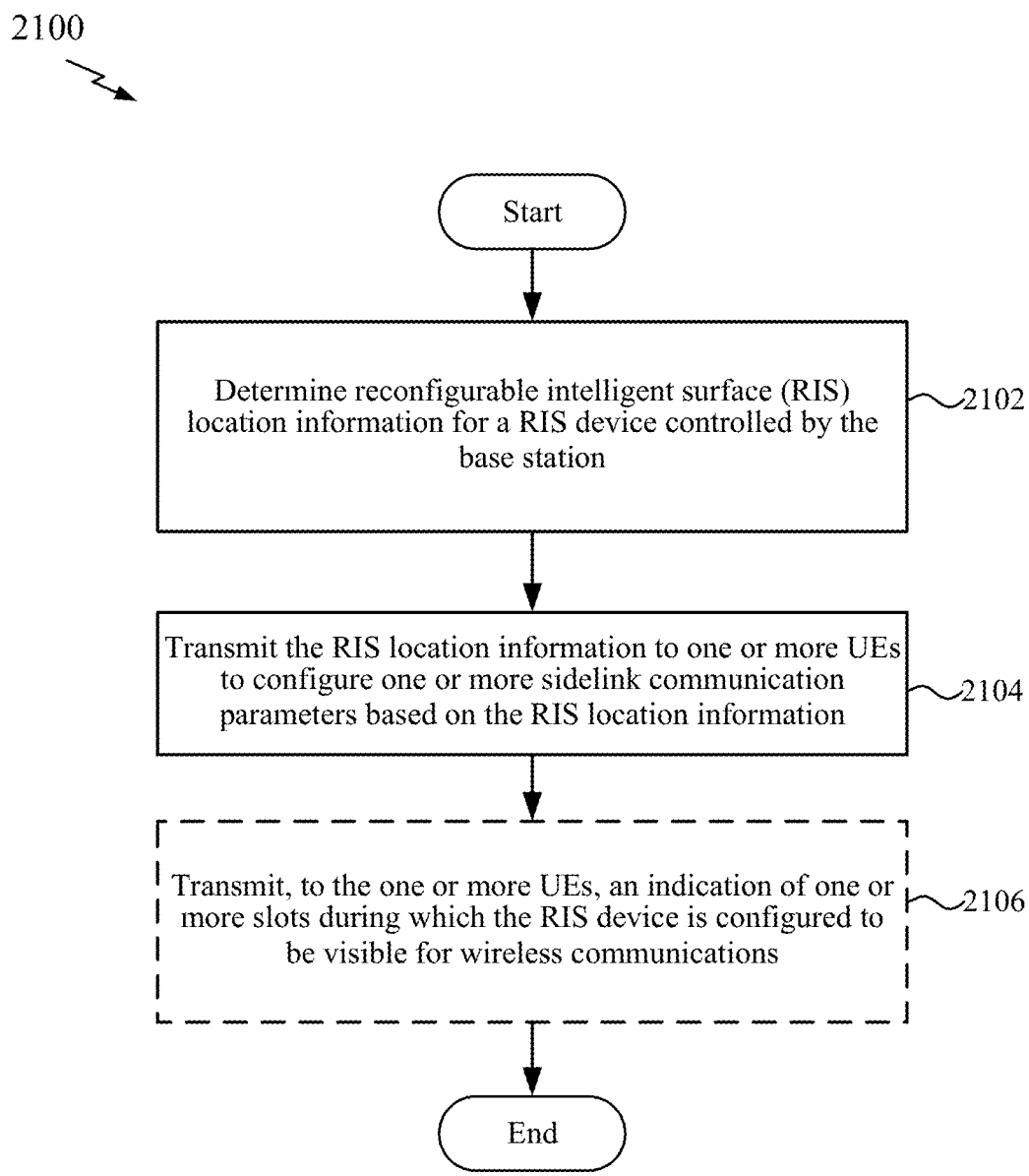
FIG. 21 is a flow chart illustrating an exemplary process for wireless communication by a base station according to some aspects.

FIG. 21 is a flow chart illustrating an exemplary process 2100 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 2100 may be carried out by the base station 2000 illustrated in FIG. 20. In some examples, the process 2100 may be carried out by any suitable apparatus or means for carrying out the functions or algorithm described below.

At block 2102, the base station 2000 may determine RIS location information for a RIS device controlled by the base station 2000. For example, the location processing circuitry 2040 shown and described above in connection with FIG. 20 may provide means for determining the RIS location information. In an aspect, the RIS device may be located within a cell operated by the base station 2000, and/or the RIS device may be located within a preselected distance from the base station 2000. In an aspect, the RIS location information may be determined based on at least one of GPS information or GNSS information. In an aspect, the base station 2000 may serve the first UE.

In an aspect, the RIS location information may include at least one of a location coordinate of a location of the RIS device or a RIS zone corresponding to an area surrounding the location of the RIS.

In an aspect, a coverage area based on a cell of the base station 2000 may be divided into a plurality of zones, where the RIS zone may be one of the plurality of zones and corresponds to the location of the RIS device, or the RIS zone may be a set of zones of the plurality of zones, the set of zones predicted based on the location of the RIS device to be impacted by operation of the RIS device.

At block 2104, the base station 2000 may transmit the RIS location information to one or more UEs to configure one or more sidelink communication parameters based on the RIS location information. For example, the communication management circuitry 2042 shown and described above in connection with FIG. 20 may provide means for transmitting the RIS location information.

In an aspect, at block 2106, the base station 2000 may transmit, to the one or more UEs, an indication of one or more slots during which the RIS device is configured to be visible for wireless communications. In an aspect, a sidelink communication may be configured to be performed during the one or more slots. For example, the communication management circuitry 2042 shown and described above in connection with FIG. 20 may provide means for transmitting the indication of the one or more slots.

In one configuration, the base station 2000 for wireless communication includes means for determining reconfigurable intelligent surface (RIS) location information for a RIS device controlled by the base station and means for transmitting the RIS location information to one or more UEs to configure one or more sidelink communication parameters based on the RIS location information. In an aspect, the base station 2000 may include means for transmitting, to the one or more UEs, an indication of one or more slots during which the RIS device is configured to be visible for wireless communications.

In one aspect, the aforementioned means may be the processor(s) 2004 shown in FIG. 20 configured to perform the functions recited by the aforementioned means. In another aspect, the aforementioned means may be a circuit or any apparatus configured to perform the functions recited by the aforementioned means.

Figure 22:
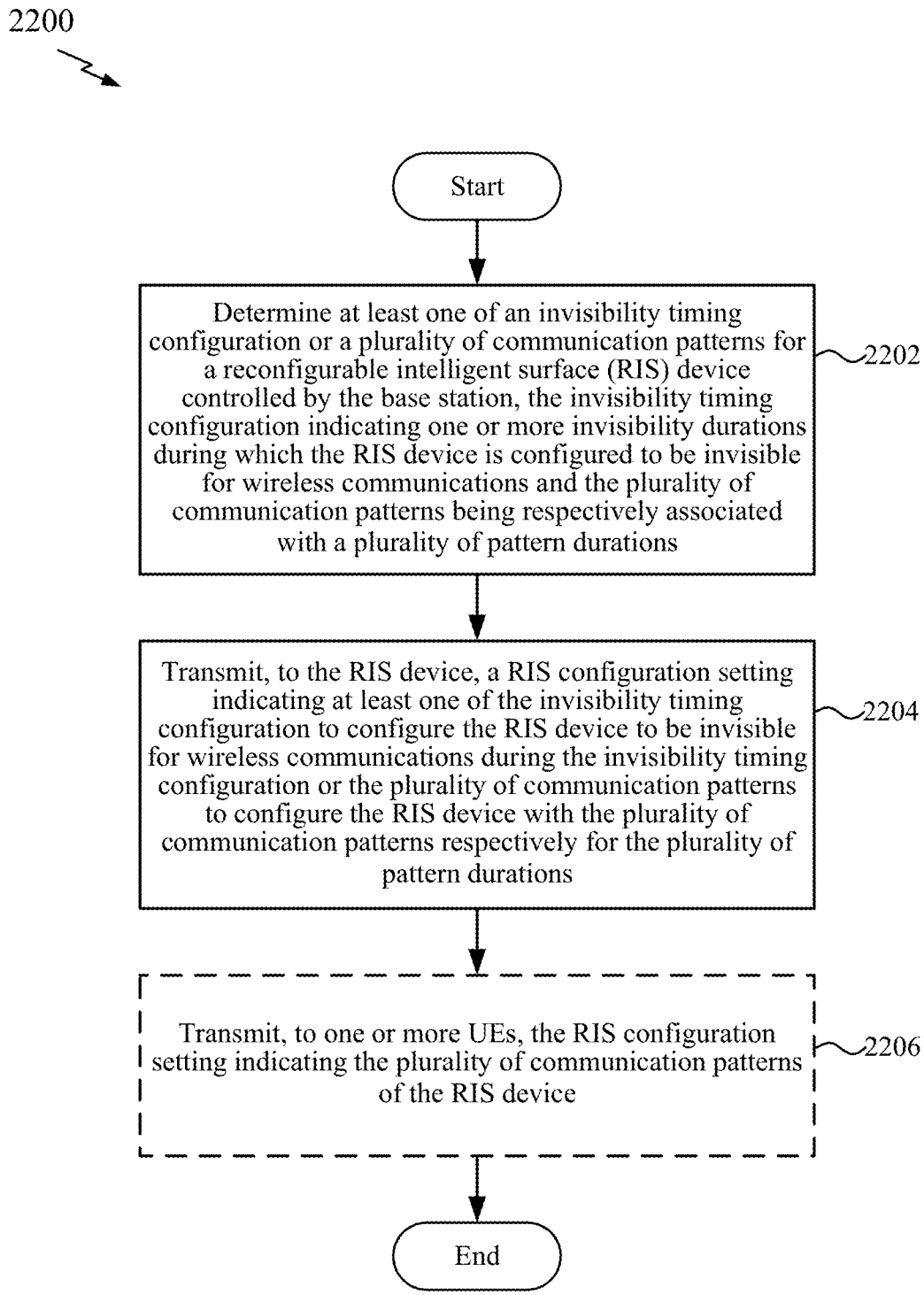
FIG. 22 is a flow chart illustrating an exemplary process for wireless communication by a base station according to some aspects.

FIG. 22 is a flow chart illustrating an exemplary process 2200 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 2200 may be carried out by the base station 2000 illustrated in FIG. 20. In some examples, the process 2200 may be carried out by any suitable apparatus or means for carrying out the functions or algorithm described below.

At block 2202, the base station 2000 may determine at least one of an invisibility timing configuration or a plurality of communication patterns for a reconfigurable intelligent surface (RIS) device controlled by the base station, the invisibility timing configuration indicating one or more invisibility durations during which the RIS device is configured to be invisible for wireless communications and the plurality of communication patterns being respectively associated with a plurality of pattern durations. For example, the RIS configuration processing circuitry 2044 shown and described above in connection with FIG. 20 may provide means for determining at least one of the invisibility timing configuration or the plurality of communication patterns. In an aspect, for the plurality of pattern durations the RIS device may be configured to be active for wireless communications. In an aspect, the plurality of pattern durations may respectively correspond to a plurality of slots that do not overlap with each other. In an aspect, each of the plurality of communication patterns may indicate at least one of a respective reception beam direction to receive a signal or a respective transmission beam direction to reflect the received signal at the RIS device.

In an aspect, the determining the invisibility timing configuration may include: identifying one or more slots allocated for a sidelink communication, and determining that the one or more slots respectively correspond to the one or more invisibility durations.

At block 2204, the base station 2000 may transmit, to the RIS device, a RIS configuration setting indicating at least one of the invisibility timing configuration to configure the RIS device to be invisible for wireless communications during the invisibility timing configuration or the plurality of communication patterns to configure the RIS device with the plurality of communication patterns respectively for the plurality of pattern durations. For example, the RIS configuration processing circuitry 2044 shown and described above in connection with FIG. 20 may provide means for transmitting the RIS configuration setting.

In an aspect, at block 2206, the base station 2000 may transmit, to one or more UEs, the RIS configuration setting indicating the plurality of communication patterns of the RIS device. For example, the communication management circuitry 2042 shown and described above in connection with FIG. 20 may provide means for transmitting the RIS configuration setting.

In one configuration, the base station 2000 for wireless communication includes means for determining at least one of an invisibility timing configuration or a plurality of communication patterns for a reconfigurable intelligent surface (RIS) device controlled by the base station, the invisibility timing configuration indicating one or more invisibility durations during which the RIS device is configured to be invisible for wireless communications and the plurality of communication patterns being respectively associated with a plurality of pattern durations and means for transmitting, to the RIS device, a RIS configuration setting indicating at least one of the invisibility timing configuration to configure the RIS device to be invisible for wireless communications during the invisibility timing configuration or the plurality of communication patterns to configure the RIS device with the plurality of communication patterns respectively for the plurality of pattern durations. In an aspect, the base station 2000 may further include means for transmitting, to one or more UEs, the RIS configuration setting indicating the plurality of communication patterns of the RIS device.

In one aspect, the aforementioned means may be the processor(s) 2004 shown in FIG. 20 configured to perform the functions recited by the aforementioned means. In another aspect, the aforementioned means may be a circuit or any apparatus configured to perform the functions recited by the aforementioned means.

Of course, in the above examples, the circuitry included in the processor 2004 is merely provided as an example, and other means for carrying out the described functions may be included within various aspects of the present disclosure, including but not limited to the instructions stored in the computer-readable storage medium 2006, or any other suitable apparatus or means described in any one of the FIGS. 1, 2, 4, 7, 8, 9, 10, 11, 12, and/or 14, and utilizing, for example, the processes and/or algorithms described herein in relation to FIGS. 21 and/or 22.

Figure 23:
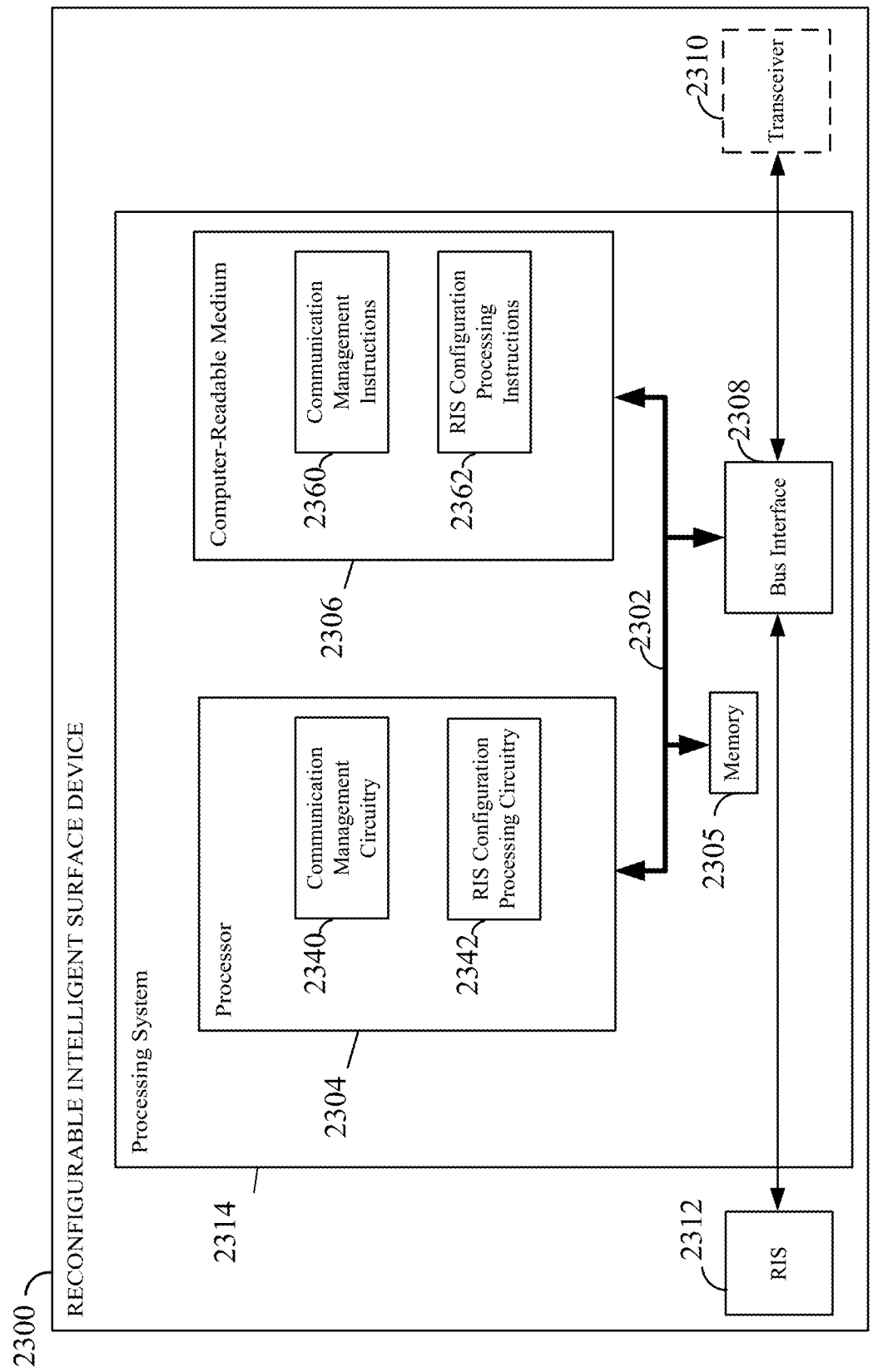
FIG. 23 is a block diagram conceptually illustrating an example of a hardware implementation for a reconfigurable intelligent surface device according to some aspects.

FIG. 23 is a conceptual diagram illustrating an example of a hardware implementation for an exemplary reconfigurable intelligent surface (RIS) device 2300 employing a processing system 2314. In accordance with various aspects of the disclosure, an element, or any portion of an element, or any combination of elements may be implemented with a processing system 2314 that includes one or more processors 2304. For example, the RIS device 2300 may be a RIS device as illustrated in any one or more of FIGS. 7, 9, 10, 11, 12, and/or 14.

The processing system 2314 may be substantially the same as the processing system 1514 illustrated in FIG. 15, including a bus interface 2308, a bus 2302, memory 2305, a processor 2304, and a computer-readable storage medium 2306. Furthermore, the RIS device 2300 may include a reconfigurable intelligent surface 2312 that may be used to receive a signal in one direction and reflect the received signal in another direction based on RIS configurations and may optionally include a transceiver 2310 substantially similar to those described above in FIG. 15 or a receiver. That is, the processor 2304, as utilized in a RIS device 2300, may be used to implement any one or more of the processes described below and illustrated in FIG. 24.

In some aspects of the disclosure, the processor 2304 may include communication management circuitry 2340 configured for various functions, including, for example, receiving, from a base station, a RIS configuration setting indicating at least one of an invisibility timing configuration or a plurality of communication patterns of the RIS device within a cell operated by the base station, the invisibility timing configuration indicating one or more invisibility durations during which the RIS device is configured to be invisible for wireless communications and the plurality of communication patterns being respectively associated with a plurality of pattern durations wherein the RIS device is configured to be active for wireless communications. For example, the communication management circuitry 2340 may be configured to implement one or more of the functions described below in relation to FIG. 24, including, e.g., block 2402.

In some aspects of the disclosure, the processor 2304 may include RIS configuration processing circuitry 2342 configured for various functions, including, for example, performing at least one of: configuring the RIS device to be invisible for wireless communications during the invisibility timing, or configuring the RIS device with the plurality of communication patterns respectively for the plurality of pattern durations. For example, the RIS configuration processing circuitry 2342 may be configured to implement one or more of the functions described below in relation to FIG. 24, including, e.g., block 2404.

In some aspects, the RIS configuration processing circuitry 2342 may be configured for various functions, including, for example, configuring the RIS device to be active for wireless communications for the plurality of pattern durations. For example, the RIS configuration processing circuitry 2342 may be configured to implement one or more of the functions described below in relation to FIG. 24, including, e.g., block 2406.

In some aspects of the disclosure, the computer-readable storage medium 2306 may include communication management software/instructions circuitry 2360 configured for various functions, including, for example, receiving, from a base station, a RIS configuration setting indicating at least one of an invisibility timing configuration or a plurality of communication patterns of the RIS device within a cell operated by the base station, the invisibility timing configuration indicating one or more invisibility durations during which the RIS device is configured to be invisible for wireless communications and the plurality of communication patterns being respectively associated with a plurality of pattern durations wherein the RIS device is configured to be active for wireless communications. For example, the communication management software/instructions circuitry 2360 may be configured to implement one or more of the functions described below in relation to FIG. 24, including, e.g., block 2402.

In some aspects of the disclosure, the computer-readable storage medium 2306 may include RIS configuration processing software/instructions circuitry 2362 configured for various functions, including, for example, performing at least one of: configuring the RIS device to be invisible for wireless communications during the invisibility timing, or configuring the RIS device with the plurality of communication patterns respectively for the plurality of pattern durations. For example, the RIS configuration processing software/instructions circuitry 2362 may be configured to implement one or more of the functions described below in relation to FIG. 24, including, e.g., block 2404.

In some aspects, the RIS configuration processing software/instructions circuitry 2362 may be configured for various functions, including, for example, configuring the RIS device to be active for wireless communications for the plurality of pattern durations. For example, the RIS configuration processing software/instructions circuitry 2362 may be configured to implement one or more of the functions described below in relation to FIG. 24, including, e.g., block 2406.

Figure 24:
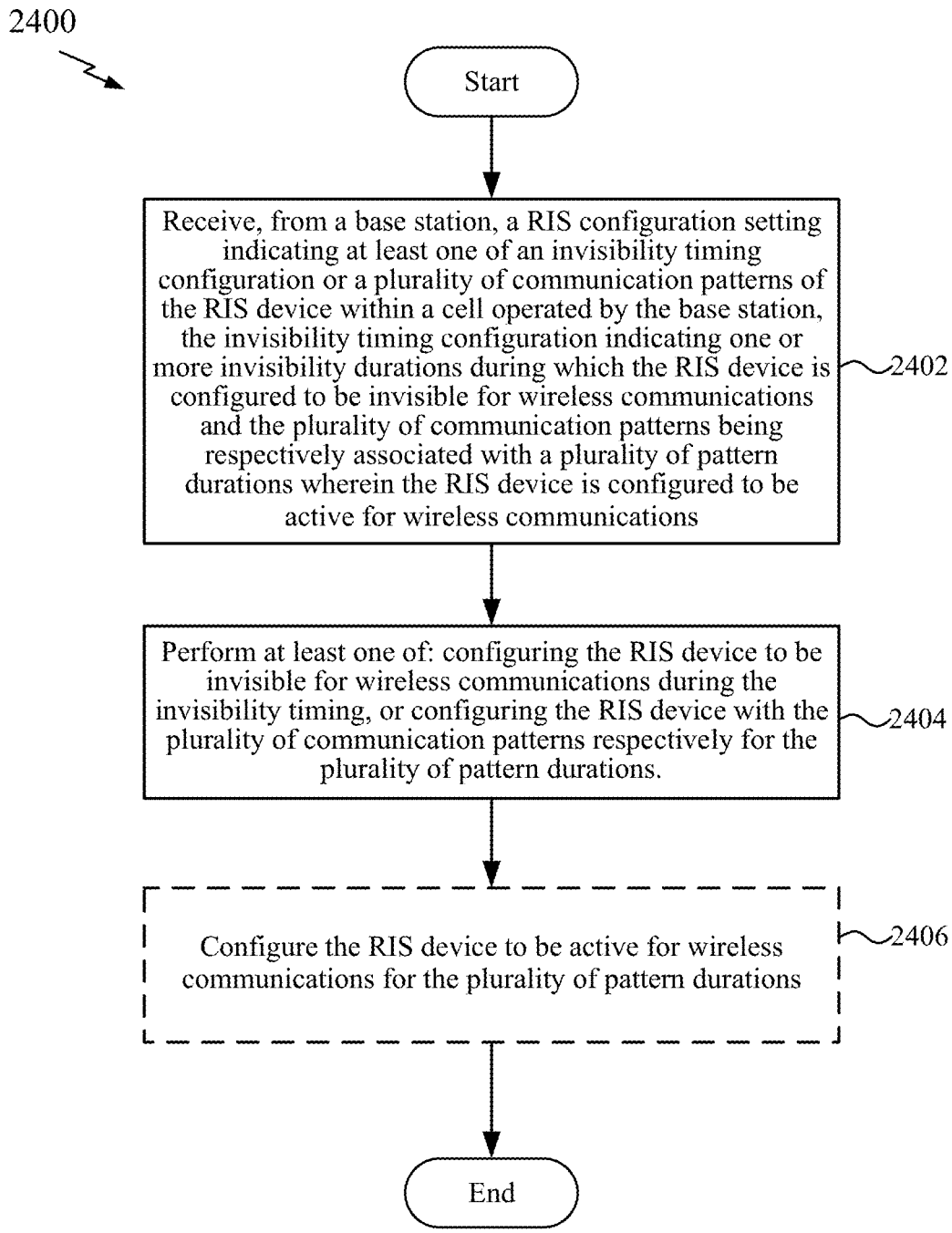
FIG. 24 is a flow chart illustrating an exemplary process for wireless communication by a reconfigurable intelligent surface device according to some aspects.

FIG. 24 is a flow chart illustrating an exemplary process 2400 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 2400 may be carried out by the RIS device 2300 illustrated in FIG. 23. In some examples, the process 2400 may be carried out by any suitable apparatus or means for carrying out the functions or algorithm described below.

At block 2402, the RIS device 2300 may receive, from a base station, a RIS configuration setting indicating at least one of an invisibility timing configuration or a plurality of communication patterns of the RIS device within a cell operated by the base station, the invisibility timing configuration indicating one or more invisibility durations during which the RIS device is configured to be invisible for wireless communications and the plurality of communication patterns being respectively associated with a plurality of pattern durations wherein the RIS device is configured to be active for wireless communications. For example, the communication management circuitry 2340 shown and described above in connection with FIG. 23 may provide means for receiving the RIS configuration setting.

In an aspect, the invisibility timing configuration may indicate one or more slots allocated for a sidelink communication and respectively corresponding to the one or more invisibility durations. In an aspect, the plurality of pattern durations may respectively correspond to a plurality of slots that do not overlap with each other. In an aspect, each of the plurality of communication patterns may indicate at least one of a respective reception beam direction to receive a signal or a respective transmission beam direction to reflect the received signal at the RIS device.

At block 2404, the RIS device 2300 may perform at least one of: configuring the RIS device to be invisible for wireless communications during the invisibility timing, or configuring the RIS device with the plurality of communication patterns respectively for the plurality of pattern durations. For example, the RIS configuration processing circuitry 2342 shown and described above in connection with FIG. 23 may provide means for perform at least one of configuring the RIS device to be invisible or configuring the RIS device with the plurality of communication patterns.

In an aspect, at block 2406, the RIS device 2300 may configure the RIS device to be active for wireless communications for the plurality of pattern durations. For example, the RIS configuration processing circuitry 2342 shown and described above in connection with FIG. 23 may provide means for configuring the RIS device to be active for wireless communications for the plurality of pattern durations.

In one configuration, the RIS device 2300 for wireless communication includes means for receiving, from a base station, a RIS configuration setting indicating at least one of an invisibility timing configuration or a plurality of communication patterns of the RIS device within a cell operated by the base station, the invisibility timing configuration indicating one or more invisibility durations during which the RIS device is configured to be invisible for wireless communications and the plurality of communication patterns being respectively associated with a plurality of pattern durations wherein the RIS device is configured to be active for wireless communications and means for performing at least one of: configuring the RIS device to be invisible for wireless communications during the invisibility timing, or configuring the RIS device with the plurality of communication patterns respectively for the plurality of pattern durations. In an aspect, the RIS device 2300 may further include means for configure the RIS device to be active for wireless communications for the plurality of pattern durations.

In one aspect, the aforementioned means may be the processor(s) 2304 shown in FIG. 23 configured to perform the functions recited by the aforementioned means. In another aspect, the aforementioned means may be a circuit or any apparatus configured to perform the functions recited by the aforementioned means.

Of course, in the above examples, the circuitry included in the processor 2304 is merely provided as an example, and other means for carrying out the described functions may be included within various aspects of the present disclosure, including but not limited to the instructions stored in the computer-readable storage medium 2306, or any other suitable apparatus or means described in any one of the FIGS. 7, 9, 10, 11, 12, and/or 14, and utilizing, for example, the processes and/or algorithms described herein in relation to FIG. 24.

The following provides an overview of several aspects of the present disclosure.

Aspect 1: A method of wireless communication by a first user equipment (UE), comprising: determining reconfigurable intelligent surface (RIS) location information for a RIS device controlled by a base station; configuring one or more sidelink communication parameters based on the RIS location information; and performing a sidelink communication with a second UE based on the one or more sidelink communication parameters.

Aspect 2: The method of aspect 1, wherein the RIS device is located within a cell operated by the base station, and/or wherein the RIS device is located within a preselected distance from the base station.

Aspect 3: The method of aspect 1 or 2, wherein the determining the RIS location information comprises: receiving the RIS location information associated with the RIS device from the base station.

Aspect 4: The method of one of aspects 1 through 3, wherein the RIS location information includes at least one of a location coordinate of a location of the RIS device or a RIS zone corresponding to an area surrounding the location of the RIS.

Aspect 5: The method of aspect 4, wherein a coverage area based on a cell of the base station is divided into a plurality of zones, and wherein the RIS zone is one of the plurality of zones and corresponds to the location of the RIS device, or wherein the RIS zone is a set of zones of the plurality of zones, the set of zones predicted based on the location of the RIS device to be impacted by operation of the RIS device.

Aspect 6: The method of one of aspects 1 through 5, wherein the RIS location information is determined based on at least one of global positioning system (GPS) information or global navigation satellite system (GNSS) information.

Aspect 7: The method of one of aspects 1 through 6, further comprising: determining that the first UE is located within a proximity threshold from the RIS device based on the RIS location information; wherein, responsive to determining that the first UE is located within the proximity threshold from the RIS device, the configuring the one or more sidelink communication parameters based on the RIS location information comprises: randomly selecting one or more resources for the sidelink communication, wherein the sidelink communication is performed using the one or more resources.

Aspect 8: The method of one of aspects 1 through 7, further comprising: determining that at least one of the first UE or the second UE is located within a proximity threshold from the RIS device based on the RIS location information; wherein, responsive to determining that the at least one of the first UE or the second UE is located within the proximity threshold from the RIS device, the configuring the one or more sidelink communication parameters based on the RIS location information comprises at least one of: setting a transmit power of the first UE to a maximum transmit power, wherein the sidelink communication is performed using the maximum transmit power, refraining from transmitting first channel quality information (CQI) associated with the first UE, to the second UE, or refraining from requesting second channel quality information (CQI) associated with the second UE, from the second UE.

Aspect 9: The method of one of aspects 1 through 8, further comprising: determining that at least one of the first UE or the second UE is located within a proximity threshold from the RIS device based on the RIS location information; wherein, responsive to determining that the at least one of the first UE or the second UE is located within the proximity threshold from the RIS device, the configuring the one or more sidelink communication parameters based on the RIS location information comprises: configuring the first UE to perform one or more repetitions of the sidelink communication.

Aspect 10: The method of one of aspects 1 through 9, further comprising: determining locations of a plurality of third UEs that are relay candidates for the sidelink communication between the first UE and the second UE; and determining that a location of at least one third UE of the plurality of third UEs is outside of a proximity threshold from the RIS device based on the RIS location information, wherein the configuring the one or more sidelink communication parameters based on the RIS location information comprises: configuring the first UE to utilize the at least one third UE as a relay to perform the sidelink communication with the second UE via the at least one third UE.

Aspect 11: The method of one of aspects 1 through 10, further comprising: determining one or more slots during which the RIS device is deactivated, wherein the configuring the one or more sidelink communication parameters based on the RIS location information comprises: configuring the first UE to perform the sidelink communication during the one or more slots.

Aspect 12: The method of aspect 11, wherein the determining the one or more slots comprises: receiving, from the base station, an indication of the one or more slots during which the RIS device is deactivated.

Aspect 13: The method of one of aspects 1 through 12, wherein the base station serves the first UE.

Aspect 14: A user equipment (UE) comprising: a transceiver configured to communicate with a radio access network, a memory, and a processor communicatively coupled to the transceiver and the memory, wherein the processor and the memory are configured to perform any one of aspects 1 through 13.

Aspect 15: A UE configured for wireless communication comprising at least one means for performing any one of aspects 1 through 13.

Aspect 16: A non-transitory computer-readable storage medium having instructions for a UE thereon, wherein the instructions, when executed by a processing circuit, cause the processing circuit to perform any one of aspects 1 through 13.

Aspect 17: A method of wireless communication by a base station, comprising: determining reconfigurable intelligent surface (RIS) location information for a RIS device controlled by the base station; and transmitting the RIS location information to one or more UEs to configure one or more sidelink communication parameters based on the RIS location information.

Aspect 18: The method of aspect 17, wherein the RIS device is located within a cell operated by the base station, and/or wherein the RIS device is located within a preselected distance from the base station.

Aspect 19: The method of aspect 18, wherein the base station serves the first UE.

Aspect 20: The method of one of aspects 17 through 19, wherein the RIS location information includes at least one of a location coordinate of a location of the RIS device or a RIS zone corresponding to an area surrounding the location of the RIS device.

Aspect 21: The method of aspect 20, wherein a coverage area based on a cell of the base station is divided into a plurality of zones, and wherein the RIS zone is one of the plurality of zones and corresponds to the location of the RIS device, or wherein the RIS zone is a set of zones of the plurality of zones, the set of zones predicted based on the location of the RIS device to be impacted by operation of the RIS device.

Aspect 22: The method of one of aspects 17 through 21, wherein the RIS location information is determined based on at least one of global positioning system (GPS) information or global navigation satellite system (GNSS) information.

Aspect 23: The method of one of aspects 17 through 22, further comprising: transmitting, to the one or more UEs, an indication of one or more slots during which the RIS device is configured to be visible for wireless communications, wherein a sidelink communication is configured to be performed during the one or more slots.

Aspect 24: A base station comprising: a transceiver configured to communicate with a radio access network, a memory, and a processor communicatively coupled to the transceiver and the memory, wherein the processor and the memory are configured to perform any one of aspects 17 through 23.

Aspect 25: A base station configured for wireless communication comprising at least one means for performing any one of aspects 17 through 23.

Aspect 26: A non-transitory computer-readable storage medium having instructions for a base station thereon, wherein the instructions, when executed by a processing circuit, cause the processing circuit to perform any one of aspects 17 through 23.

Aspect 27: A method of wireless communication by a base station, comprising: determining at least one of an invisibility timing configuration or a plurality of communication patterns for a reconfigurable intelligent surface (RIS) device controlled by the base station, the invisibility timing configuration indicating one or more invisibility durations during which the RIS device is configured to be invisible for wireless communications and the plurality of communication patterns being respectively associated with a plurality of pattern durations; and transmitting, to the RIS device, a RIS configuration setting indicating at least one of the invisibility timing configuration to configure the RIS device to be invisible for wireless communications during the invisibility timing configuration or the plurality of communication patterns to configure the RIS device with the plurality of communication patterns respectively for the plurality of pattern durations.

Aspect 28: The method of aspect 27, wherein for the plurality of pattern durations the RIS device is configured to be active for wireless communications.

Aspect 29: The method of aspect 27 or 28, wherein the determining the invisibility timing configuration comprises: identifying one or more slots allocated for a sidelink communication; and determining that the one or more slots respectively correspond to the one or more invisibility durations.

Aspect 30: The method of one of aspects 27 through 29, further comprising: transmitting, to one or more UEs, the RIS configuration setting indicating the plurality of communication patterns of the RIS device.

Aspect 31: The method of one of aspects 27 through 30, wherein the plurality of pattern durations respectively correspond to a plurality of slots that do not overlap with each other.

Aspect 32: The method of one of aspects 27 through 31, wherein each of the plurality of communication patterns indicates at least one of a respective reception beam direction to receive a signal or a respective transmission beam direction to reflect the received signal at the RIS device.

Aspect 33: The method of one of aspects 27 through 32, wherein at least one of the plurality of pattern durations corresponds to a pattern duration during which the RIS device is configured to be invisible for wireless communications.

Aspect 34: A base station comprising: a transceiver configured to communicate with a radio access network, a memory, and a processor communicatively coupled to the transceiver and the memory, wherein the processor and the memory are configured to perform any one of aspects 27 through 33.

Aspect 35: A base station configured for wireless communication comprising at least one means for performing any one of aspects 27 through 33.

Aspect 36: A non-transitory computer-readable storage medium having instructions for a base station thereon, wherein the instructions, when executed by a processing circuit, cause the processing circuit to perform any one of aspects 27 through 33.

Aspect 37: A method of wireless communication by a first user equipment (UE), comprising: receiving, from a base station, a reconfigurable intelligent surface (RIS) configuration setting indicating a plurality of communication patterns of a RIS device controlled by the base station, the plurality of communication patterns being respectively associated with a plurality of pattern durations; selecting a pattern duration of the plurality of pattern durations; performing a sidelink communication with a second UE during the selected pattern duration of the plurality of pattern durations that is associated with a respective communication pattern of the plurality of communication patterns.

Aspect 38: The method of aspect 37, further comprising: transmitting, to the second UE, a plurality of reference signals respectively during the plurality of pattern durations via sidelink communication; and receiving, from the second UE, a plurality of first feedback signals respectively in response to the plurality of reference signals transmitted respectively during the plurality of pattern durations, wherein the selecting the pattern duration comprises: selecting a first pattern duration of the plurality of pattern durations that is associated with a first feedback signal with a highest signal strength among the plurality of first feedback signals, and wherein the performing the sidelink communication with the second UE during the selected pattern duration comprises transmitting a sidelink communication to the second UE during the selected first pattern duration.

Aspect 39: The method of aspect 37 or 38, further comprising: receiving, from a second UE, a plurality of reference signals respectively during the plurality of pattern durations via sidelink communication; and generating a plurality of second feedback signals respectively based on the plurality of reference signals received respectively during the plurality of pattern durations, wherein the selecting the pattern duration comprises: selecting a second pattern duration of the plurality of pattern durations that is associated with a second feedback signal with a highest signal strength among the plurality of second feedback signals, and wherein the performing the sidelink communication with the second UE during the selected pattern duration comprises receiving a sidelink communication to the second UE during the selected pattern duration.

Aspect 40: The method of aspect 39, further comprising: transmitting, to the second UE, the plurality of second feedback signals respectively in response to the plurality of reference signals received respectively during the plurality of pattern durations, or transmitting, to the second UE, the second feedback signal with the highest signal strength among the plurality of second feedback signals during the second pattern duration.

Aspect 41: The method of one of aspects 37 through 40, wherein the plurality of pattern durations respectively correspond to a plurality of slots that do not overlap with each other.

Aspect 42: The method of one of aspects 37 through 41, wherein each of the plurality of communication patterns indicates at least one of a respective reception beam direction to receive a signal or a respective transmission beam direction to reflect the received signal at the RIS device.

Aspect 43: The method of one of aspects 37 through 42, wherein the base station serves the first UE.

Aspect 44: A user equipment (UE) comprising: a transceiver configured to communicate with a radio access network, a memory, and a processor communicatively coupled to the transceiver and the memory, wherein the processor and the memory are configured to perform any one of aspects 37 through 43.

Aspect 45: A UE configured for wireless communication comprising at least one means for performing any one of aspects 37 through 43.

Aspect 46: A non-transitory computer-readable storage medium having instructions for a UE thereon, wherein the instructions, when executed by a processing circuit, cause the processing circuit to perform any one of aspects 37 through 43.

Aspect 47: A method of wireless communication by a RIS device, comprising: receiving, from a base station, a RIS configuration setting indicating at least one of an invisibility timing configuration or a plurality of communication patterns of the RIS device within a cell operated by the base station, the invisibility timing configuration indicating one or more invisibility durations during which the RIS device is configured to be invisible for wireless communications and the plurality of communication patterns being respectively associated with a plurality of pattern durations wherein the RIS device is configured to be active for wireless communications; and performing at least one of: configuring the RIS device to be invisible for wireless communications during the invisibility timing, or configuring the RIS device with the plurality of communication patterns respectively for the plurality of pattern durations.

Aspect 48: The method of aspect 47, further comprising: configuring the RIS device to be active for wireless communications for the plurality of pattern durations.

Aspect 49: The method of aspect 47 or 48, wherein the invisibility timing configuration indicates one or more slots allocated for a sidelink communication and respectively corresponding to the one or more invisibility durations.

Aspect 50: The method of one of aspects 47 through 49, wherein the plurality of pattern durations respectively correspond to a plurality of slots that do not overlap with each other.

Aspect 51: The method of one of aspects 47 through 50, wherein each of the plurality of communication patterns indicates at least one of a respective reception beam direction to receive a signal or a respective transmission beam direction to reflect the received signal at the RIS device.

Aspect 52: A RIS device comprising: a transceiver configured to communicate with a radio access network, a memory, and a processor communicatively coupled to the transceiver and the memory, wherein the processor and the memory are configured to perform any one of aspects 47 through 51.

Aspect 53: A RIS device configured for wireless communication comprising at least one means for performing any one of aspects 47 through 51.

Aspect 54: A non-transitory computer-readable storage medium having instructions for a RIS device thereon, wherein the instructions, when executed by a processing circuit, cause the processing circuit to perform any one of aspects 47 through 51.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-24 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-24 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication by a first user equipment (UE), comprising:
   determining reconfigurable intelligent surface (RIS) location information for a RIS device controlled by a base station;
   configuring one or more sidelink communication parameters based on the RIS location information; and
   performing a sidelink communication with a second UE based on the one or more sidelink communication parameters.

2. The method of claim 1, wherein the RIS device is located within a cell operated by the base station, and/or
   wherein the RIS device is located within a preselected distance from the base station.

3. The method of claim 1, wherein the determining the RIS location information comprises:
   receiving the RIS location information associated with the RIS device from the base station.

4. The method of claim 1, wherein the RIS location information includes at least one of a location coordinate of a location of the RIS device or a RIS zone corresponding to an area surrounding the location of the RIS.

5. The method of claim 4, wherein a coverage area based on a cell of the base station is divided into a plurality of zones, and
   wherein the RIS zone is one of the plurality of zones and corresponds to the location of the RIS device, or
   wherein the RIS zone is a set of zones of the plurality of zones, the set of zones predicted based on the location of the RIS device to be impacted by operation of the RIS device.

6. The method of claim 1, wherein the RIS location information is determined based on at least one of global positioning system (GPS) information or global navigation satellite system (GNSS) information.

7. The method of claim 1, further comprising:
determining that the first UE is located within a proximity threshold from the RIS device based on the RIS location information;
wherein, responsive to determining that the first UE is located within the proximity threshold from the RIS device, the configuring the one or more sidelink communication parameters based on the RIS location information comprises:
randomly selecting one or more resources for the sidelink communication, wherein the sidelink communication is performed using the one or more resources.

8. The method of claim 1, further comprising:
determining that at least one of the first UE or the second UE is located within a proximity threshold from the RIS device based on the RIS location information;
wherein, responsive to determining that the at least one of the first UE or the second UE is located within the proximity threshold from the RIS device, the configuring the one or more sidelink communication parameters based on the RIS location information comprises at least one of:
setting a transmit power of the first UE to a maximum transmit power, wherein the sidelink communication is performed using the maximum transmit power,
refraining from transmitting first channel quality information (CQI) associated with the first UE, to the second UE, or
refraining from requesting second channel quality information (CQI) associated with the second UE, from the second UE.

9. The method of claim 1, further comprising:
determining that at least one of the first UE or the second UE is located within a proximity threshold from the RIS device based on the RIS location information;
wherein, responsive to determining that the at least one of the first UE or the second UE is located within the proximity threshold from the RIS device, the configuring the one or more sidelink communication parameters based on the RIS location information comprises:
configuring the first UE to perform one or more repetitions of the sidelink communication.

10. The method of claim 1, further comprising:
determining locations of a plurality of third UEs that are relay candidates for the sidelink communication between the first UE and the second UE; and
determining that a location of at least one third UE of the plurality of third UEs is outside of a proximity threshold from the RIS device based on the RIS location information,
wherein the configuring the one or more sidelink communication parameters based on the RIS location information comprises:
configuring the first UE to utilize the at least one third UE as a relay to perform the sidelink communication with the second UE via the at least one third UE.

11. The method of claim 1, further comprising:
determining one or more slots during which the RIS device is deactivated,
wherein the configuring the one or more sidelink communication parameters based on the RIS location information comprises:
configuring the first UE to perform the sidelink communication during the one or more slots.

12. The method of claim 11, wherein the determining the one or more slots comprises:
receiving, from the base station, an indication of the one or more slots during which the RIS device is deactivated.

13. The method of claim 1, wherein the base station serves the first UE.

14. A method of wireless communication by a base station, comprising:
determining reconfigurable intelligent surface (RIS) location information for a RIS device controlled by the base station; and
transmitting the RIS location information to one or more UEs to configure one or more sidelink communication parameters based on the RIS location information.

15. The method of claim 14, wherein the RIS device is located within a cell operated by the base station, and/or
wherein the RIS device is located within a preselected distance from the base station.

16. The method of claim 14, wherein the RIS location information includes at least one of a location coordinate of a location of the RIS device or a RIS zone corresponding to an area surrounding the location of the RIS device.

17. The method of claim 16, wherein a coverage area based on a cell of the base station is divided into a plurality of zones, and
wherein the RIS zone is one of the plurality of zones and corresponds to the location of the RIS device, or
wherein the RIS zone is a set of zones of the plurality of zones, the set of zones predicted based on the location of the RIS device to be impacted by operation of the RIS device.

18. The method of claim 14, wherein the RIS location information is determined based on at least one of global positioning system (GPS) information or global navigation satellite system (GNSS) information.

19. The method of claim 14, further comprising:
transmitting, to the one or more UEs, an indication of one or more slots during which the RIS device is configured to be visible for wireless communications,
wherein a sidelink communication is configured to be performed during the one or more slots.

20. A method of wireless communication by a base station, comprising:
determining at least one of an invisibility timing configuration or a plurality of communication patterns for a reconfigurable intelligent surface (RIS) device controlled by the base station, the invisibility timing configuration indicating one or more invisibility durations during which the RIS device is configured to be invisible for wireless communications and the plurality of communication patterns being respectively associated with a plurality of pattern durations; and
transmitting, to the RIS device, a RIS configuration setting indicating at least one of the invisibility timing configuration to configure the RIS device to be invisible for wireless communications during the invisibility timing configuration or the plurality of communication patterns to configure the RIS device with the plurality of communication patterns respectively for the plurality of pattern durations.

21. The method of claim 20, wherein for the plurality of pattern durations the RIS device is configured to be active for wireless communications.

22. The method of claim 20, wherein the determining the invisibility timing configuration comprises:

identifying one or more slots allocated for a sidelink communication; and determining that the one or more slots respectively correspond to the one or more invisibility durations.

23. The method of claim 20, further comprising:

transmitting, to one or more UEs, the RIS configuration setting indicating the plurality of communication patterns of the RIS device.

24. The method of claim 20, wherein the plurality of pattern durations respectively correspond to a plurality of slots that do not overlap with each other.

25. The method of claim 20, wherein each of the plurality of communication patterns indicates at least one of a respective reception beam direction to receive a signal or a respective transmission beam direction to reflect the received signal at the RIS device.

26. A method of wireless communication by a first user equipment (UE), comprising:

receiving, from a base station, a reconfigurable intelligent surface (RIS) configuration setting indicating a plurality of communication patterns of a RIS device controlled by the base station, the plurality of communication patterns being respectively associated with a plurality of pattern durations;

selecting a pattern duration of the plurality of pattern durations;

performing a sidelink communication with a second UE during the selected pattern duration of the plurality of pattern durations that is associated with a respective communication pattern of the plurality of communication patterns.

27. The method of claim 26, further comprising:

transmitting, to the second UE, a plurality of reference signals respectively during the plurality of pattern durations via sidelink communication; and receiving, from the second UE, a plurality of first feedback signals respectively in response to the plurality of reference signals transmitted respectively during the plurality of pattern durations, wherein the selecting the pattern duration comprises:

selecting a first pattern duration of the plurality of pattern durations that is associated with a first feedback signal with a highest signal strength among the plurality of first feedback signals, and wherein the performing the sidelink communication with the second UE during the selected pattern duration comprises transmitting a sidelink communication to the second UE during the selected first pattern duration.

28. The method of claim 26, further comprising:

receiving, from a second UE, a plurality of reference signals respectively during the plurality of pattern durations via sidelink communication; and generating a plurality of second feedback signals respectively based on the plurality of reference signals received respectively during the plurality of pattern durations, wherein the selecting the pattern duration comprises:

selecting a second pattern duration of the plurality of pattern durations that is associated with a second feedback signal with a highest signal strength among the plurality of second feedback signals, and wherein the performing the sidelink communication with the second UE during the selected pattern duration comprises receiving a sidelink communication to the second UE during the selected second pattern duration.

29. The method of claim 26, wherein the plurality of pattern durations respectively correspond to a plurality of slots that do not overlap with each other.

30. The method of claim 26, wherein each of the plurality of communication patterns indicates at least one of a respective reception beam direction to receive a signal or a respective transmission beam direction to reflect the received signal at the RIS device.

* * * * *